(12) United States Patent
Gordon

(10) Patent No.: US 12,440,195 B2
(45) Date of Patent: Oct. 14, 2025

(54) COMBINATION ERGONOMIC SUCTION TOOL

(71) Applicant: Manuel Barry Gordon, New York, NY (US)

(72) Inventor: Manuel Barry Gordon, New York, NY (US)

( * ) Notice: Subject to any disclaimer, the term of this patent is extended or adjusted under 35 U.S.C. 154(b) by 735 days.

(21) Appl. No.: 17/080,159

(22) Filed: Oct. 26, 2020

(65) Prior Publication Data

US 2021/0346125 A1 Nov. 11, 2021

Related U.S. Application Data

(63) Continuation-in-part of application No. 13/927,560, filed on Jun. 26, 2013, now Pat. No. 10,813,718, which is a continuation-in-part of application No. 13/624,257, filed on Sep. 21, 2012, now Pat. No. 9,198,738, which is a continuation of application No. 12/405,751, filed on Mar. 17, 2009, now Pat. No. 8,297,972.

(51) Int. Cl.
*A61B 13/00* (2006.01)
*A61C 17/08* (2006.01)

(52) U.S. Cl.
CPC ............. *A61B 13/00* (2013.01); *A61C 17/08* (2019.05)

(58) Field of Classification Search
CPC .. A61C 17/10; A61C 17/06–096; A61B 13/00
See application file for complete search history.

(56) References Cited

U.S. PATENT DOCUMENTS

| | | | | |
|---|---|---|---|---|
| 3,090,122 A * | 5/1963 | Erickson | ................ | A61C 17/08 600/238 |
| 3,768,477 A * | 10/1973 | Anders | ................ | A61C 17/08 433/91 |
| 6,875,173 B2 * | 4/2005 | Suddaby | ............ | A61B 17/0218 600/210 |
| 6,901,928 B2 * | 6/2005 | Loubser | ............. | A61B 1/00103 128/207.14 |
| 9,808,227 B2 * | 11/2017 | Mettler, Jr. | ............ | A61B 13/00 |
| D879,959 S * | 3/2020 | Reyes | ......................... | D24/135 |
| 2017/0245843 A1 * | 8/2017 | Reyes | ..................... | A61C 17/08 |

FOREIGN PATENT DOCUMENTS

DE 20103524 U1 * 9/2001 ............. A61B 13/00

* cited by examiner

*Primary Examiner* — Edward Moran
(74) *Attorney, Agent, or Firm* — Wiggin and Dana LLP

(57) ABSTRACT

A combination ergonomic tool having a suction mechanism and includes an operational unit, a neck region and a handle region. The suction mechanism may be added for eliminating fluids. In particular, the handle region and neck region together form a single, continuous, hollow fluid passageway to facilitate the delivery of suction at the distal tip of the combination dental tool. The operational unit can further include a tongue retractor, a flap retractor or a combination thereof. The neck region may further contain a lateral bend, a rotation of the working end or both. The proximal end of the handle region, opposite the operational unit, may further include any useful apparatus, such as a periosteal elevator or periosteal retractor.

12 Claims, 39 Drawing Sheets

200
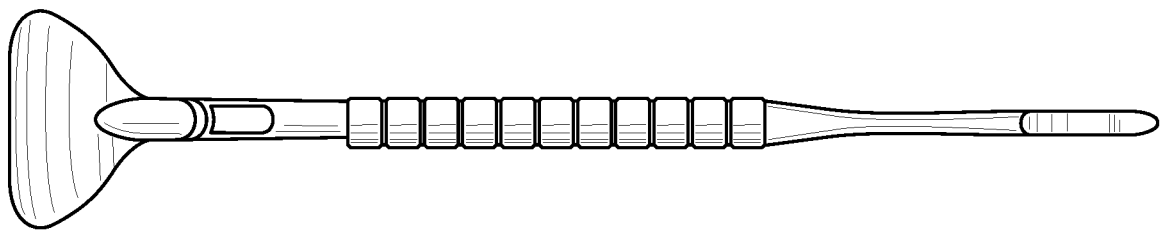
FIG. 2D
200  200
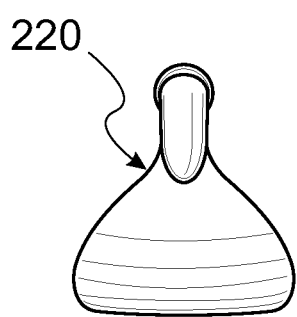 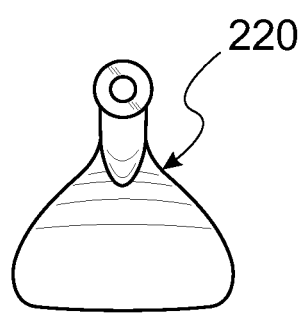
FIG. 2E    FIG. 2F

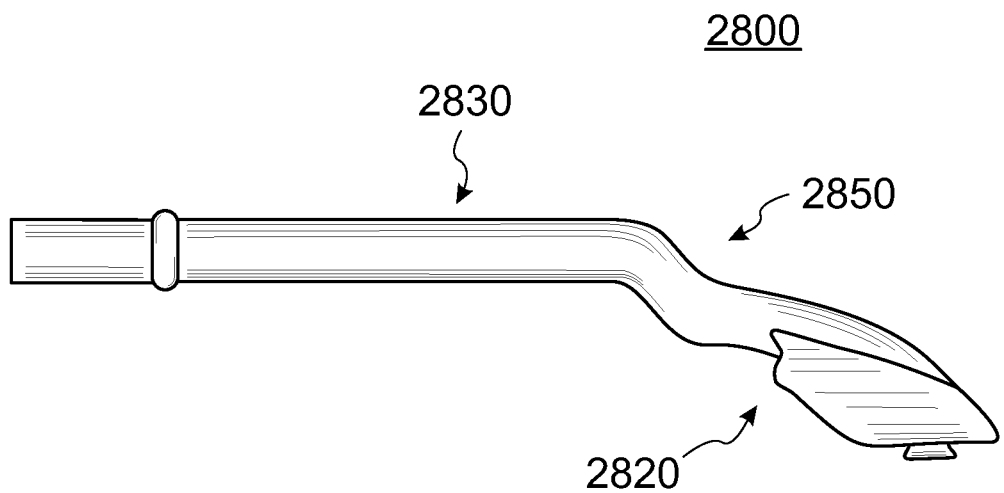
FIG. 6D
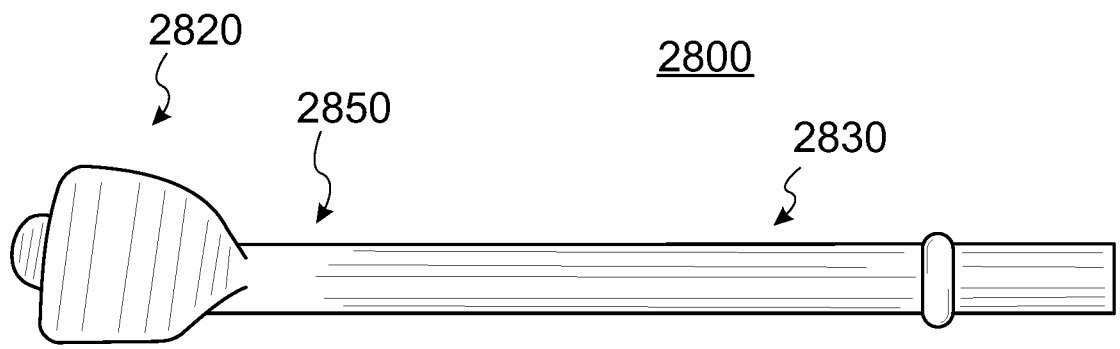
FIG. 6E
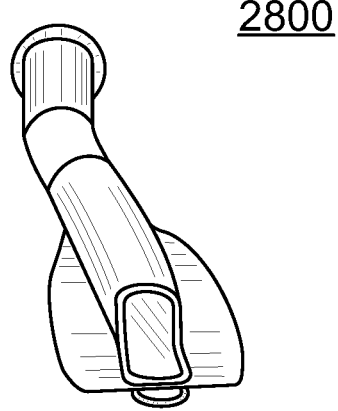 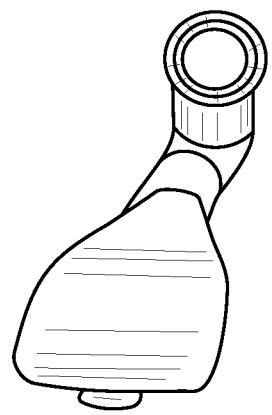
FIG. 6F FIG. 6G

COMBINATION ERGONOMIC SUCTION TOOL

CROSS-REFERENCE TO RELATED APPLICATIONS

This application is a continuation-in-part of U.S. patent application Ser. No. 13/927,560 filed on Jun. 26, 2013, which is a continuation-in-part of U.S. patent application Ser. No. 13/624,257, filed on Sep. 21, 2012, which is now U.S. Pat. No. 9,198,738, which is a continuation of U.S. patent application Ser. No. 12/405,751, filed on Mar. 17, 2009, which is now U.S. Pat. No. 8,297,972, the contents of all of these patents and applications are incorporated herein by reference in their entirety.

BACKGROUND OF THE INVENTION

1. Field of the Invention

The present invention generally relates to the fields of general dentistry, oral surgery and periodontal surgery and to surgical instrumentation used therein. More specifically, the invention relates to tongue and flap retractors, as well as suction tools, used in general dental procedures, periodontal and oral surgery.

2. Description of the Related Art

Many dental procedures require the precise use of surgical instruments within a small and restricted area of operation. Furthermore, it is usually desirable to selectively supply air or water to a treatment area, drill in a treatment area, or to manipulate soft tissue. To do so, Dentists have conventionally used various instruments to manipulate tissue, suction liquids or retract the tongue while performing the desired procedure. By way of example, a primary method used to retract the tongue involves using a standard dental mirror. However, the size of the mirror and lack of proper physics and ergonomics makes this procedure needlessly difficult.

Hence, conventional methods frequently present various problems. For example, because of the restricted area, it is undesirable and usually impractical to crowd the oral cavity with multiple instruments. When two or three different instruments are placed in a patient's oral cavity, the practitioner is unable to clearly see the area of operation. Furthermore, because of the tight quarters, the instruments become limited in their range of motion. Thus, the degree of difficulty is unnecessarily increased for even the simplest of procedures.

The use of multiple instruments is impractical as it severely limits the ability of the general dentist, periodontal surgeon, oral surgeon or assistant (herein, "Dentist") to properly perform the required procedures. For instance if a Dentist uses one hand to retract the tongue and another to hold a surgical flap away from the treatment area, then he will need to ask for an assistant to reach for another instrument, or the assistant must hold an instrument and retract either the tongue or flap while he/she is simultaneously suctioning or performing a different task. The only other option would be to perform the operation in segments or go back and forth between instruments until the procedure is complete. This unnecessary complexity lengthens the time of operation, reduces the efficiency of the procedure and increases patient discomfort.

Finally, a common problem in the field is that Dentists regularly complain of neck, back and shoulder pain, as well as pain related to carpal tunnel syndrome. In fact, a comprehensive literature search indicates dental care providers are at a high risk for suffering workplace musculoskeletal disorders (WMSD) and neuromuscular disorders, e.g. disc herniation. Studies have reported that Dentists who suffer a WMSD injury have a lost work day average of 93 days per incident. In fact, sixty-two percent of dental hygienists have complained of neck problems and eighty-one percent have complained of shoulder pain in one or both shoulders. Studies have also shown that between six and seven percent of all dental hygienists report being diagnosed with carpal tunnel syndrome and that fifty-nine percent of dentists have reported musculoskeletal pain. A survey of a U.S. Army dental clinic reported that over seventy-five percent of all dental workers complained of one or more carpal tunnel syndrome symptoms, over fifty percent complained of back and shoulder pain, and eleven percent were diagnosed as having carpal tunnel syndrome. These disorders and others can be addressed with proper emphasis on ergonomics and posture, and by shortening the length of the dental procedure.

Thus, missing from the art is an invention that allows greater control, while affording the Dentist an opportunity to practice with better posture. Moreover, an invention that reduces the time of operation would have several benefits for both patients and Dentists by: (i) reducing strain on the neck, back, shoulders and hands of Dentists, (ii) reducing the amount of discomfort experienced by patients during procedures in which they remain awake, and (iii) reducing the adverse risks to the patient associated with the use of general anesthesia in situations where patients are anesthetized for a procedure.

SUMMARY OF THE INVENTION

One embodiment of the invention is directed to a combination dental retractor (e.g., a tongue and/or surgical flap retractor) which is combined with or has integrated into it a dental evacuator, or suction tool. The combination retractor/evacuator may include an operational unit, a neck region and a handle region. The operational unit further includes a tongue retractor and/or a flap retractor. The tongue retractor may be formed with a concave shape, a flat shape, or with an increased overall thickness of the operational unit. The flap retractor may be formed with a tapered extended edge or tab, which can be made in various lengths. Furthermore, the flap retractor may also include a beveled edge. The combination retractor may be formed in a way such that the tongue retractor is disposed on a different plane than the flap retractor. The retractor may also include a suction mechanism or tool for eliminating fluids such as saliva, water, and blood from the oral cavity.

The present invention is also directed to improved ergonomics in the neck region of the operational unit. In one embodiment, the neck region contains an S-shaped design for better ergonomics. Furthermore, the neck region may also include a lateral bend positioned at the proximal end of the operational unit, so as to position the operational unit either to the right or the left with respect to the central axis of the handle. Also, a rotational offset may be incorporated in the working end in order to further help to accommodate the tool to the anatomy of the mandible and the position of the patient's mouth during a procedure. Therefore, this facilitates specific use on a respective side of the mouth based on the direction of the lateral bend.

Finally, the present invention is directed to improvements in the handle region of the combination retractor. In one embodiment, the handle region includes a grip portion having various widths so that the Dentist can choose a pen grasp or a palm grasp depending on the individual preferences of the Dentist. The proximal end of the handle region may further include a dental pick, a dental probe, a dental hook, a periosteal elevator, or a periosteal retractor or any other dental instrument.

Other features and advantages of the present invention will become more fully apparent and understood with reference to the following description, the accompanying drawings and the appended claims.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings:

FIG. 2D is a bottom view of the dental tool of FIG. 2A.
FIG. 2E is a top detailed view of a tongue refractor portion of the dental tool shown in FIG. 2A.
FIG. 2F is a bottom detailed view of a tongue refractor portion of the dental tool shown in FIG. 2A.

FIG. 6D is a right side view of the dental tool of FIG. 6A.
FIG. 6E is a bottom view of the dental tool of FIG. 6A.
FIG. 6F is a front view of the dental tool shown in FIG. 6A.
FIG. 6G is a back view of the dental tool shown in FIG. 6A.

DETAILED DESCRIPTION OF THE PREFERRED EMBODIMENTS

Figure 1A:
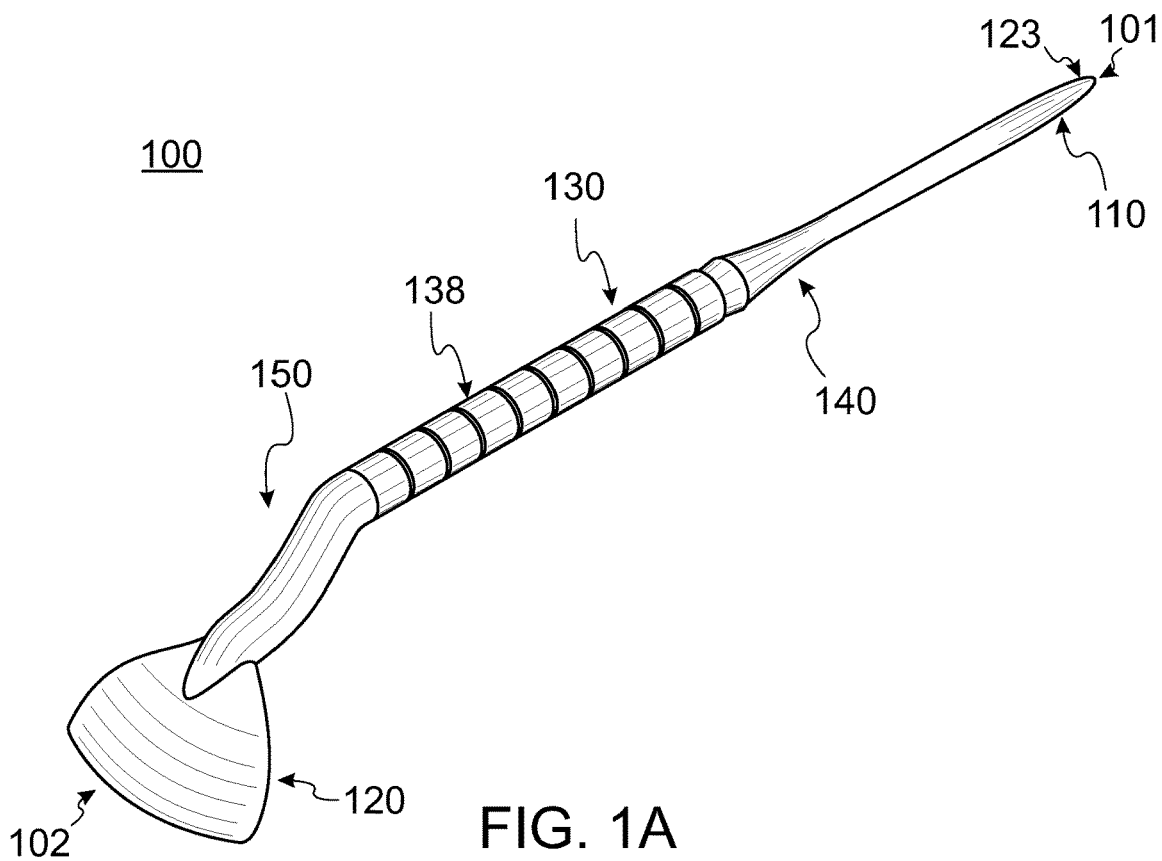
FIG. 1A is a perspective view of a first embodiment dental tool.

Referring now to the drawings, FIGS. 1A-1F show an embodiment tool 100. The tool 100 has a generally longitudinal shape with a first, proximal end 101 and a second, distal end 102. The tool 100 may be formed of stainless steel, carbide, plastic or resin, or any other suitable material known in the art, and may include a first operational unit 110 disposed on the proximal end 101 and a second operational unit 120 disposed on the distal end 102. Further, the densities of the materials used may be varied as well, so as to provide heavier or lighter instruments as may be desirable for the end user. For example, denser grades of stainless steel may be used to create a relatively heavier product. The embodiment tool 100 may also be disposable. The tool 100 further includes a handle region 130, a first neck region 140 disposed between the first operational unit 110 and the handle region 130, and a second neck region 150 disposed between the second operational unit 120 and the handle region 130. The handle region 130 may be thick, narrow, round, flat or have various combinations thereof.

The tool 100 may be integrally formed as a unitary structure, or, alternatively may be formed by separate units that are mechanically linked together, either releasably or fixedly linked. Any suitable mechanical connection as known in the art may be used to releasably connect the various components together to form the tool 100. For example, the first operational unit 110 and first neck region 140 may be integrally formed as a single unit that mechanically couples, such as by a threaded section on the distal end of first neck region 140, to the handle region 130; the handle region 130 may also be integrally formed as a single unit having a corresponding threaded section on its proximal end to accept the mating threaded section of the first neck region 140. Similarly, the distal end of handle region 130 may also have a threaded section to accept a corresponding mating threaded section on the proximal end of the second neck region 150, in which the second neck region 150 is integrally formed with the second operational unit 120. Many variations are contemplated and are within the scope of the present invention. For example, the handle region 130, first neck region 140 and first operational unit 110 may all be integrally formed as a single unit, which is threadedly or otherwise mechanically attached to the second neck region 150 and second operational unit 120, which portions 120, 150 may again be integrally formed as a single unit. For example, as illustrated in FIGS. 1E and 1F, the second neck region 150 and second operational unit 120 may be integrally formed as a single unit. A proximal end 151 of the second neck region 150 may include a threaded section 159, such as a threaded protrusion or a threaded aperture, to correspondingly mate with a threaded section on the distal end of the handle region 130. In yet another alternative, the entire dental tool 100 may be integrally formed as a single or unitary structure, e.g., by appropriate molding or forming techniques.

The handle region 130 is used as a gripping region by the Dentist in the manipulation of the tool 100 and may be generally circular, hexagonal, octagonal, flat or the like in cross-section perpendicular to its length; the handle region 130 may include knurls 132 or other surface texturing to improve the Dentist's grip upon the handle region 130. Alternatively, the handle region 130 may include an exterior grip material made of plastic, rubber or any other suitable material. Portions of the tool 100 may be formed so as to be hollow or solid in construction. Additionally, it will be appreciated that the cross-sectional shape of the various portions 110, 140, 130, 150, 120 of the tool 100 may be in different shapes, and preferably may vary in a substantially continuous manner from the proximal end 101 to the distal end 102.

Figure 1B:
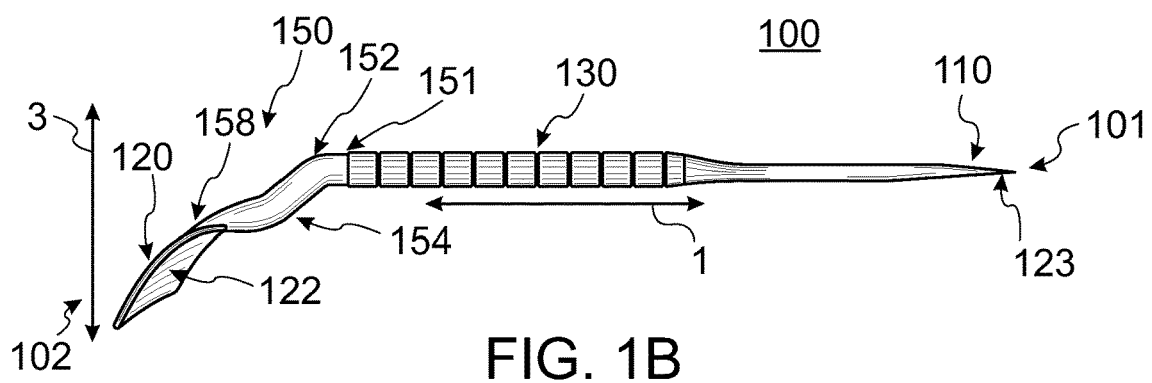
FIG. 1B is a side view of the dental tool of FIG. 1A.
Figure 1C:
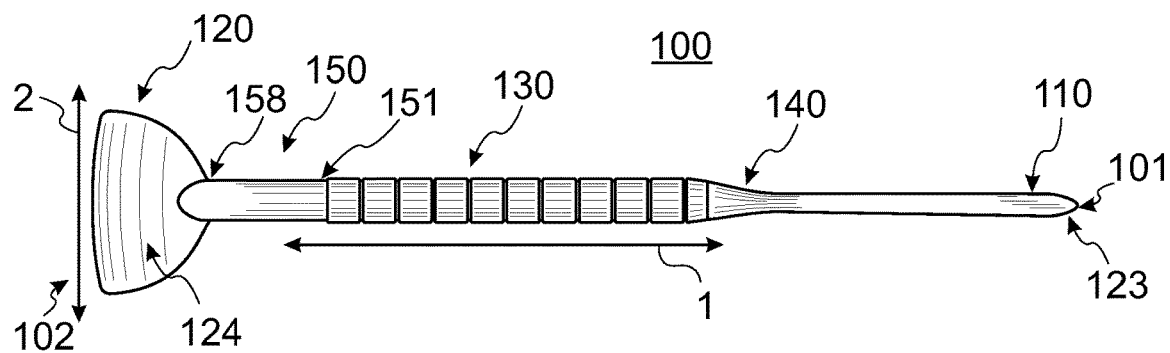
FIG. 1C is a top view of the dental tool of FIG. 1A.
Figure 1D:
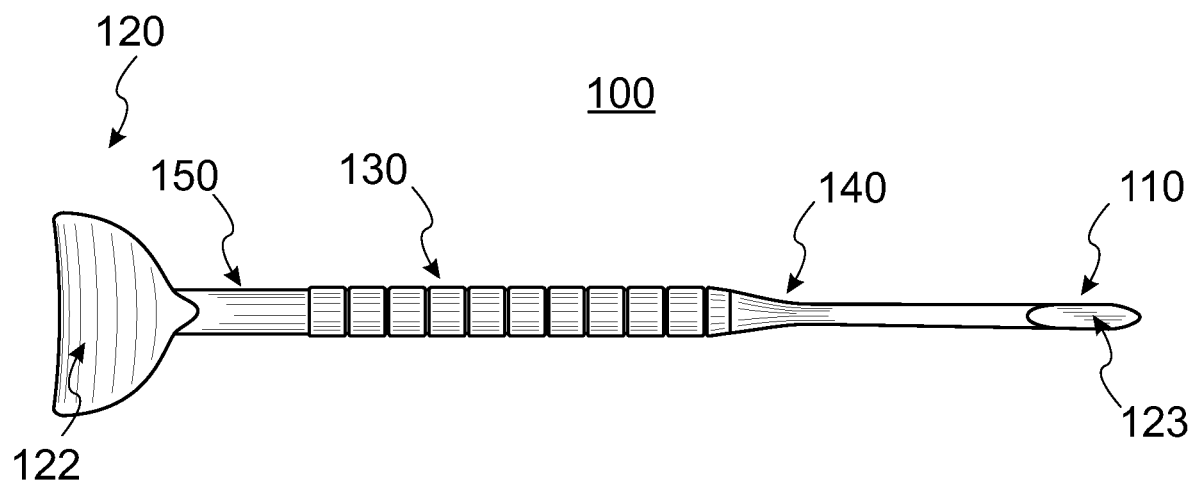
FIG. 1D is a bottom view of the dental tool of FIG. 1A.
Figures 1E, 1F:
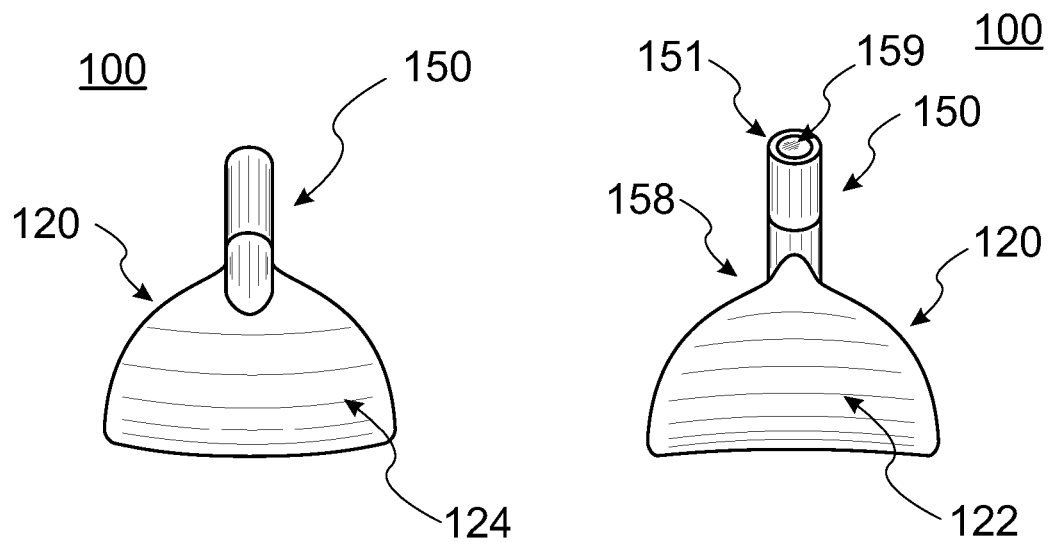
FIG. 1E is a top detailed view of a tongue retractor portion of the dental tool shown in FIG. 1A.
FIG. 1F is a bottom detailed view of a tongue refractor portion of the dental tool shown in FIG. 1A.
Figure 2A:
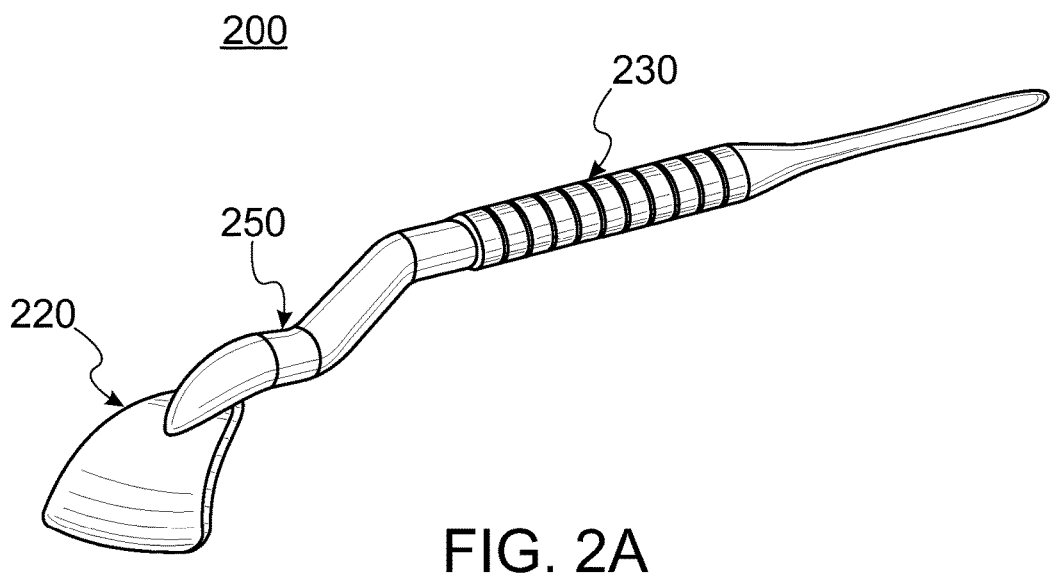
FIG. 2A is a perspective view of a second embodiment dental tool.
Figure 2B:
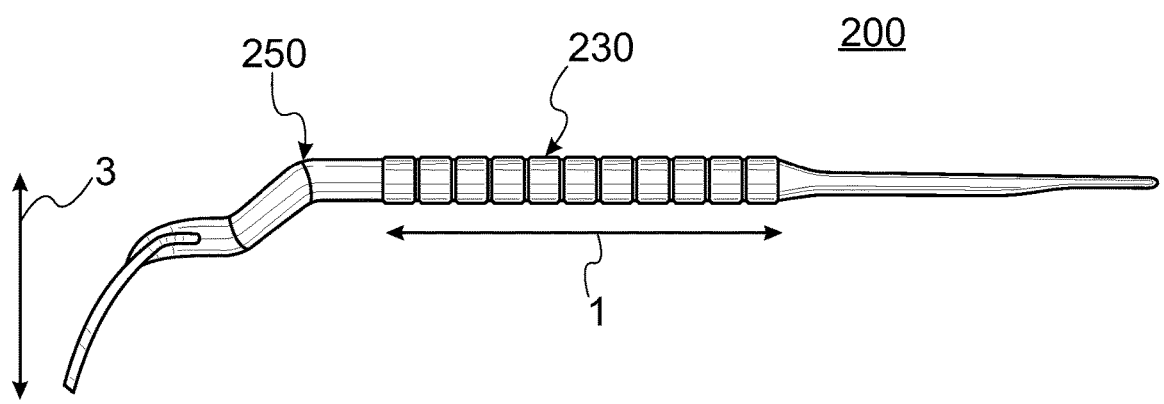
FIG. 2B is a side view of the dental tool of FIG. 2A.
Figure 2C:
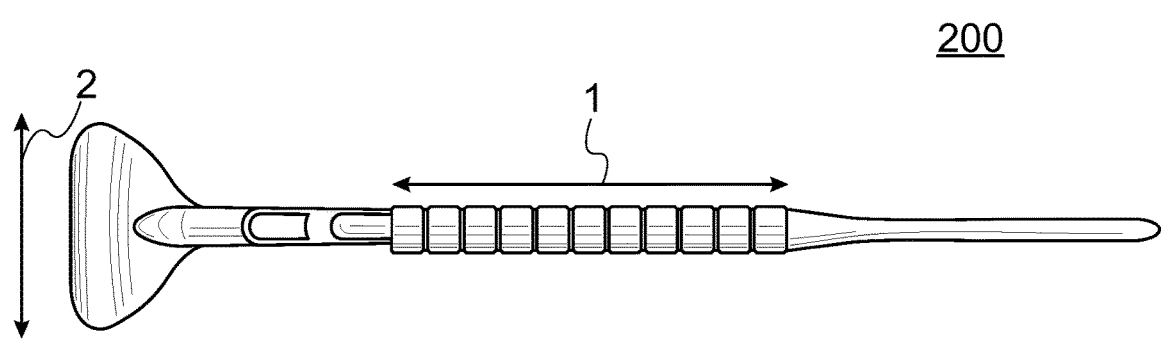
FIG. 2C is a top view of the dental tool of FIG. 2A.

As shown in FIGS. 1B and 1C, the longitudinal length of the handle region 130 may define a longitudinal direction 1. A lateral direction 2, corresponding to side-to-side motion of the ends 101, 102, is perpendicular to the longitudinal direction 1, while a transverse direction 3 is perpendicular to both the longitudinal direction 1 and the lateral direction 2, corresponding to up-and-down motion of the ends 101, 102. These directions (longitudinal, lateral and transverse) are used throughout the following to describe features of the various embodiments.

In the embodiment tool 100, the second operational unit 120 includes a concave tongue retractor 120. The concave tongue retractor 120 is used to retract the tongue away from the treatment area where the Dentist is working The concave tongue retractor 120 is used to retract and/or isolate the tongue during a procedure. As can be appreciated from FIGS. 1A-1F, the concave tongue retractor 120 is preferably shaped to provide for a natural area to encapsulate a portion of the tongue, thereby removing it from the treatment area. In cross-section along the transverse plane (i.e., in the plane defined by directions 1 and 3 and best illustrated in FIG. 1B), the tongue retractor 120 has a circular, or more preferably a semi-circular, shape to provide a concave ventral surface 122 and a corresponding convex dorsal surface 124, in which the ventral surface 122 is the working surface that is designed to come into direct contact with the patient's tongue. The curve may extend through approximately 30 degrees to 160 degrees of arc, more preferably through about 70 degrees to 100 degrees of arc, more preferably still through about 80 to 90 degrees of arc. Preferably, as a semi-circular arc in cross-section within the transverse plane, the major axis of the tongue retractor 120 is more closely aligned along the transverse direction 3 (or along the distal extents of the retractor 120) while the minor axis is more closely aligned along the longitudinal direction 1 (or perpendicular to the distal extents—i.e., perpendicular to the bottom surface 122); the major axis of the tongue retractor may be, for example, at least 50% greater than its minor axis. Similarly, the tongue refractor 120 also has a curved shape, preferably circular, in cross-section along the lateral plane (i.e., the plane defined by directions 1 and 2 and best illustrated in FIG. 1C), which further increases the concave nature of ventral surface 122 and the convex nature of dorsal surface 124. The tongue retractor 120 preferable extends through 5 to 90 degrees of arc, more preferably still through 10 to 45 degrees of arc, more preferably still through about 20 to 30 degrees of arc, in the cross-section of the lateral plane. The distal end 102 of the tongue retractor 120 may have extents along the lateral direction 2 from about 10 mm to 40 mm, and preferably of about 25 mm, providing a curved length along the lateral direction 2 that is slightly greater than this depending upon the desired amount of curvature. The tongue retractor 120 may have extents along the longitudinal direction 1 from about 19 mm to about 51 mm, and preferably about 32 mm, which may similarly provide for a slightly greater curved length. The lateral extents 2 of the distal end 102 may range from about 15 mm to about 40, more preferably about 26 mm.

For purposes of the following, a dorsal direction is a direction along the transverse direction 3 towards which the dorsal surface 124 faces (i.e., an "upward" direction), whereas a ventral direction is the direction along the transverse direction 3 that is opposite to the dorsal direction—i.e., in the direction which the ventral surface 122 faces, the "downward" direction. In this embodiment 100, the first neck region 140 may be straight and thus extend along and parallel to the longitudinal direction 1. In contrast, the second neck region 150 is straight in the lateral plane (the plane defined by longitudinal direction 1 and lateral direction 2), as shown in FIG. 1C, but is bent in the transverse plane (the plane defined by longitudinal direction 1 and transverse direction 3), as shown in FIG. 1B. The second neck region 150 includes a first angle or bend 152 that angles ventrally in the transverse direction 3, and then a more distal second angle or bend 154 that angles dorsally in the transverse direction 3. The angles of the bends 152, 154 may be substantially equal so that the distal end of the second neck 150 terminates in a direction that is substantially parallel to the distal end of handle region 130 but merely offset ventrally by a transverse distance. Or, more preferably, the distal upward bend 154 may be less than the initial proximal bend 152 so that the distal end 102 of the second neck region 150 points slightly ventrally in the transverse direction with respect to the distal end 102 of the handle region 130.

The ventral, transverse offset is advantageously designed to more easily navigate the anatomy of the patient to reach the working area; more particularly, the second operational unit 120 is disposed ventrally towards the patient with respect to the handle region 130, which makes it easier to navigate around the anatomy of the patient when approaching, for example, from the contralateral side. This ventral offset provides the unexpected benefit of reducing strain upon the Dentist when retracting tissue or anatomy, such as a patient's tongue. In particular, this ventral offset, and optional ventral angle, of the second operation unit 120 permits the second operational unit 120 to be more easily manipulated with handle region 130, as second neck region 150 more conveniently clears the teeth and jaw of the patient. In preferred embodiments the ventral distance between the proximal end 151 of the second neck region 150 and the distal end 158 of the second neck region 150 in the transverse direction 3 is from about 5 mm to 32 mm, more preferably from 10 mm to 26 mm, more preferably still from about 15 mm to 20 mm. The combination of the first bend 152 and the second bend 154 gives the second neck region 150 a generally S-shaped or stepped appearance, and for purposes of this disclosure are termed "S-shaped" bends. The first bend 152 may pass through from 10 to 90 degrees of arc, more preferably through from 30 to 60 degrees of arc, more preferably still through about 45 degrees of arc, and extend in a related direction for from 7 to 30 mm, more preferably from 10 to 20 mm, more preferably still from 13 to 17 mm. The second bend 154 may pass through from 5 to 90 degrees of arc, more preferably through from 15 to 60 degrees of arc, more preferably still through about 30 degrees of arc, and extend in a related direction of from 7 to 30 mm, more preferably from 10 to 20 mm, more preferably still from 13 to 17 mm. The second bend 154 provides a surface onto which the second operational unit 120 is mounted. For example, the dorsal surface 124 of second operational unit 120 may be bonded to a ventral surface of the second bend 154. Or, the second operational unit 120 may be embedded within the second bend 154, so that portions of the second bend 154 extend over both the ventral surface 122 and the dorsal surface 124 of the operational unit 120.

The S-shaped neck region 150 creates a ventral, transverse spatial displacement of the operational unit 120, and optionally a ventral, transverse angular displacement of the operational unit 120 as well. For example, the lateral plane of the operational unit 120 (which may be defined, for example, by the lateral and longitudinal extents of the operational unit 120) may be angled in a ventral, transverse direction 3 with respect to the lateral plane of the tool 100 (which may be defined, for example, by the longitudinal direction 1 and the lateral direction 2). These transverse displacements, both angular and spatial, help to position the tool with respect to the location of the mandible, which is typically inferior to the position of the Dentist, and consequently provide a more ergonomic design that requires less force and thus results in less fatigue for the Dentist, and also help the handle region 130 to more easily clear the teeth and mandible of the patient. In preferred embodiments, the ventral, transverse angular displacement of the operational unit 120 is from 0 degrees to 90 degrees with respect to the longitudinal axis 1 of the handle region 130, more preferably from 15 degrees to 60 degrees, more preferably still from 20 degrees to 30 degrees. It should be appreciated that in some alternative embodiments, the neck region may be smoothly bent across its length to provide the desired curvature and spatial displacements, rather than providing for a discrete number of individual bends as shown in the discussed preferred embodiments; such smoothly bend configurations are also considered "S-shaped bends" for purposes of the following disclosure. In such embodiments, it will be appreciated that they still include substantially first and second bends with corresponding angular and spatial extents as discussed above.

The embodiment tool 100 provides improved ergonomics through the use of S-shaped bends 152, 154. These ergonomic features can be optionally incorporated into each of the other tools and embodiments discussed herein. The ventral, S-shape of the second neck region 150 allows the tool 100, and in particular the tongue retractor 120, to align more optimally within the oral cavity, such that a greatly reduced amount of force is needed in the transverse direction 3. More specifically, the ventral orientation provided by the S-shaped region 150 in effect provides the ventral (i.e., downward) motion typically needed to retract a tongue, and as a result greatly reduces the effort required by a Dentist to perform such tongue retraction. This dramatically decreases the Dentist's fatigue and discomfort, and avoids prolonged strain on the neck, shoulder, arm, back, and hand, thus reducing the risk of injury to the Dentist.

The first operational unit 110 may optionally be present, or the proximal end 101 of the handle region 130 may terminate in a suitable shape or with a suitable fitting. By way of example, however, the first operational unit 110 may be, for example, screwed onto the proximal end 101 of the handle region 130 to provide additional functionality to the tool 100. For example, the first operational unit 110 may be a periosteal elevator 123. Furthermore, as can be appreciated by those skilled in the art, the proximal end of the handle 120 may instead include a dental probe, a dental hook, or other useful apparatus. In other embodiments, the entire tool may be integrally formed so that the handle region, neck region and operational unit are all formed together as a single unit.

In the following, various embodiment tools are discussed. It will be appreciated that features from the embodiment tool 100, or indeed from any other embodiment tool discussed herein, may be used within the other respective embodiments discussed. Specifically, the S-shaped neck region 150, with its related angular and spatial parameters, may be successfully employed. For the sake of brevity, only specific features of a particular embodiment that have not been previously introduced are discussed in that embodiment, and it will be appreciated that it may be possible to then incorporate such features into other embodiments, such as specific angular offsets or spatial extents.

FIGS. 2A-2F illustrate another embodiment tool 200 having an S-shaped second neck region 250 coupling a second embodiment tongue retractor 220 to a handle region 230. Compared to the first embodiment tongue retractor 120, the embodiment tongue retractor 220 has increased extents along the lateral direction 2—i.e., is wider. This may accommodate, for example, a patient with a larger mouth or tongue, and thus provide tools tailored to the specific anatomy of the patient. In preferred embodiments the tongue retractor 220 extends along the lateral direction 2 by about 15 mm to 45 mm, more preferably from 20 mm to 35 mm, more preferably still about 28 mm. The tongue retractor 220 may extend through 15 to 180 degrees of arc along the lateral direction 2, more preferably from 30 to 100 degrees of arc, more preferably still from 40 to 60 degrees of arc.

Figure 3A:
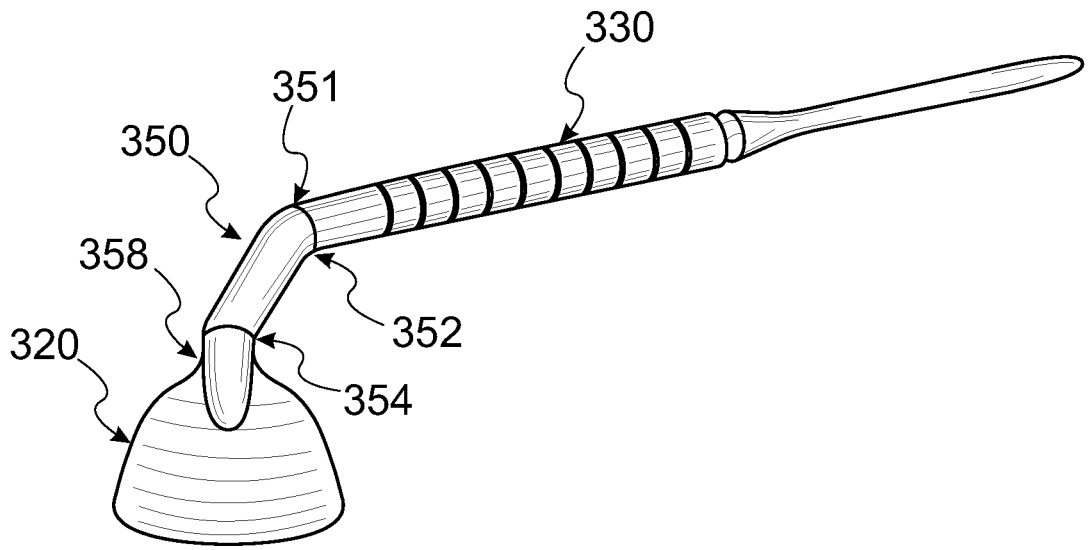
FIG. 3A is a perspective view of a third embodiment dental tool.
Figure 3B:
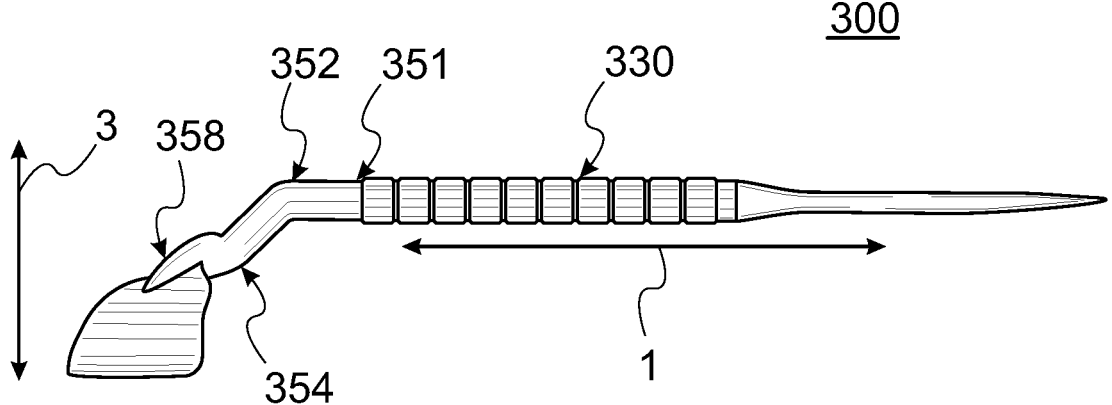
FIG. 3B is a side view of the dental tool of FIG. 3A.
Figure 3C:
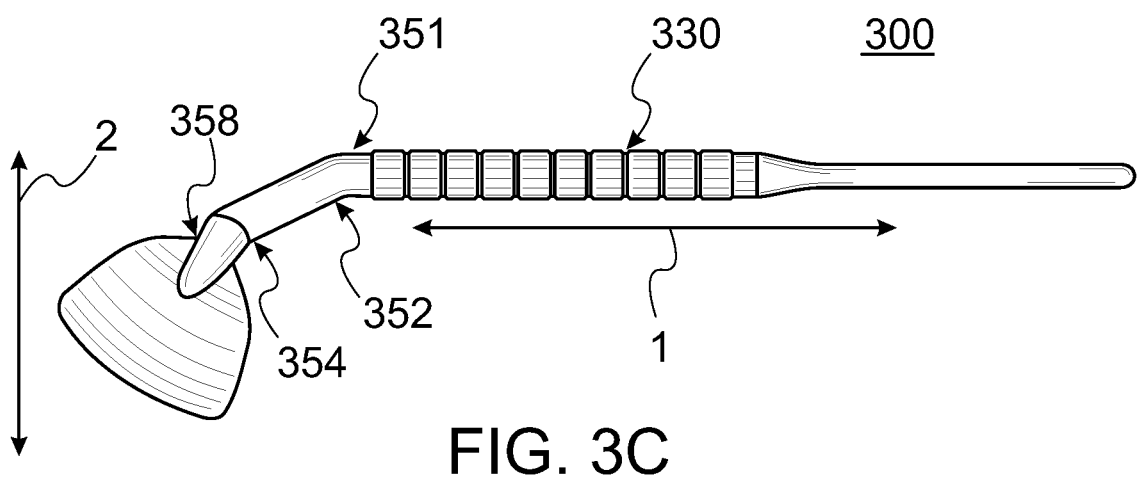
FIG. 3C is a top view of the dental tool of FIG. 3A.
Figure 3D:
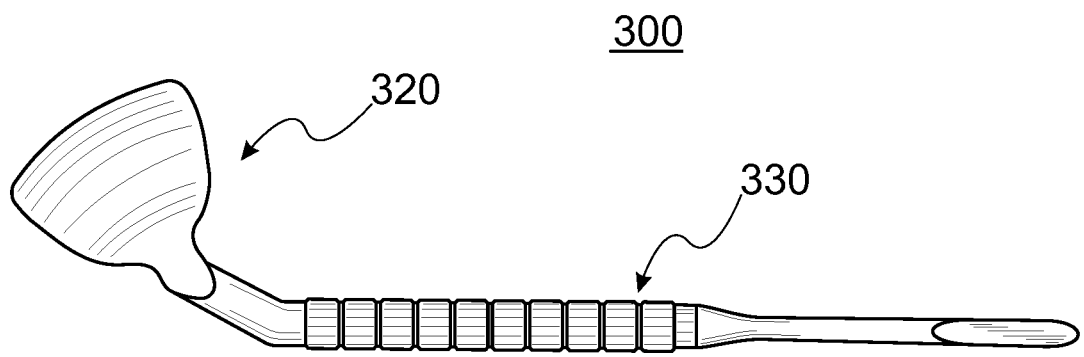
FIG. 3D is a bottom view of the dental tool of FIG. 3A.
Figures 3E, 3F:
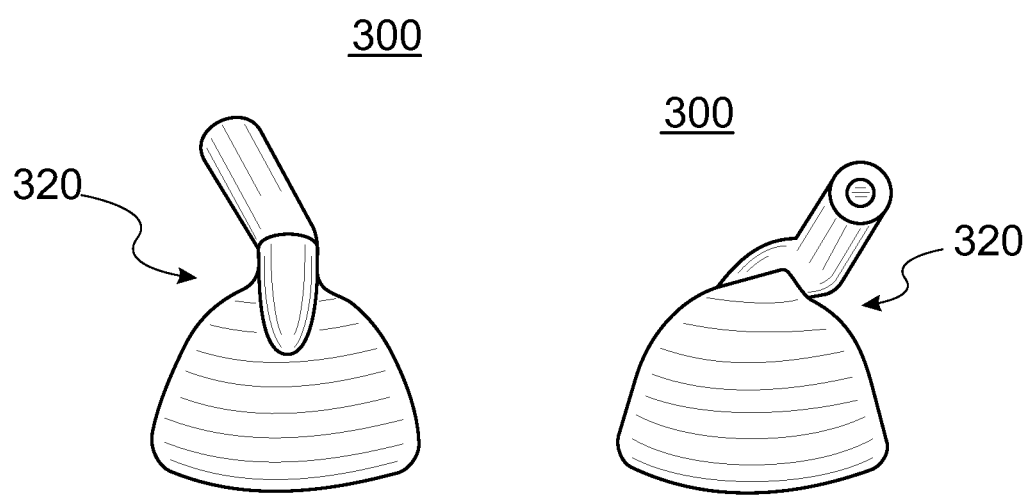
FIG. 3E is a top detailed view of a tongue retractor portion of the dental tool shown in FIG. 3A.
FIG. 3F is a bottom detailed view of a tongue refractor portion of the dental tool shown in FIG. 3A.
Figure 4A:
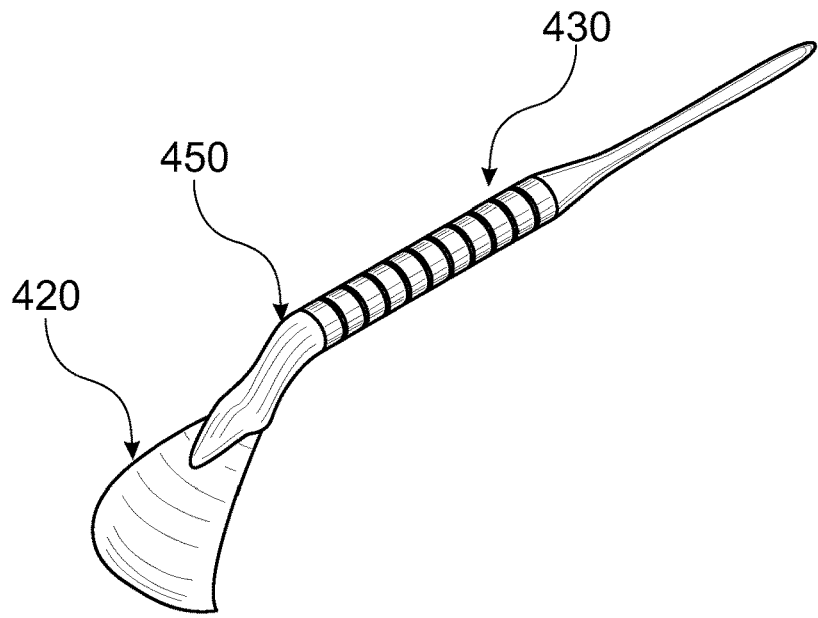
FIG. 4A is a perspective view of a fourth embodiment dental tool.
Figure 4B:
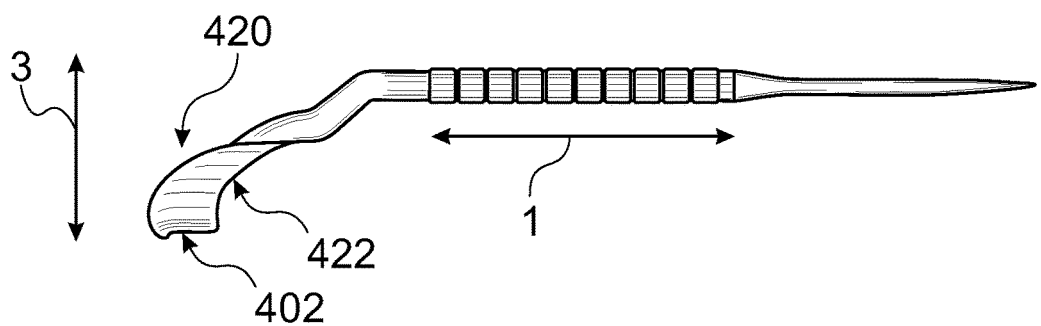
FIG. 4B is a side view of the dental tool of FIG. 4A.
Figure 4C:
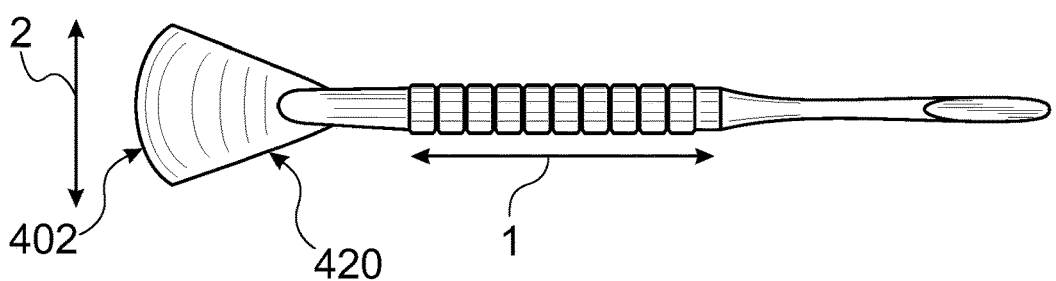
FIG. 4C is a top view of the dental tool of FIG. 4A.
Figure 4D:
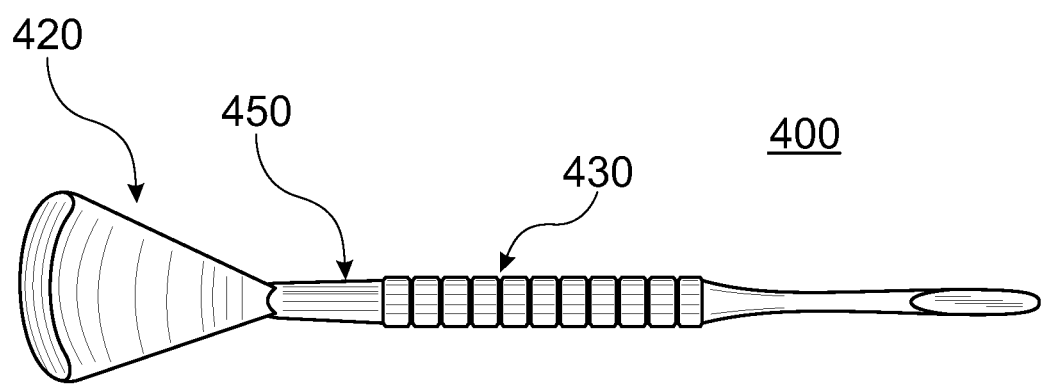
FIG. 4D is a bottom view of the dental tool of FIG. 4A.
Figure 4E:
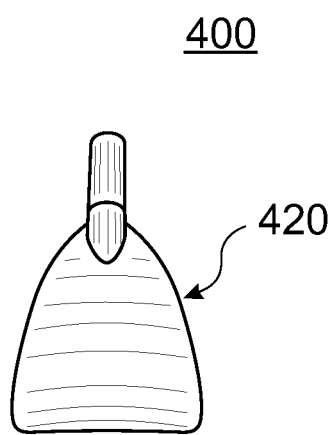
FIG. 4E is a top detailed view of a tongue retractor portion of the dental tool shown in FIG. 4A.
Figure 4F:
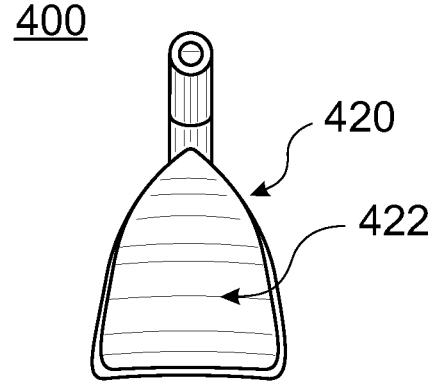
FIG. 4F is a bottom detailed view of a tongue refractor portion of the dental tool shown in FIG. 4A.

FIGS. 3A-3F illustrate another embodiment tool 300 having an S-shaped second neck region 350 coupling an operational unit 320, such as a tongue retractor 320 similar to the tongue retractor 120, to a handle region 330. In this embodiment the S-shaped second neck region 350 is bent both in the transverse plane (i.e., the plane as defined by longitudinal direction 1 and the transverse direction 3, best shown in FIG. 3B), and is also bent within the lateral plane (i.e., the plane as defined by longitudinal direction 1 and the lateral direction 2, best shown in FIG. 3C). Such lateral bending or offsets may accommodate the curvature of the mandible, which can be significant when working on the left or right side of the mandible, by using a correspondingly curved tool. Hence, it will be appreciated that tools herein may be provided that have predetermined bends to the right or left in the lateral direction 2 as needed based upon the intended working location in the mandible. The neck region 350 may include a first bend 352 and a second bend 354 (or a smoothly curved structure which functionally approximates such bends), and at least one of the bends 352 or 354 makes an angular offset in the lateral direction 2 so that the centerline of the operational unit 320 is laterally offset, both spatially and angularly, from the centerline of the handle region 330. In preferred embodiments, the second bend 354 (i.e, most distal bend) provides all of the lateral angling of the operational unit of the tool. The ventral, transverse displacement 3, both spatially and angularly, of the distal end 358 of the neck 350 with respect to the proximal end 351 of the neck 350 may be, for example, as discussed above with reference to the embodiments 100, 200. In addition, however, the distal end 358 of the neck 350 will have also gone through a lateral displacement 2. The spatial lateral displacement 2 of the distal end 358 of the neck 350 with respect to the proximal end 351 of the neck 350 may be, for example, from 5 mm to 30 mm, more preferably from 10 mm to 20 mm, more preferably about 15 mm, providing a corresponding spatial lateral displacement of the operational unit 320 with respect to the handle region 330. The angular lateral displacement of the distal end 358 of the neck 350 with respect to the proximal end 351 of the neck 350 (and thus the longitudinal direction 1 and the handle region 330) may be, for example, from 0 to 90 degrees, more preferably from 20 to 40 degrees, more preferably about 22 or 33 degrees, providing a corresponding angular lateral displacement of the operational unit 320 with respect to the handle region 330. Although in preferred embodiments the most distal bend 354F provides the total angular lateral displacement of the operational unit 320, in other embodiments each bend 352, 354 may provide part of the total angular lateral displacement of the operational unit 320. In such designs the neck region 350 is S-shaped in the transverse plane (as shown in FIG. 3B) but is C-shaped (if both bends 352, 354 have lateral angular displacements) or L-shaped (if only one bend 352, 354 has a lateral angular displacement) in the lateral plane (as shown in FIG. 3C). Such C-shaped or L-shaped curvatures may be considered "concave curvatures" for purposes of this disclosure. Other designs are certainly possible, however, such as designs in which one bend 352 or 354 increases the lateral angular displacement while another bend 354 or 352 reduces the lateral angular displacement, so that the neck 350 is S-shaped in both the transverse and lateral planes.

The embodiment neck design 350 allows the Dentist to utilize the tool 300 in a dramatically less awkward fashion, in particular allowing the Dentist to navigate the tool 300 on one particular side of the mandible. Furthermore, this neck design 350 allows a Dentist to reduce or eliminate the need for twisting or turning of the torso, upper extremities (e.g., the arm and hand), and head and neck in an effort to use the tool 300.

FIGS. 4A-4F illustrate a fourth embodiment tool 400, having an embodiment tongue retractor 420 coupled via a neck region 450 to a handle region 430. The neck region 450 may be, for example, S-shaped in the transverse plane (defined by arrows 1 and 3) but straight in the lateral plane (defined by arrows 1 and 2). The embodiment tongue retractor 420 is similar to the embodiment tongue retractor 120 in terms of spatial extents but further includes an exaggerated concavity towards its distal lip 402. In particular, when viewed in the transverse plane, as in FIG. 4B, the tongue retractor 420 has a curved shape in which the majority of the curvature occurs in the most distal third of the retractor 420, thereby forming a more pronounced concavity for the ventral surface 422 that terminates in lip 402, in which lip 402 is angled from 45 to 170 degrees with respect to the lateral plane, more preferably from 85 to 150 degrees, and more preferably still at about 110 to 130 degrees with respect to the lateral plane, so that, in effect, the tongue retractor 420 curves back upon itself.

Figure 5A:
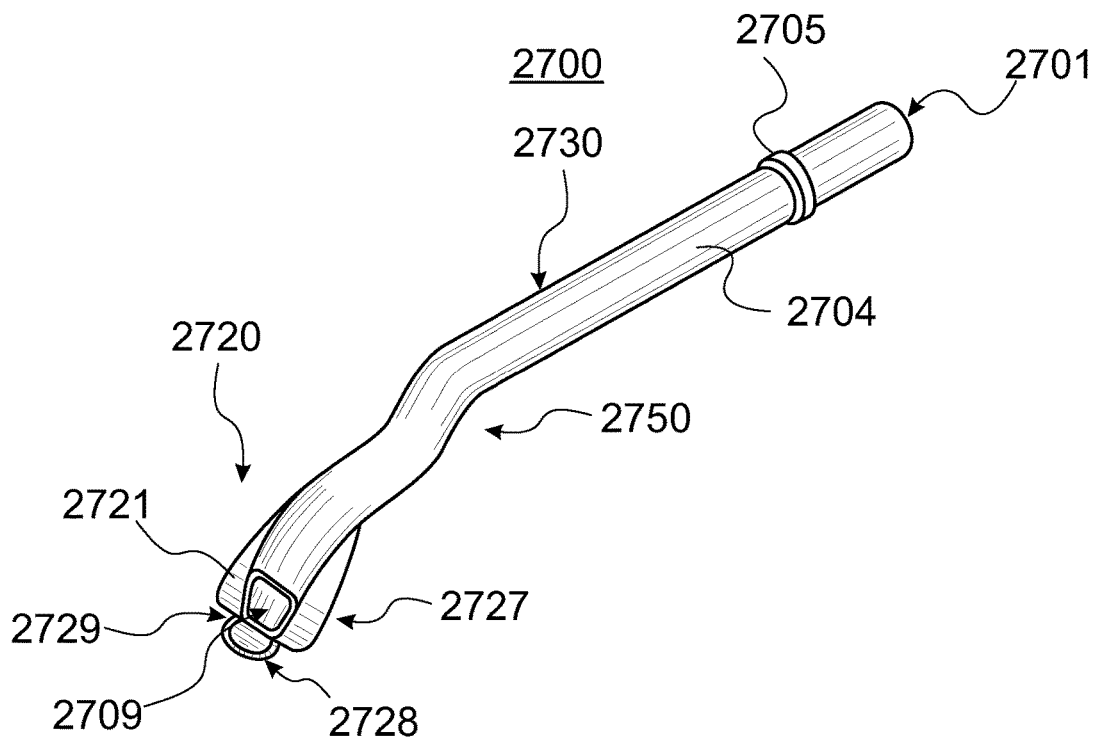
FIG. 5A is a perspective view of a fifth embodiment dental tool.
Figure 5B:
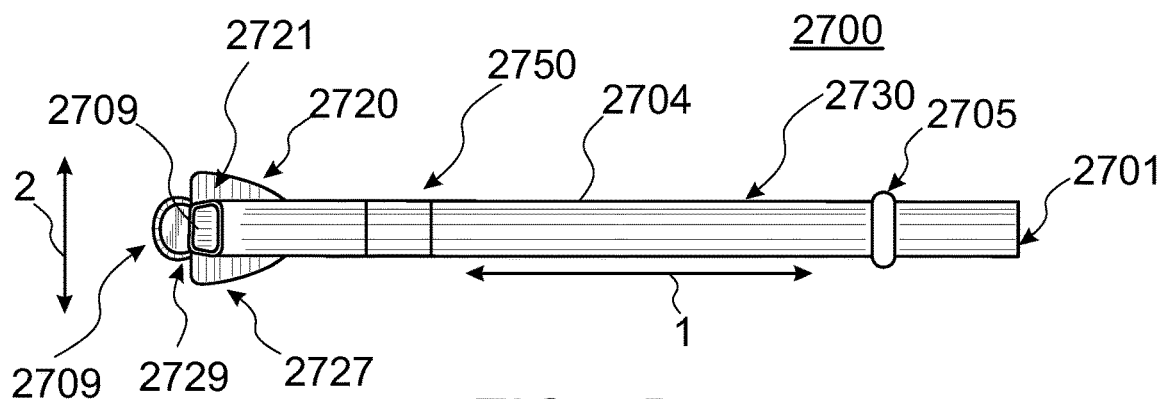
FIG. 5B is a top view of the dental tool of FIG. 5A.
Figure 5C:
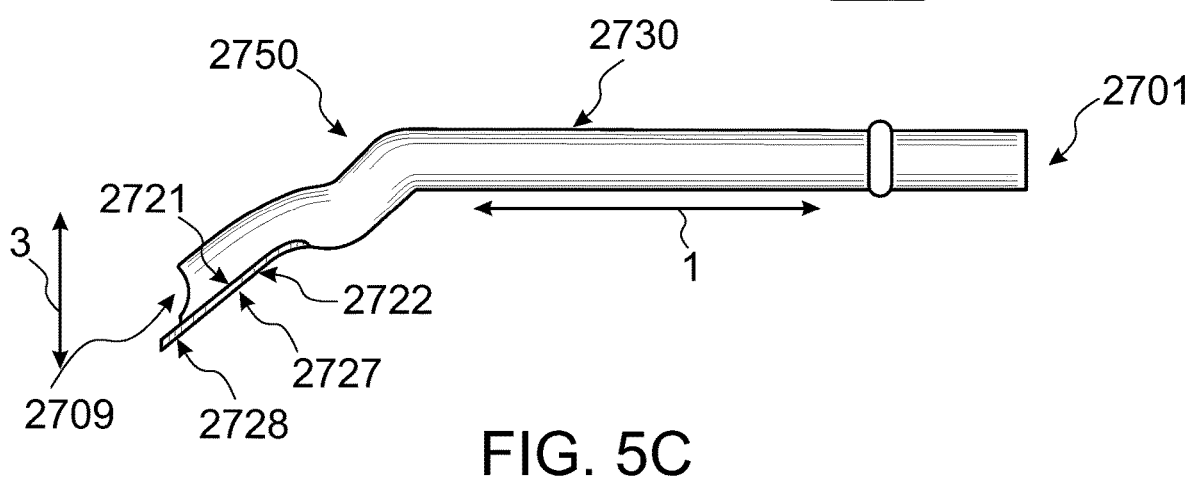
FIG. 5C is a side view of the dental tool of FIG. 5A.
Figure 5D:
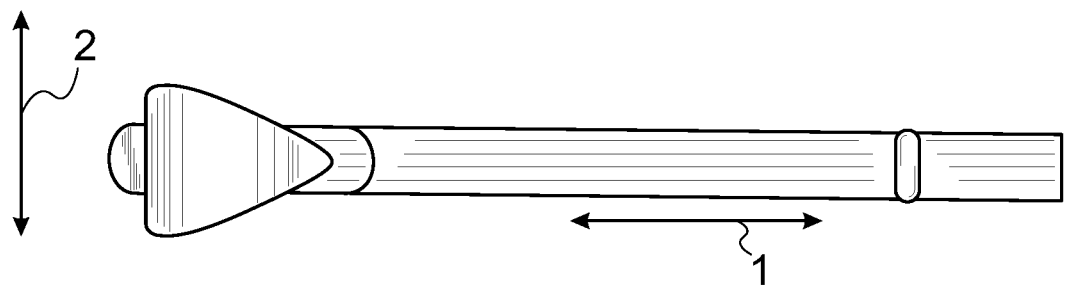
FIG. 5D is a bottom view of the dental tool of FIG. 5A.
Figures 5E, 5F:
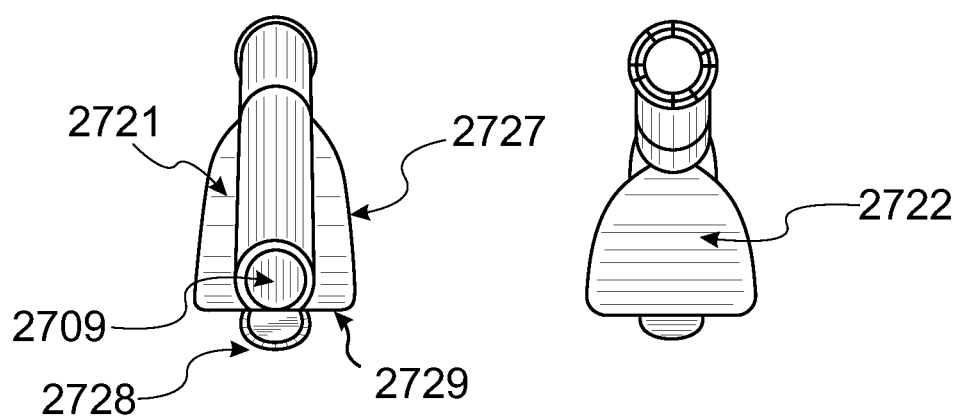
FIG. 5E is a front view of the dental tool shown in FIG. 5A.
FIG. 5F is a back view of the dental tool shown in FIG. 5A.

FIGS. 5A-5F illustrate a fifth embodiment tool 2700 that combines tongue and flap retraction with a suction device. Preferably the device 2700 is integrally formed from any suitable material, such as plastic, and is disposable. The multi-purpose tool 2700 includes a hollow, tubular portion 2704 that terminates in a distal end 2702 with a combined tongue and flap retractor 2720. The tubular section 2704 may have any suitable cross-sectional shape, such as rectangular, elliptical, hexagonal, octagonal or, as shown in FIGS. 5A-5F, substantially round; this cross-sectional shape may change from the proximal end 2701 to the distal end 2702. The proximal end 2701 of the tubular section 2704 is preferably round to accept a standard vacuum-providing hose and includes a stop ring 2705. A neck region 2750 of the tubular section 2704 connects the distal end 2702, and in particular the combined tongue and flap refractor 2720, to a handle region 2730. As shown in FIG. 5C, the neck region 2750 may be S-shaped in the transverse plane (defined by the longitudinal direction 1 and the transverse direction 3), and straight in the lateral plane (defined by the longitudinal direction and the transverse direction 2).

The combined tongue and flap retractor 2720 may include a tongue retractor portion 2727 and a flap retractor portion 2728 as previously described in relation to other embodiment devices. A flap retractor portion 2728, centrally aligned with the tongue retractor portion 2727, extends from the distal end 2729 of the tongue retractor portion 2727. The flap retractor portion 2728 may have dimensions as disclosed herein with respect to other embodiment flap retractors and flap retractor portions. In the embodiment shown, for example, in FIG. 5C, the flap retractor portion 2728 is co-planar with the tongue retractor portion 2727, but, as previously disclosed, the flap retractor portion 2728 may have a different angle with respect to the plane of the tongue retractor portion 2727.

A ventral surface 2722 of the tongue retractor portion 2727 is used to directly contact the tongue of the patient. A distal end region of tubular section 2704 is wholly disposed on top of and coupled to the dorsal surface 2721 of the tongue retractor portion 2727, with the opening 2709 of the distal end 2702 terminating at the distal edge 2729 of the tongue retractor portion 2727, and thus, in certain embodiments, proximally to the flap retractor 2728. The opening 2709 may be, for example, from 5 mm to 15 mm, preferably about 12 mm wide, with the height of the opening 2709 being from 5 to 15 mm, preferably about 10 mm.

Figure 6A:
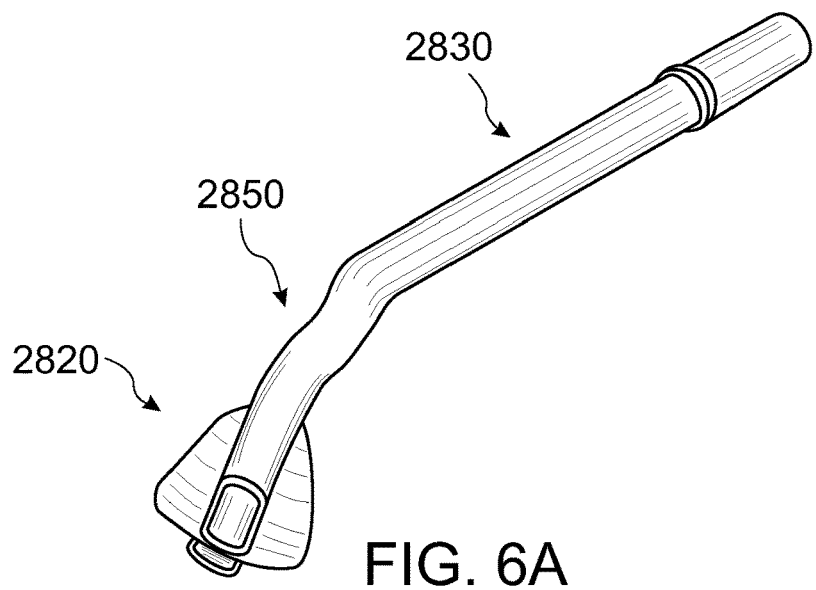
FIG. 6A is a perspective view of a sixth embodiment dental tool.
Figure 6B:
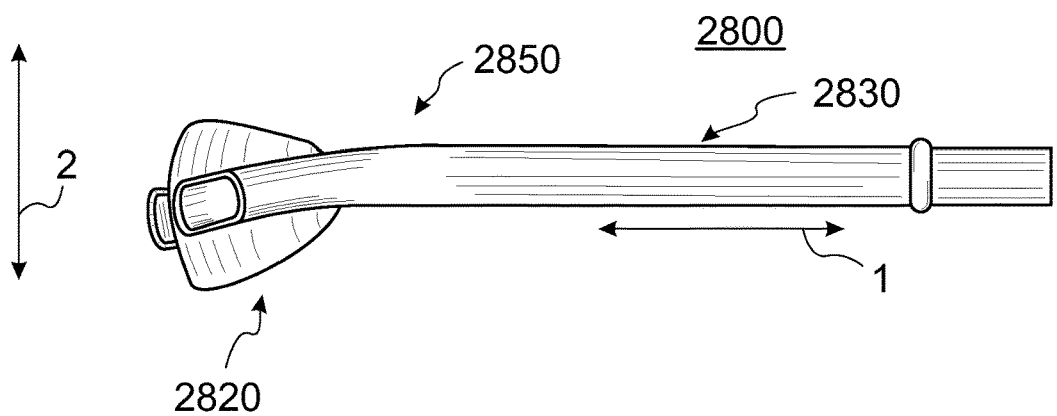
FIG. 6B is a top view of the dental tool of FIG. 6A.
Figure 6C:
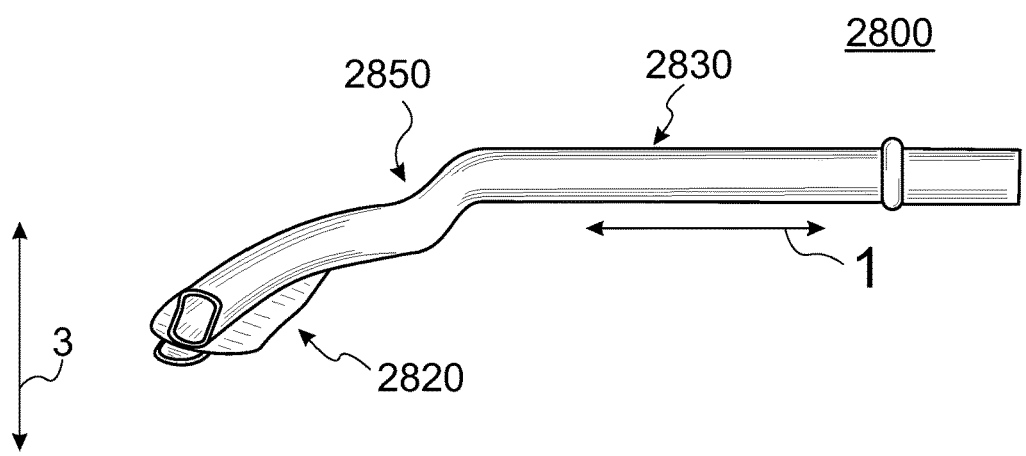
FIG. 6C is a left side view of the dental tool of FIG. 6A.
Figure 7A:
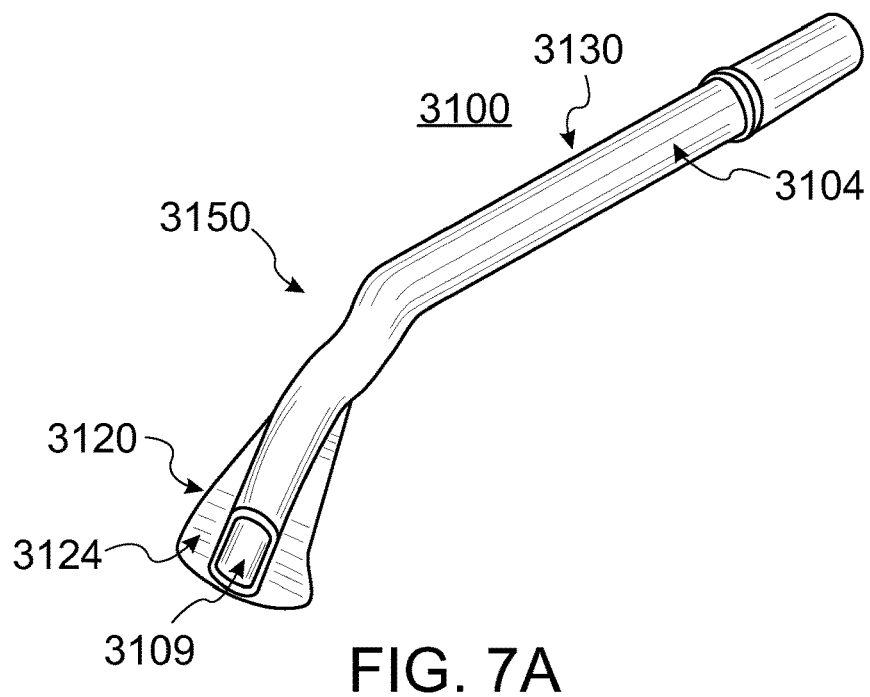
FIG. 7A is a perspective view of a seventh embodiment dental tool.
Figure 7B:
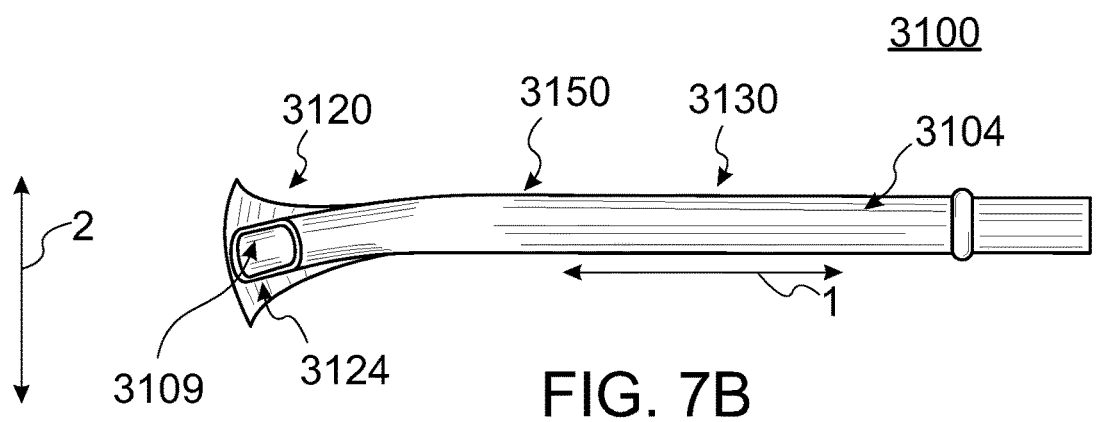
FIG. 7B is a top view of the dental tool of FIG. 7A.
Figure 7C:
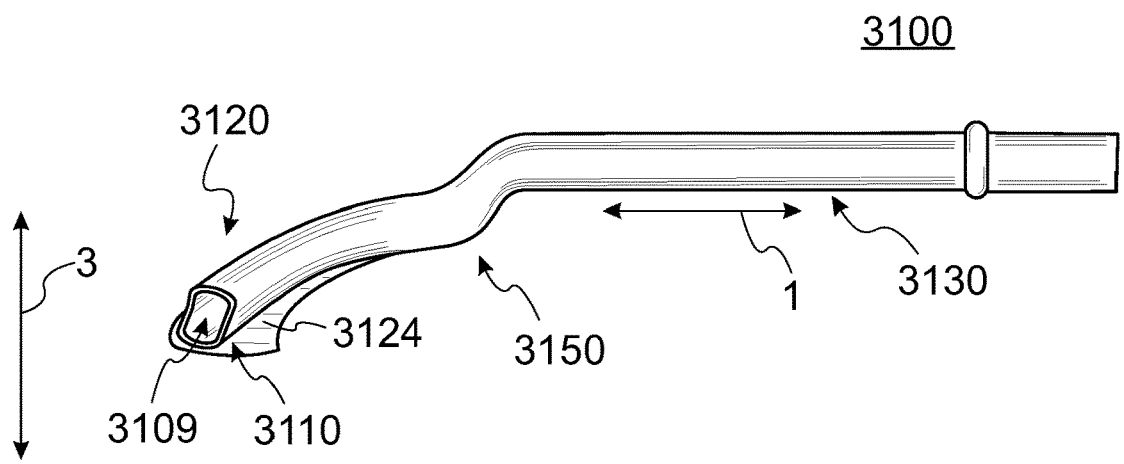
FIG. 7C is a left side view of the dental tool of FIG. 7A.
Figure 7D:
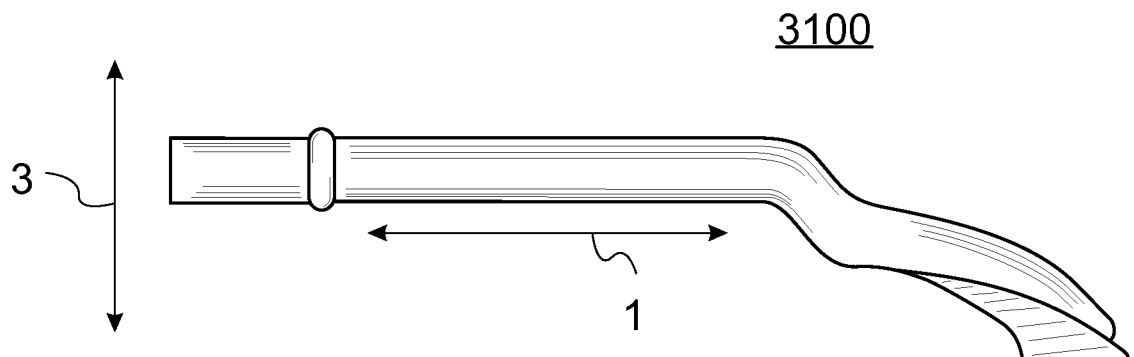
FIG. 7D is a right side view of the dental tool of FIG. 7A.
Figure 7E:
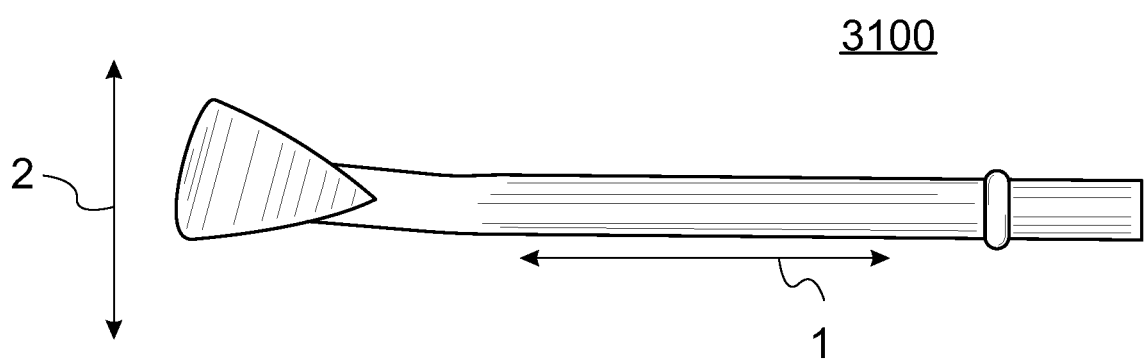
FIG. 7E is a bottom view of the dental tool of FIG. 7A.
Figure 7F:
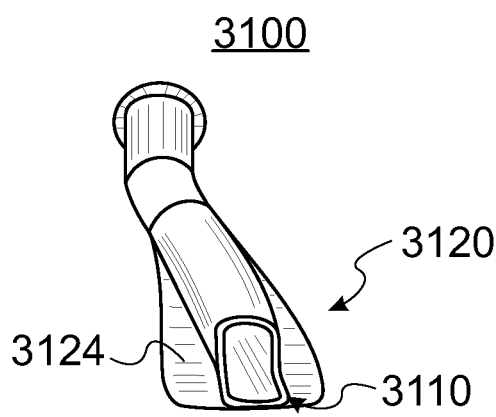
FIG. 7F is a front view of the dental tool shown in FIG. 7A.
Figure 7G:
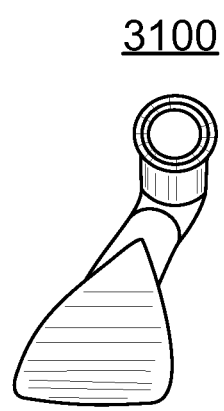
FIG. 7G is a back view of the dental tool shown in FIG. 7A.

FIGS. 6A-6G illustrate a sixth embodiment multi-purpose tool 2800, having a combined tongue and flap retractor 2820 similar to the embodiment multi-purpose tool 2700 above but which is slightly curved rather than flat, which is coupled to the handle region 2830 by way of a neck region 2850 that is S-shaped in the transverse plane (defined by the longitudinal direction 1 and the transverse direction 3, as shown in FIG. 6C), but which is L-shaped in the lateral plane (defined by the longitudinal direction 1 and the lateral direction 2, as shown in FIG. 6B). This lateral displacement may be either to the right or to the left based upon the working area in the mandible, and the lateral angular offset is preferably 22 degrees or 33 degrees from the longitudinal axis.

FIGS. 7A-7G illustrate a seventh embodiment combined tongue retractor with suction tool 3100, which combines tongue retraction with a suction device. Preferably the device 3100 is integrally formed from any suitable material, such as plastic, and is disposable, as with the above multi-purpose devices. However, non-disposable devices are also contemplated, such as devices made from stainless steel or any other suitable material. The tool 3100 includes a hollow, tubular portion 3104 similar to the tubular portions discussed above. The neck region 3150 may be S-shaped in the transverse plane (defined by the longitudinal direction 1 and the transverse direction 3), C-shaped in the lateral plane (defined by the longitudinal direction 1 and the transverse direction 2), and connects the operational unit 3120 on the distal end to the handle region 3130. It will be appreciated, however, that the device could also be straight in the lateral plane. The operational unit 3120 is a tongue retractor 3124 in combination with a suction opening 3109. The tongue retractor 3124 may have a shape that is similar to the tongue retractor 400 discussed in relation to FIGS. 4A-4F, and thus has an exaggerated concavity, with the majority (i.e., 50% or more) of the curvature in the transverse direction 3 defining the cavity being within the last third or less of the longitudinal length of the retractor 3124. A lower lip 3110 of the distal end region of tubular section 3104 is disposed on top of and coupled to the dorsal surface of the tongue retractor 3124, so that opening 3109 is disposed just above the region in which the majority of the curvature occurs in the refractor 3124—i.e., just above the most distal third of the retractor 3124 and so is substantially aligned with the most distal extents of the tongue retractor 3124.

FIGS. 8A-8E illustrate an eighth embodiment of a combined tongue retractor with suction tool or device 3200. Preferably the device 3200 is integrally formed from any suitable material, such as plastic, and is disposable. The multi-purpose tool 3200 includes a hollow, tubular portion that terminates in a distal end with a combined tongue retractor. The tubular section may have any suitable cross-sectional shape, such as rectangular, elliptical, hexagonal, octagonal or, substantially round; this cross-sectional shape may change from the proximal end to the distal end. The proximal end of the tubular section is preferably round to accept a standard vacuum-providing hose, i.e., a high volume evacuator (HVE) adapter, and includes a stop ring.

The combined tool 3200 includes a handle portion 3202 and an angled neck portion 3204 arranged distally of the handle portion 3202. The suction portion of the tool is provided in one embodiment by having a hollow passageway through the handle 3202 and the neck portion 3204 such that a suction mechanism applied proximal to the handle 3202 results in a suction force available at the distal tip 3206 of the neck portion 3204. Arranged along the neck portion 3204 is a retractor 3208, which may, for example, be a tongue retractor. Alternatively, the retractor may be any other type of retractor useful in dental procedures, such as a lip retractor.

Figure 8A:
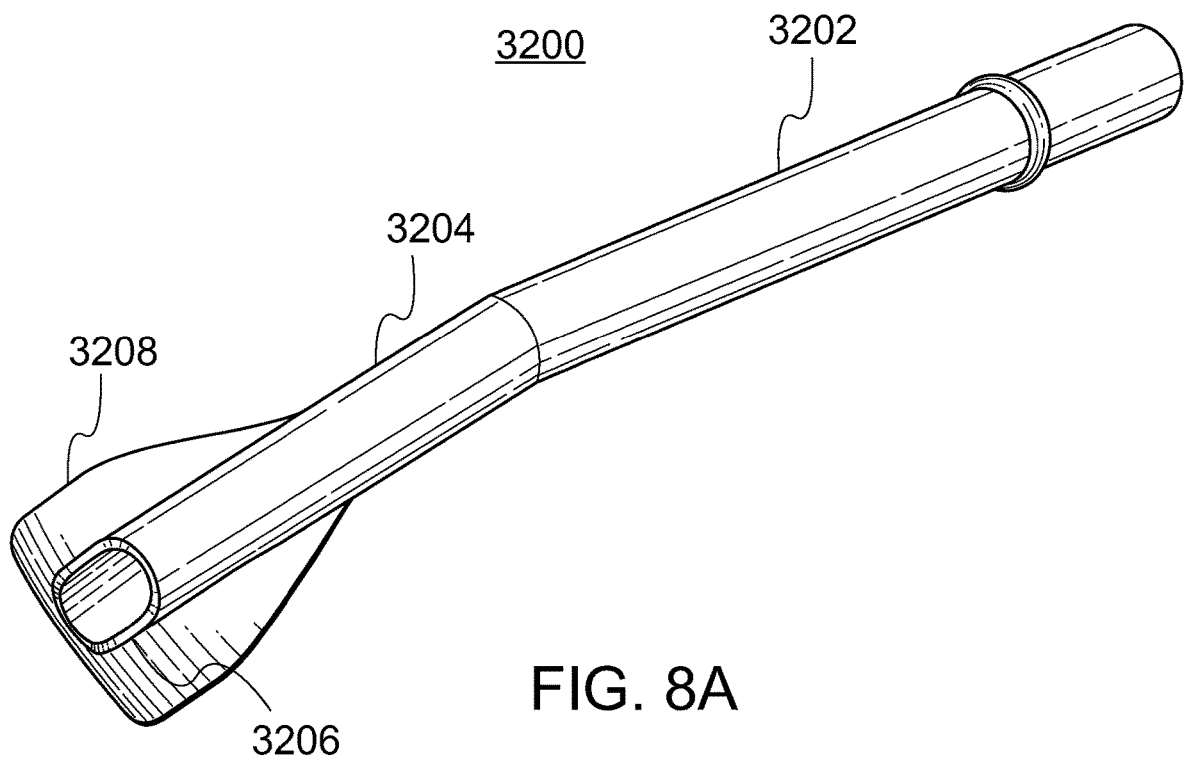
FIG. 8A is a perspective view of an eighth embodiment dental tool.
Figure 8B:
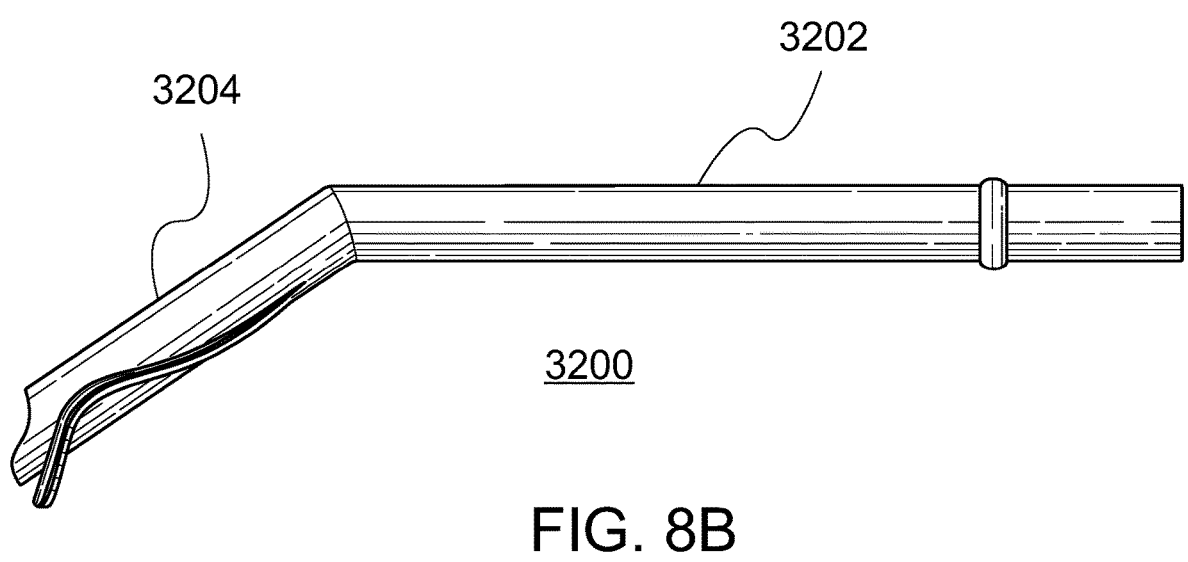
FIG. 8B is a side view of the dental tool of FIG. 8A.
Figure 8C:
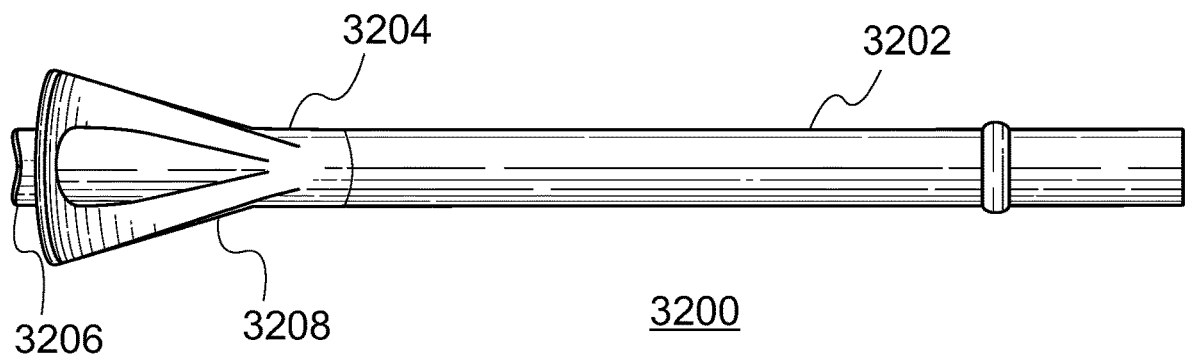
FIG. 8C is a bottom view of the dental tool of FIG. 8A.

As seen in FIG. 8B and FIG. 8C, the retractor 3208 extends from either side of the neck portion 3204 and flares out in width, extending to its maximal width near the distal tip 3206 of the neck portion 3204. As shown in FIG. 8B, the side profile of the distal tip 3206 is not straight or even. Rather, the distal tip 3206 may be curved or sinuous and extends further distally at a lower side of the distal tip 3206 near where the retractor 3208 is positioned. The top side of the distal tip 3206 is recessed relatively inward in a proximal direction with respect to the lower side of the distal tip 3206. In this way, the distal tip 3206 may be advantageously positioned to provide more efficient suction in various regions of the mouth and can be positioned to better match or align with the various structures found within the mouth, such as teeth, gums, etc. As seen in FIG. 8B, the retractor 3208 starts out at near a proximal end of the neck region 3204 where it is close to the bottom edge of the neck region 3204. Travelling distally, the retractor 3208 extends slightly upward so as to be near a midpoint of the height of the neck region 3204, and from there, the retractor extends distally almost in a straight line to its most distal point. This upward and then downward profile of the retractor 3208 creates a shape that allows it to encapsulate a structure, such as the tongue, which is to be retracted.

Figure 8D:
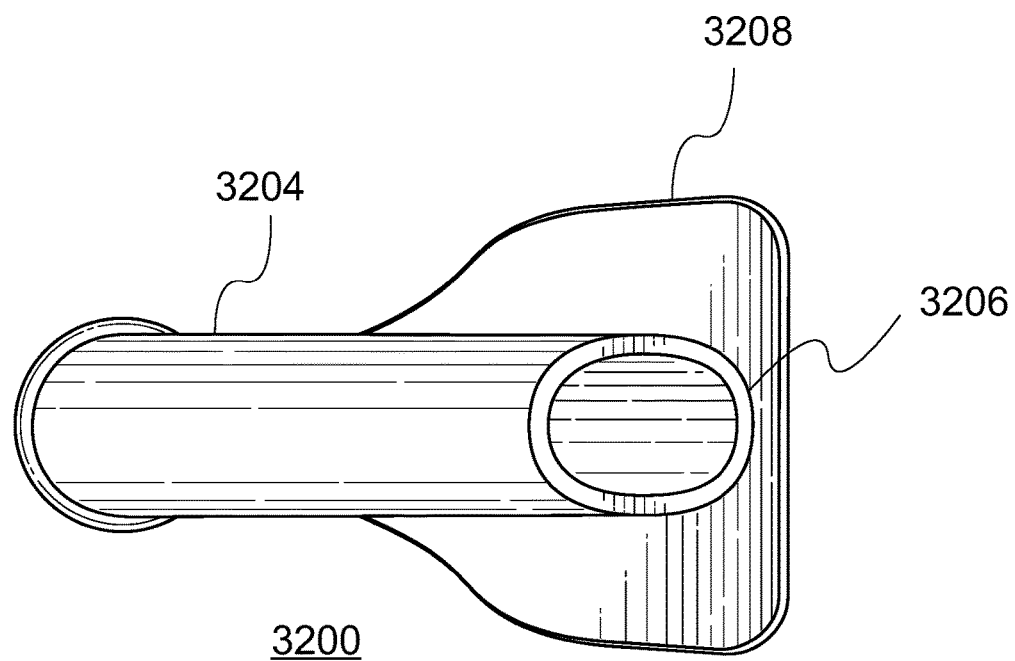
FIG. 8D is a front view of the dental tool of FIG. 8A.

As shown in FIG. 8C, the distal tip 3206 extends more distally with respect to the retractor 3208. In this way, the distal tip 3206 may be positioned to provide more efficient suction in an area adjacent to where the retractor is being used to retract a particular mouth structure, e.g., the tongue or lip. This relative distal-proximal relationship between the distal tip 3206 and the retractor 3208 is also illustrated in FIG. 8D.

Figure 8E:
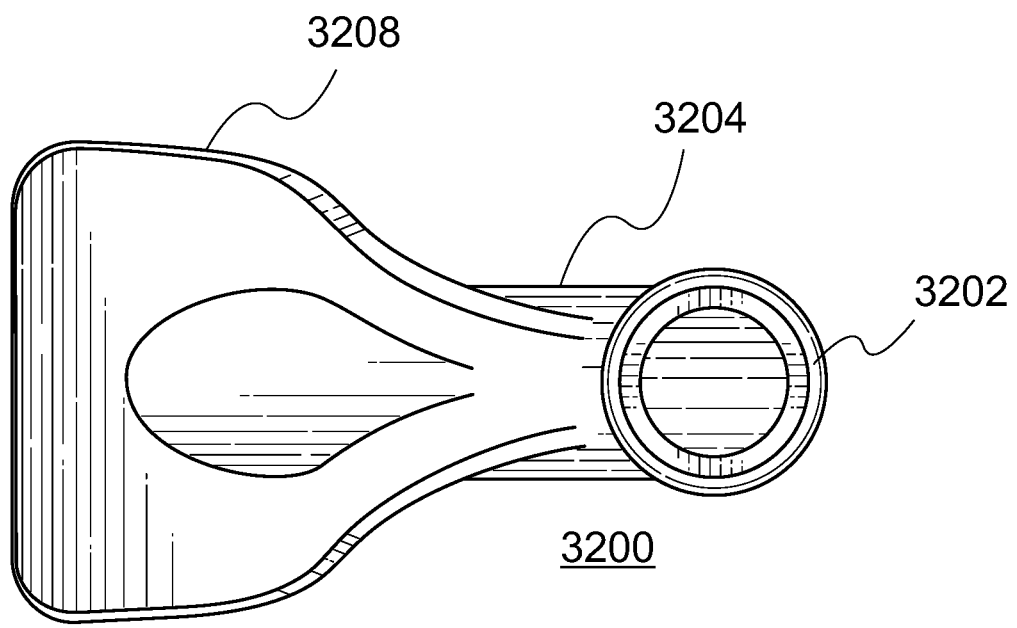
FIG. 8E is a back view of the dental tool of FIG. 8A.

Finally, as shown in FIGS. 8B and 8E, near the distal end of the neck region 3204, the retractor 3208 extends lower or further downward than the distal tip 3206. An advantage of this relative positioning is that the lower portion of the dental tool 3200 which contains the retractor 3208 may be easily and freely positioned within the mouth without being constrained or limited by the positioning of the distal tip 3206 which provides the suction. In other words, the retractor 3208 may be positioned in a conventional manner as if the suction tip is not even there. The lower position of the retractor in this embodiment enables the tongue or the lip to be sequestered away from the operational field, and allow unimpeded suction.

FIGS. 9A-9E illustrate a ninth embodiment of a combined tongue retractor with suction tool 3250. Preferably the device 3250 is integrally formed from any suitable material, such as plastic, and is disposable. The multi-purpose tool 3250 includes a hollow, tubular portion that terminates in a distal end with a combined tongue retractor. The tubular section may have any suitable cross-sectional shape, such as rectangular, elliptical, hexagonal, octagonal or, substantially round; this cross-sectional shape may change from the proximal end to the distal end. The proximal end of the tubular section is preferably round to accept a standard vacuum-providing hose, i.e., a high volume evacuator (HVE) adapter, and includes a stop ring.

Figure 9A:
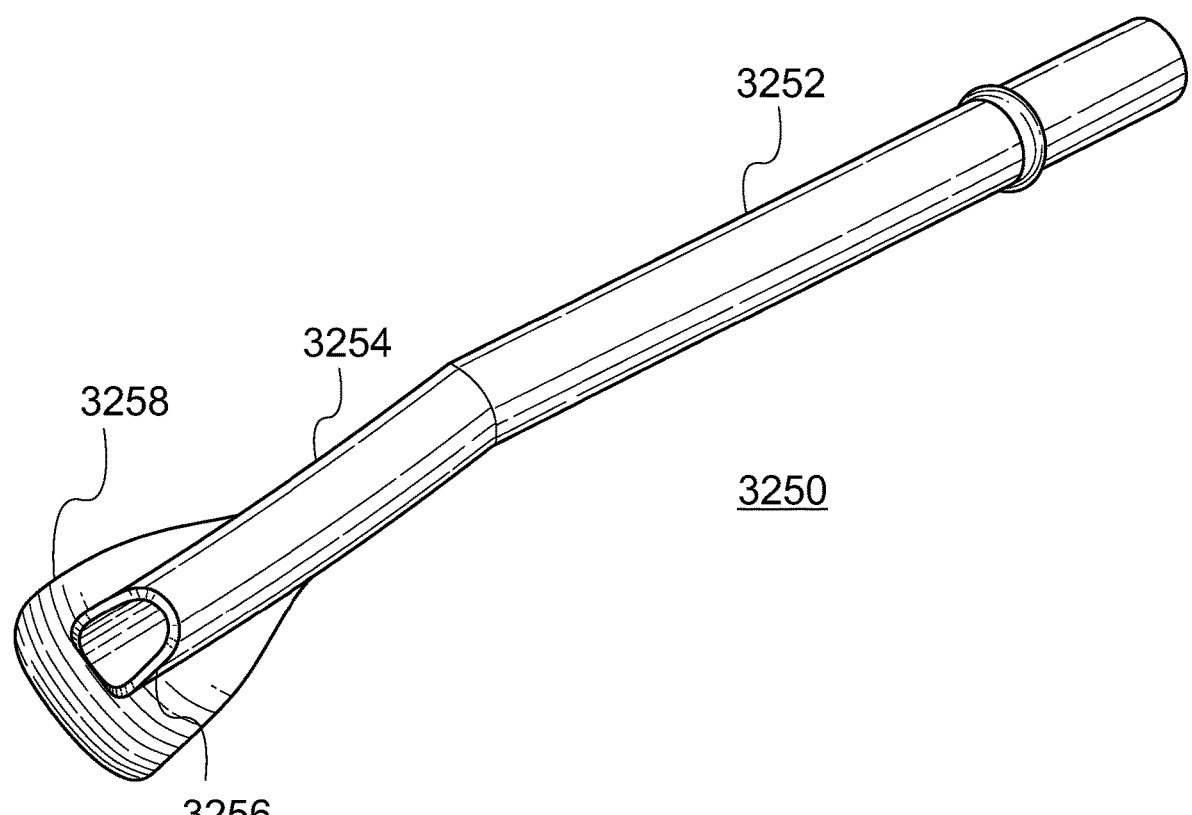
FIG. 9A is a perspective view of a ninth embodiment dental tool.
Figure 9B:
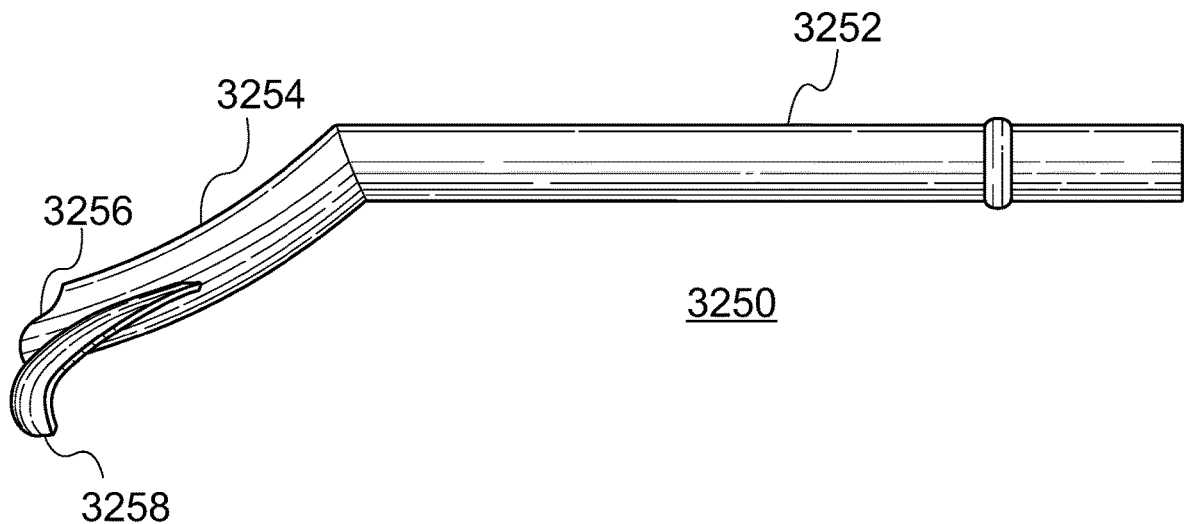
FIG. 9B is a side view of the dental tool of FIG. 9A.

The combined tool 3250 includes a handle portion 3252 and an angled neck portion 3254 arranged distally of the handle portion 3252. As shown in FIG. 9B, the neck portion 3254 is not straight as was the case with the neck portion 3204 of the embodiment tool of FIGS. 8A-8E. Rather, in the embodiment of FIG. 9B, the neck portion is slightly curved as it extends from the distal tip of the handle 3252 towards the ultimate distal tip of the tool 3250. An advantage of this curved neck portion 3254 is that it provides increased visibility for the dental professional while using the tool. The suction portion of the tool is provided in one embodiment by having a hollow passageway through the handle 3252 and the neck portion 3254 such that a suction mechanism applied proximal to the handle 3252 results in a suction force available at the distal tip 3256 of the neck portion 3254. Arranged along the neck portion 3254 is a retractor 3258, which may, for example, be a tongue retractor. Alternatively, the retractor may be any other type of retractor useful in dental procedures.

Figure 9C:
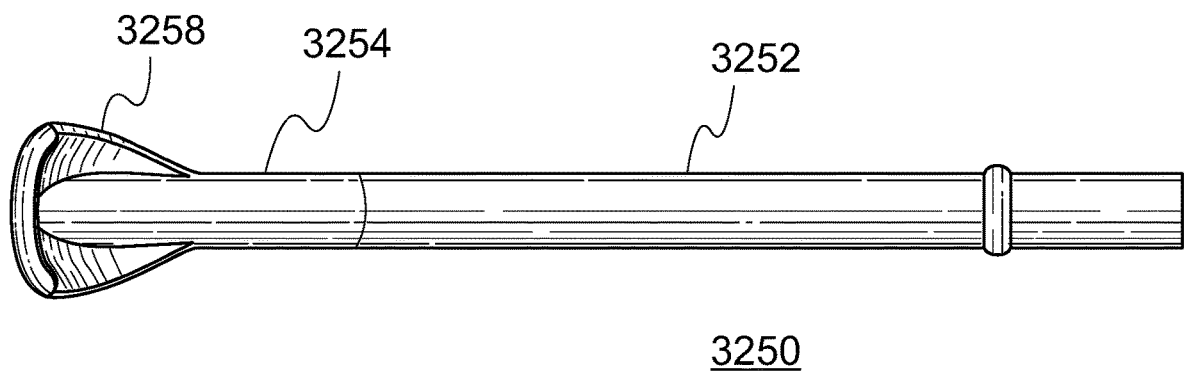
FIG. 9C is a bottom view of the dental tool of FIG. 9A.

As seen in FIG. 9B and FIG. 9C, the retractor 3258 extends from either side of the neck portion 3254 and flares out in width, extending to its maximal width near the distal tip 3256 of the neck portion 3254. In contrast with the retractor 3208 of the embodiment of FIGS. 8A-8E, the retractor 3258 of FIG. 9B has a shorter longitudinal extent. As can be seen in FIG. 9B, the retractor 3258 starts almost at a longitudinal midpoint of the neck region 3254, whereas in FIG. 8B, the retractor there starts much closer to the proximal end of the neck region 3254 which abuts the distal end of the handle 3202. An advantage of the retractor 3258 of FIG. 9B is that the concave shape of the retractor provides superior retraction of the tongue by better encapsulation. As shown in FIG. 9B, the side profile of the distal tip 3256 is not straight or even. Rather, the distal tip 3256 may be curved or sinuous and extends further distally at a lower side of the distal tip 3256 near where the retractor 3258 is positioned. The top side of the distal tip 3256 is recessed relatively inward in a proximal direction with respect to the lower side of the distal tip 3256. In this way, the distal tip 3256 may be advantageously positioned to provide more efficient suction in various regions of the mouth and can be positioned to better match or align with the various structures found within the mouth, such as teeth, gums, etc. As seen in FIG. 9B, the retractor 3258 starts out at a middle part of the neck region 3254 where it is close to the midpoint of the height of the neck region 3254. Travelling distally, the retractor 3258 remains essentially parallel to the neck region 3254 and near its distal tip, the retractor curves downward and continues curving back on itself so as to create almost a C-shaped cross sectional cup area. The retractor also curves downward laterally thereby forming a concave shape in two intersecting directions as shown in FIG. 9c. This curved profile of the retractor 3258 creates a three-dimensional shape that allows it to better encapsulate a structure, such as the tongue, which is to be retracted.

Figure 9D:
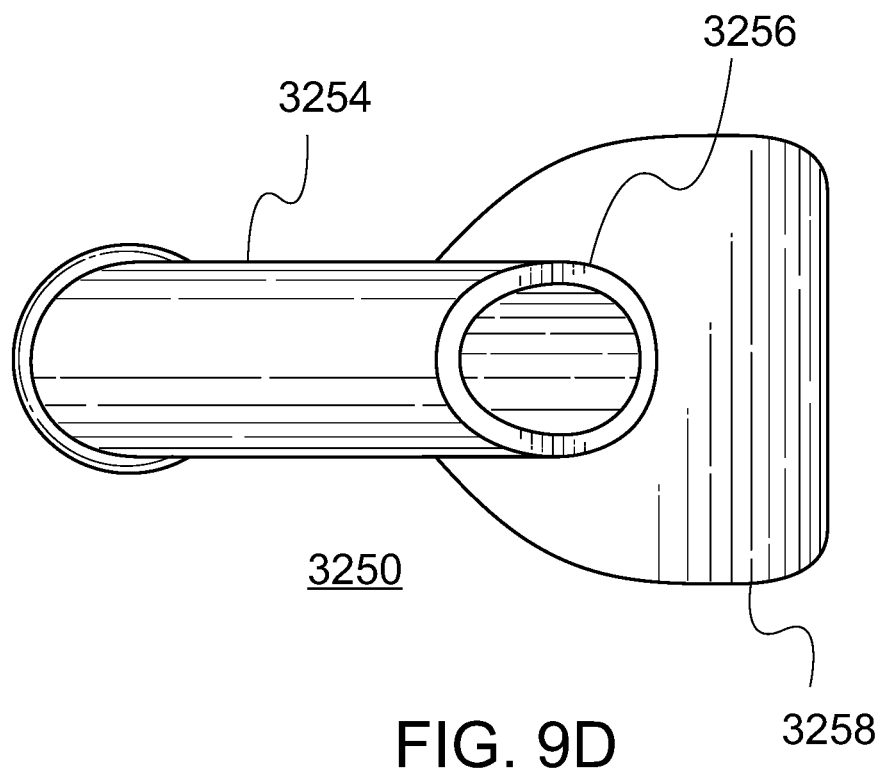
FIG. 9D is a front view of the dental tool of FIG. 9A.

As shown in FIG. 9C, the distal end of the retractor 3258 extends more distally with respect to the distal tip 3256. In this way, the distal tip 3256 may be positioned to provide more efficient suction in an area adjacent to where the retractor is being used to retract a particular mouth structure, e.g., the tongue. This relative distal-proximal relationship between the distal tip 3256 and the retractor 3258 is also illustrated in FIG. 9D.

Figure 9E:
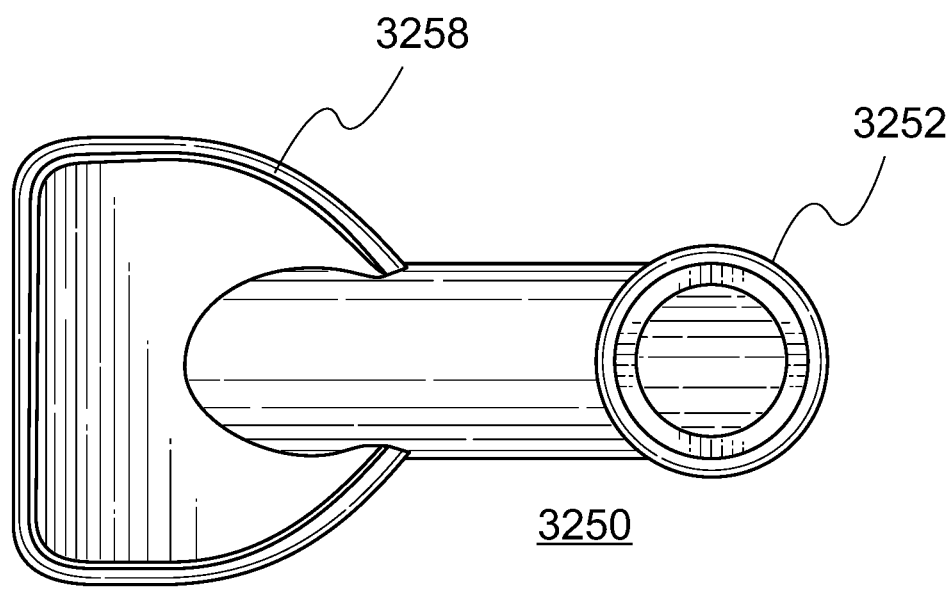
FIG. 9E is a back view of the dental tool of FIG. 9A.

Finally, as shown in FIGS. 9B and 9E, near the distal end of the neck region 3254, the retractor 3258 extends lower or further downward than the distal tip 3256. In comparison with the tool 3200 of FIGS. 8A-8E, the retractor 3258 of FIGS. 9A-9E extends even further downward in relation to the distal tip 3256. This allows better encapsulation and retraction of larger structures within the mouth, such as the tongue. An additional advantage of this relative positioning is that the lower portion of the dental tool 3250 which contains the retractor 3258 may be easily and freely positioned within the mouth without being constrained or limited by the positioning of the distal tip 3256 which provides the suction. In other words, the retractor 3258 may be positioned in a conventional manner as if the suction tip is not even there.

FIGS. 10A-10E illustrate a tenth embodiment of a combined tongue retractor with suction tool 3300. Preferably the device 3300 is integrally formed from any suitable material, such as plastic, and is disposable. The multi-purpose tool 3300 includes a hollow, tubular portion that terminates in a distal end with a combined tongue retractor. The tubular section may have any suitable cross-sectional shape, such as rectangular, elliptical, hexagonal, octagonal or, substantially round; this cross-sectional shape may change from the proximal end to the distal end. The proximal end of the tubular section is preferably round to accept a standard vacuum-providing hose, i.e., a high volume evacuator (HVE) adapter, and includes a stop ring.

The combined tool 3300 includes a handle portion 3302 and an angled neck portion 3304 arranged distally of the handle portion 3302. The tool 3300 of FIGS. 10A-10E is similar to that shown in FIGS. 9A-9E, except that in the tool of FIGS. 10A-10E, the neck portion 3304 is relatively straight and is not curved as that of FIGS. 9A-9E. Rather, in the embodiment of FIG. 10B, the neck portion is relatively straight as it extends from the distal end of the handle 3302 towards the ultimate distal end of the tool 3300. An advantage of this straight neck portion 3304 is that it allows the dental professional to more easily and more accurately position the tool while using the tool The suction portion of the tool is provided in one embodiment by having a hollow passageway through the handle 3302 and the neck portion 3304 such that a suction mechanism applied proximal to the handle 3302 results in a suction force available at the distal tip 3306 of the neck portion 3304. Arranged along the neck portion 3304 is a retractor 3308, which may, for example, be a tongue retractor. Alternatively, the retractor may be any other type of retractor useful in dental procedures, such as a lip retractor.

Figure 10A:
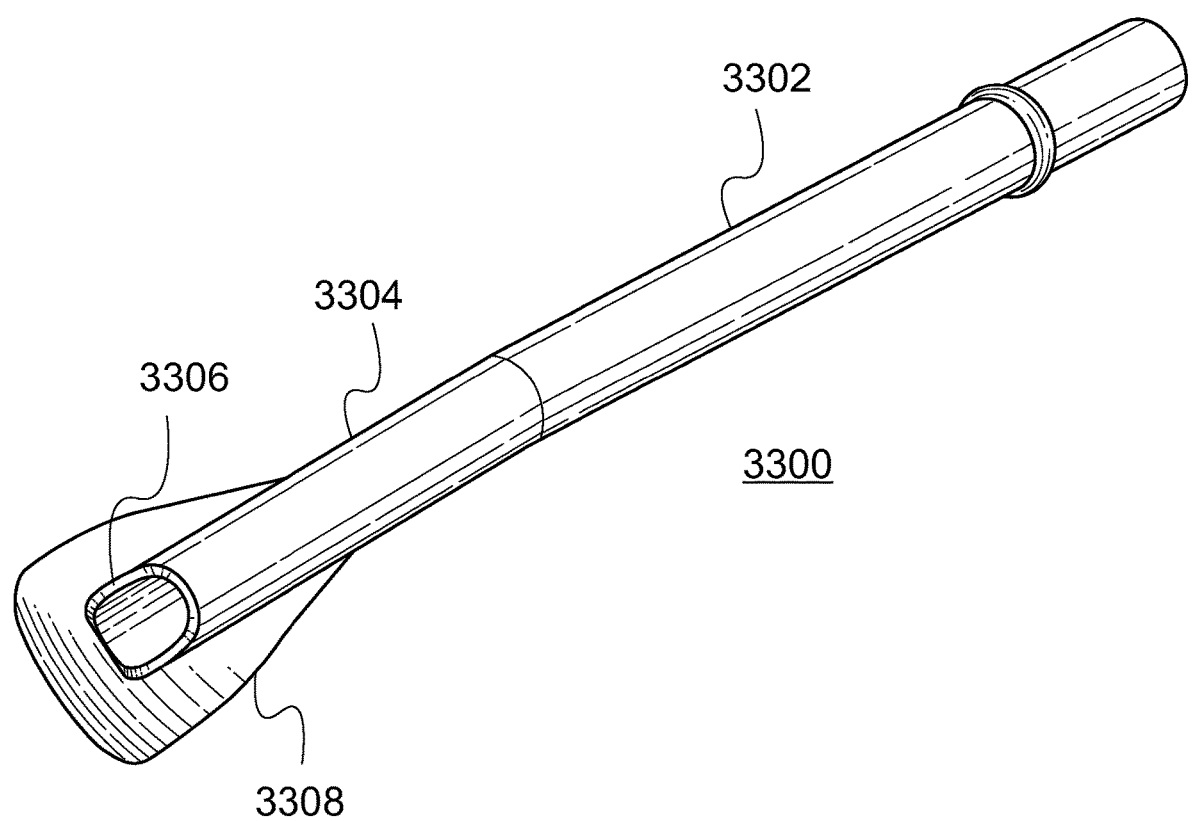
FIG. 10A is a perspective view of a tenth embodiment dental tool.
Figure 10B:
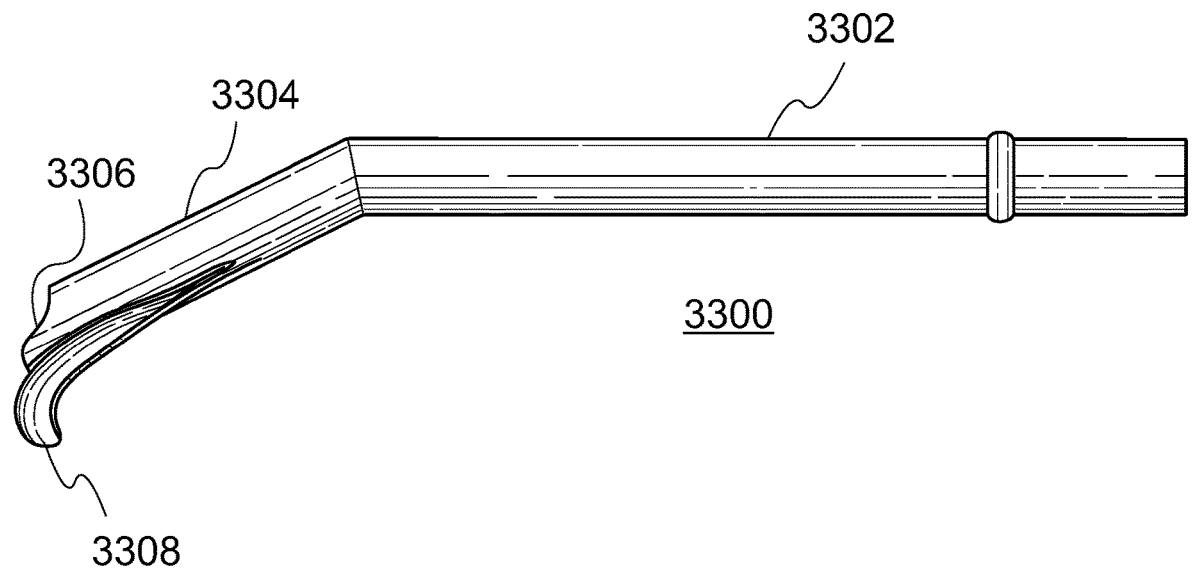
FIG. 10B is a side view of the dental tool of FIG. 10A.
Figure 10C:
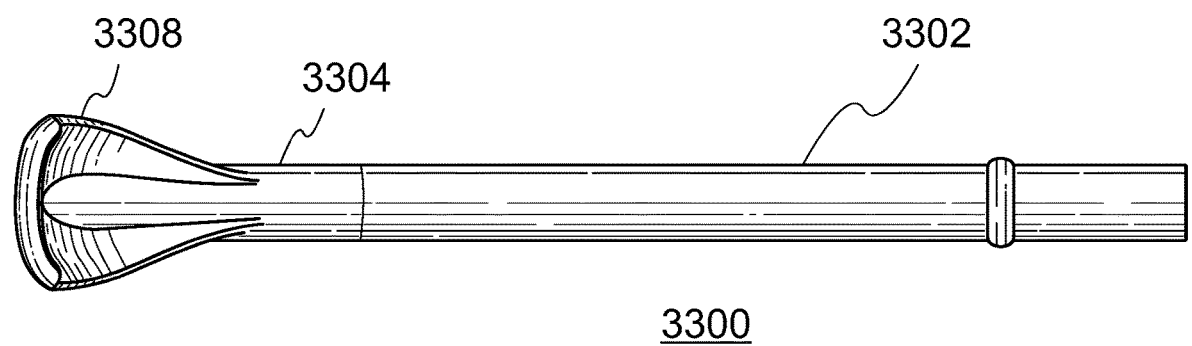
FIG. 10C is a bottom view of the dental tool of FIG. 10A.

As seen in FIG. 10B and FIG. 10C, the retractor 3308 extends from either side of the neck portion 3304 and flares out in width, extending to its maximal width near the distal tip 3306 of the neck portion 3304. In contrast with the retractor 3208 of the embodiment of FIGS. 8A-8E, the retractor 3308 of FIG. 10B has a shorter longitudinal extent. As can be seen in FIG. 10B, the retractor 3308 starts almost at a longitudinal midpoint of the neck region 3304, whereas in FIG. 8B, the retractor there starts much closer to the proximal tip of the neck region 3204 which abuts the distal tip of the handle 3202. An advantage of the retractor 3308 of FIG. 10B is that the concave shape of the retractor provides superior retraction of the tongue by better encapsulation. As shown in FIG. 10B, the side profile of the distal tip 3306 is not straight or even. Rather, the distal tip 3306 may be curved or sinuous and extends further distally at a lower side of the distal tip 3306 near where the retractor 3308 is positioned. The top side of the distal tip 3306 is recessed relatively inward in a proximal direction with respect to the lower side of the distal tip 3306. In this way, the distal tip 3306 may be advantageously positioned to provide more efficient suction in various regions of the mouth and can be positioned to better match or align with the various structures found within the mouth, such as teeth, gums, etc. As seen in FIG. 10B, the retractor 3308 starts out at a middle part of the neck region 3304 where it is closer to the bottom of the neck region 3304. Travelling distally, the retractor 3308 remains essentially parallel to the neck region 3304 and near its distal tip, the retractor curves downward and continues curving back on itself so as to create almost a C-shaped cross sectional cup area. This curved profile of the retractor 3308 creates a three-dimensional shape that allows it to better encapsulate a structure, such as the tongue, which is to be retracted.

Figure 10D:
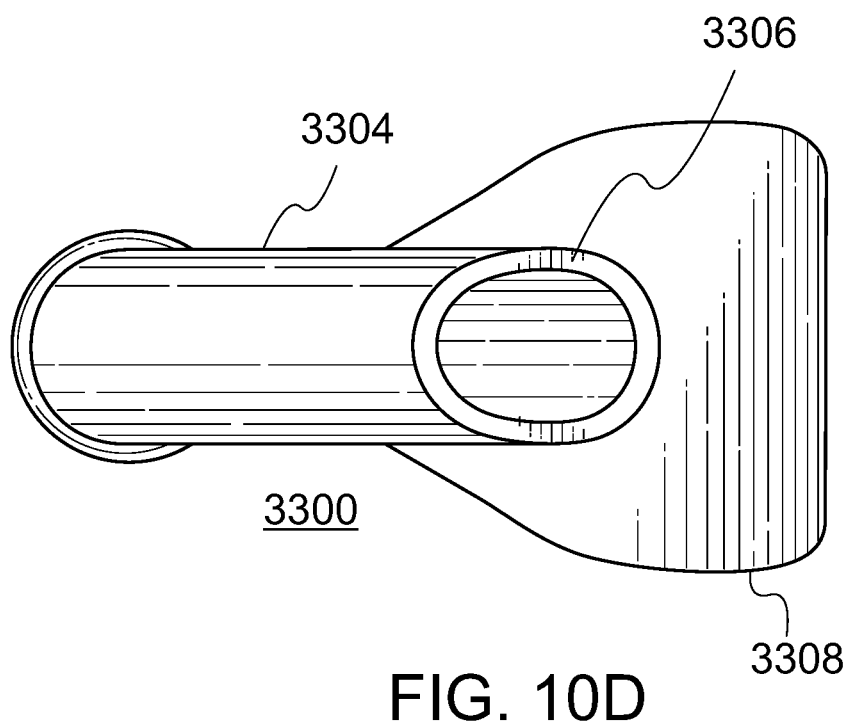
FIG. 10D is a front view of the dental tool of FIG. 10A.

As shown in FIG. 10B and FIG. 10C, the distal end of the retractor 3308 extends more distally with respect to the distal tip 3306. In this way, the distal tip 3306 may be positioned to provide more efficient suction in an area adjacent to where the retractor is being used to retract a particular mouth structure, e.g., the tongue. This relative distal-proximal relationship between the distal tip 3306 and the retractor 3308 is also illustrated in FIG. 10D.

Figure 10E:
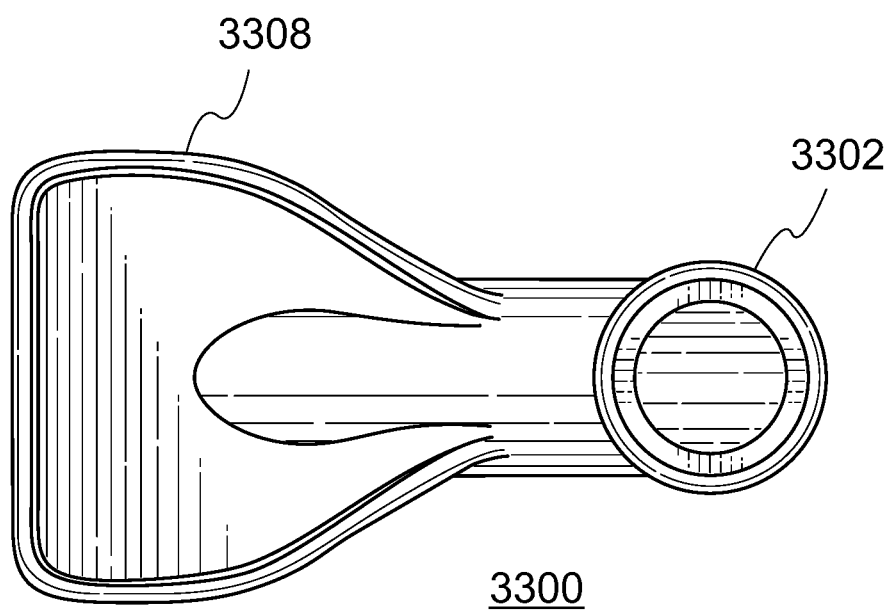
FIG. 10E is a back view of the dental tool of FIG. 10A.

Finally, as shown in FIGS. 10B and 10E, near the distal end of the neck region 3304, the retractor 3308 extends lower or further downward than the distal tip 3306. In comparison with the tool 3200 of FIGS. 8A-8E, the retractor 3308 of FIGS. 10A-10E extends even further downward in relation to the distal tip 3306. This allows better encapsulation and retraction of larger structures within the mouth. An additional advantage of this relative positioning is that the lower portion of the dental tool 3300 which contains the retractor 3308 may be easily and freely positioned within the mouth without being constrained or limited by the positioning of the distal tip 3306 which provides the suction. In other words, the retractor 3308 may be positioned in a conventional manner as if the suction tip is not even there.

FIGS. 11A-11E illustrate an eleventh embodiment of a combined tongue retractor with suction tool 3350. Preferably the device 3350 is integrally formed from any suitable material, such as plastic, and is disposable. The multi-purpose tool 3350 includes a hollow, tubular portion that terminates in a distal end with a combined lip retractor. The tubular section may have any suitable cross-sectional shape, such as rectangular, elliptical, hexagonal, octagonal or, substantially round; this cross-sectional shape may change from the proximal end to the distal end. The proximal end of the tubular section is preferably round to accept a standard vacuum-providing hose, i.e., a high volume evacuator (HVE) adapter, and includes a stop ring.

Figure 11A:
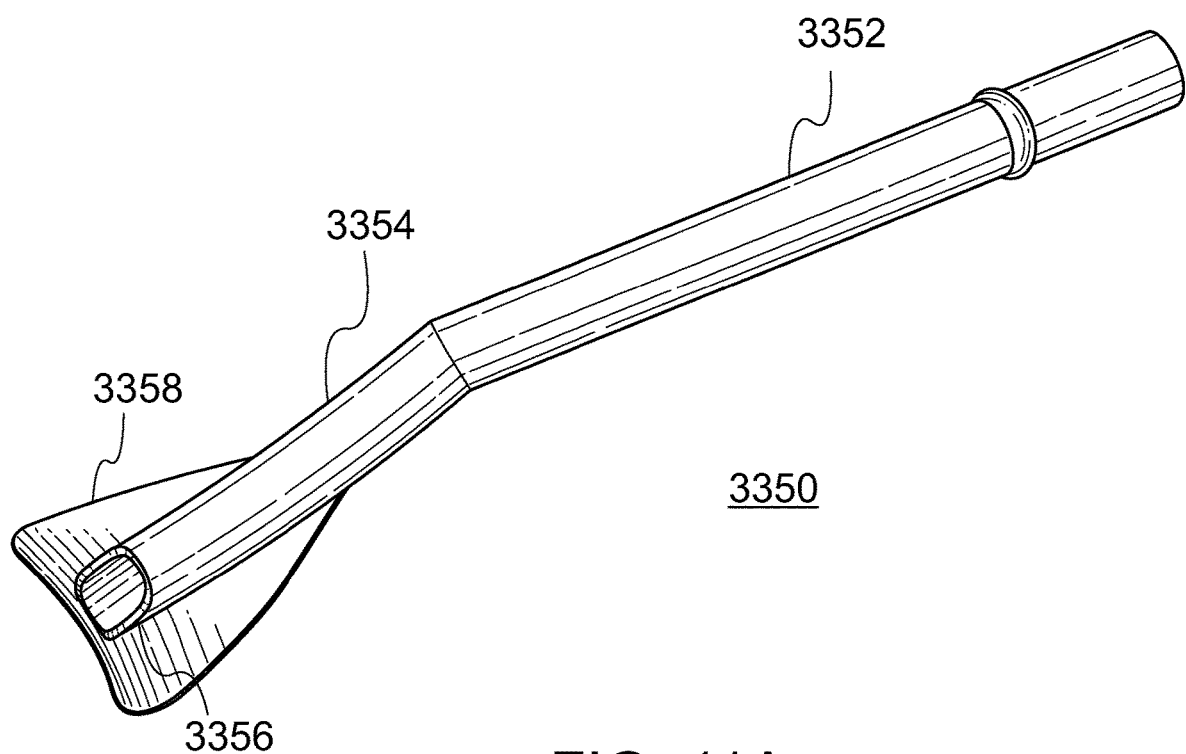
FIG. 11A is a perspective view of an eleventh embodiment dental tool.
Figure 11B:
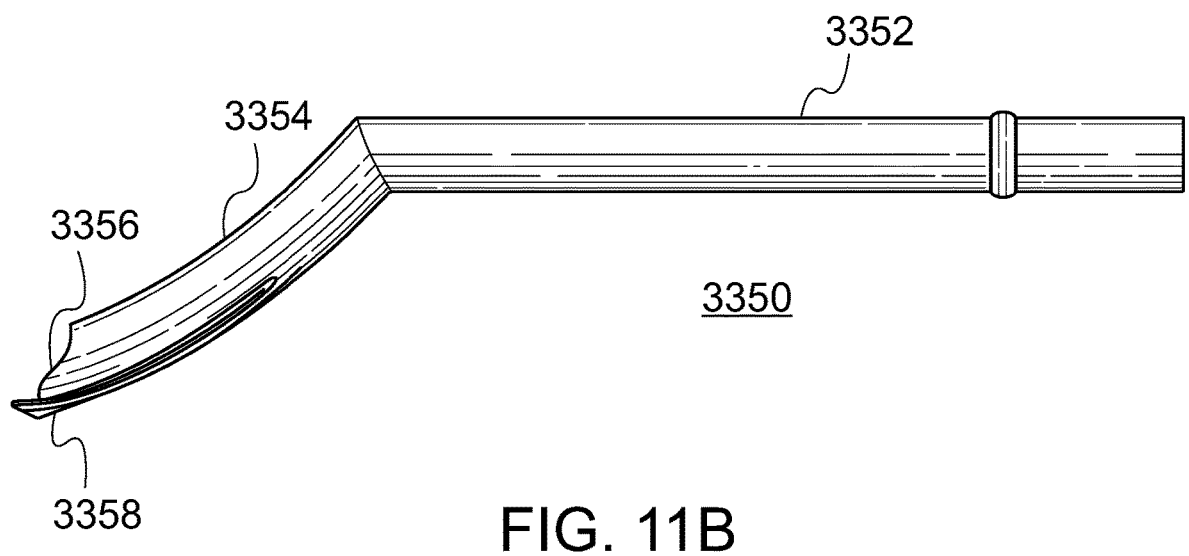
FIG. 11B is a side view of the dental tool of FIG. 11A.

The combined tool 3350 includes a handle portion 3352 and an angled neck portion 3354 arranged distally of the handle portion 3352. The suction portion of the tool is provided in one embodiment by having a hollow passageway through the handle 3352 and the neck portion 3354 such that a suction mechanism applied proximal to the handle 3352 results in a suction force available at the distal tip 3356 of the neck portion 3354. As shown in FIG. 11B, the neck portion 3354 is not straight as was the case with the neck portion 3204 of the embodiment tool of FIGS. 8A-8E. Rather, in the embodiment of FIG. 11B, the neck portion is slightly curved as it extends from the distal tip of the handle 3352 towards the ultimate distal tip of the tool 3350. An advantage of this curved neck portion 3354 is that it provides increased visibility for the dental professional while using the tool. Arranged along the neck portion 3354 is a retractor 3358, which may, for example, be a lip retractor. Alternatively, the retractor may be any other type of retractor useful in dental procedures, such as a lip retractor.

Figure 11C:
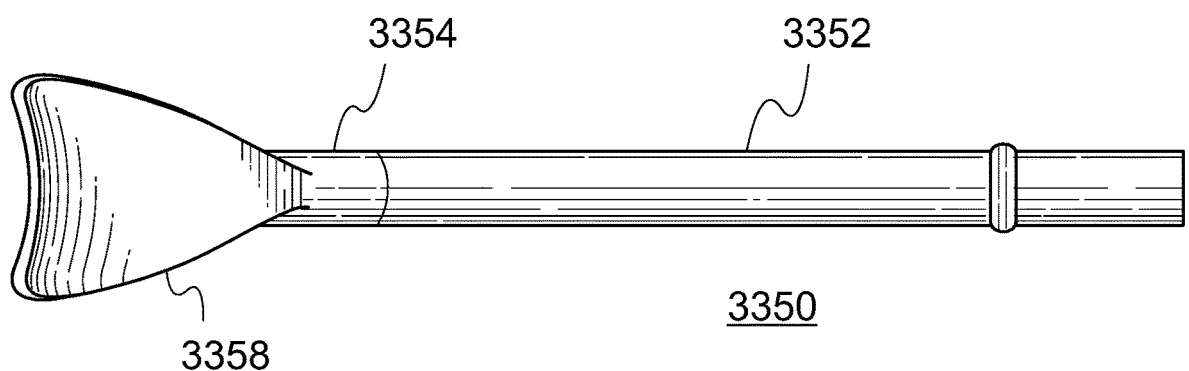
FIG. 11C is a bottom view of the dental tool of FIG. 11A.

As seen in FIG. 11B and FIG. 11C, the retractor 3358 extends from either side of the neck portion 3354 and flares out in width, extending to its maximal width near the distal tip 3356 of the neck portion 3354. As shown in FIG. 11B, the side profile of the distal tip 3356 is not straight or even. Rather, the distal tip 3356 may be curved or sinuous and extends further distally at a lower side of the distal tip 3356 near where the retractor 3358 is positioned. The top side of the distal tip 3356 is recessed relatively inward in a proximal direction with respect to the lower side of the distal tip 3356. In this way, the distal tip 3356 may be advantageously positioned to provide more efficient suction in various regions of the mouth and can be positioned to better match or align with the various structures found within the mouth, such as teeth, gums, etc. As seen in FIG. 11C, the retractor 3358 is positioned nearly entirely underneath the neck region 3354 such that the distal half of the neck region 3354 is not visible from the underside of the tool. In other words, the suction tube which is created by the neck region 3354 sits entirely above the extent of the retractor 3358. This is in contrast to the relative positioning of the neck region/suction tube and retractor in the embodiments of FIGS. 8A-8E, FIGS. 9A-9E and FIGS. 10A-10E, where a distal portion of the neck region/suction tube is positioned and is visible on the underside of the tool.

As seen in FIG. 11B, the retractor 3358 starts out approximately midway along the extent of the neck region 3354 where it is close to the bottom edge of the neck region 3354. Travelling distally, the retractor 3358 curves along the same general curve of the neck region and maintains essentially the same curvature of the neck region along the bottom edge of the neck region 3354. By having the retractor 3358 have essentially the same curvature and essentially the same shape as the neck region 3354 but being along the underside of the neck region 3354, this allows the dental professional to position the retractor with ease without actually seeing the underside of the retractor 3358 itself. The dental professional sees the neck region, which is visible, and by visually placing the neck region within the mouth, the dental professional is effectively positioning the retractor, especially the underside of the retractor which is meant to retract mouth structures, e.g., the lip—as if they are positioning the neck region which is visible. As shown in FIG. 11B, the most distal corners of the retractor 3358 turn slightly upward. This allows for a curved lower border of the retractor which conforms to the shape of a patient's lip, which allows for greater ease in the retraction of the lip.

Figure 11D:
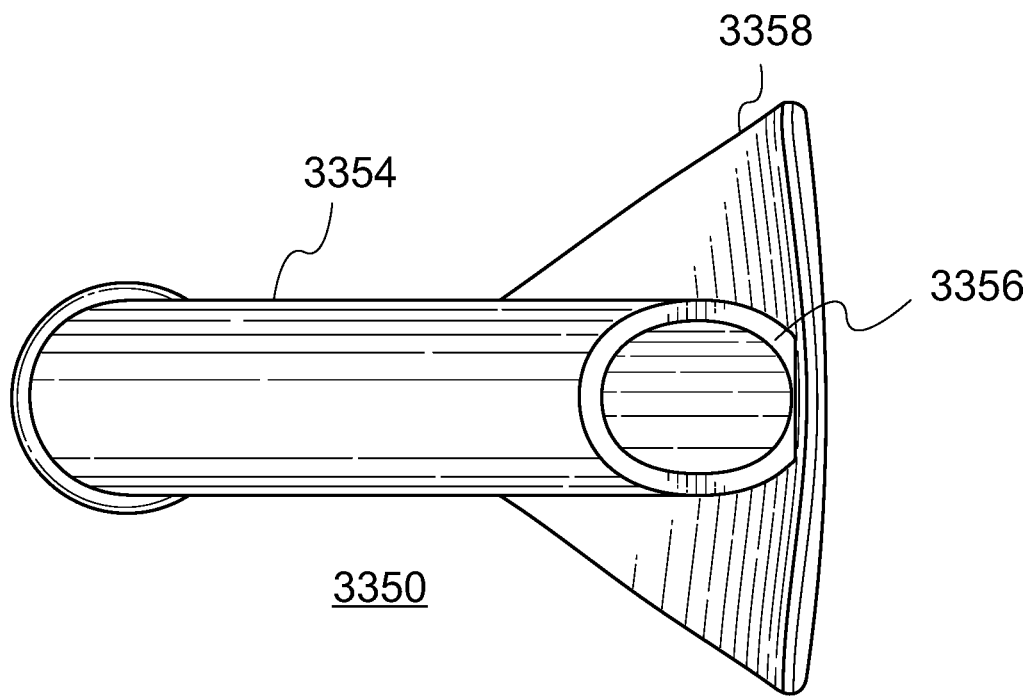
FIG. 11D is a front view of the dental tool of FIG. 11A.

As shown in FIG. 11B and FIG. 11C, the retractor 3358 extends more distally with respect to the distal tip 3356. In this way, the retractor 3358 may be positioned to a more distant point, while the distal tip 3358 provides suction at an area slightly above and slightly more proximal than the distal most point of the retractor 3358. As seen in FIG. 11C, the retractor 3358 is generally triangular in shape, although at its distal end, it does not have a straight edge. Rather, at the distal end, the edge of the retractor 3358 is curved slightly inward and proximal toward the center of the edge. The relative distal-proximal relationship between the distal tip 3356 and the retractor 3358 is also illustrated in FIG. 11D. An advantage of this general triangular shape is that when used to retract the lip, it prevents water from being expressed into the patient's nose from a high speed dental handpiece.

Figure 11E:
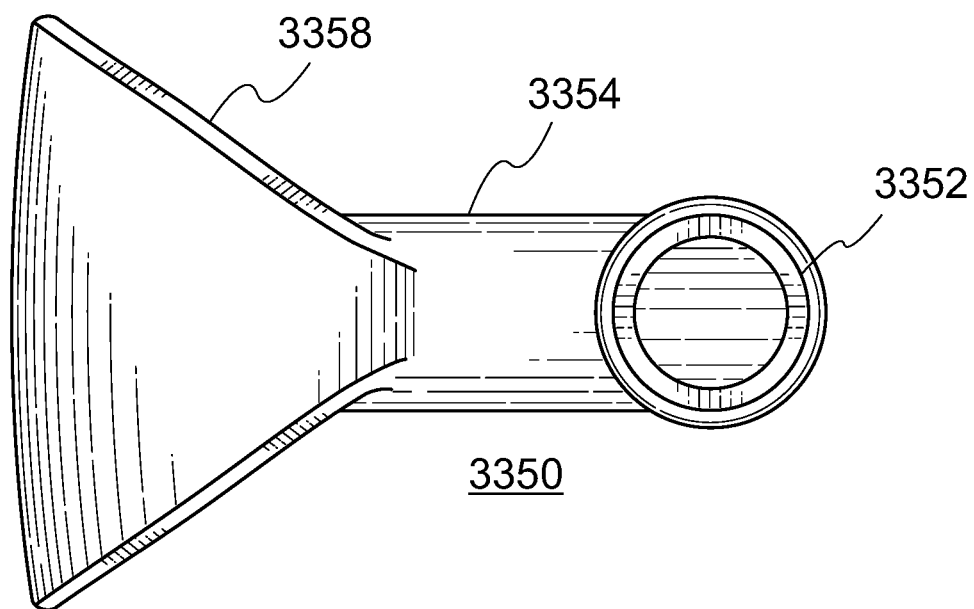
FIG. 11E is a back view of the dental tool of FIG. 11A.

Finally, as shown in FIGS. 11B and 11E, near the distal end of the neck region 3354, the retractor 3358 extends further distally with respect to the distal tip 3356. An advantage of this relative positioning is that the lower portion of the dental tool 3350 which contains the retractor 3358 may be easily and freely positioned within the mouth without being constrained or limited by the positioning of the distal tip 3356 which provides the suction. In other words, the retractor 3358 may be positioned in a conventional manner as if the suction tip is not even there. An advantage of this curved neck portion 3354 is that it provides increased visibility for the dental professional while using the tool.

FIGS. 12A-12E illustrate a twelfth embodiment of a combined tongue retractor with suction tool 3400. Preferably the device 3400 is integrally formed from any suitable material, such as plastic, and is disposable. The multipurpose tool 3400 includes a hollow, tubular portion that terminates in a distal end with a combined tongue retractor. The tubular section may have any suitable cross-sectional shape, such as rectangular, elliptical, hexagonal, octagonal or, substantially round; this cross-sectional shape may change from the proximal end to the distal end. The proximal end of the tubular section is preferably round to accept a standard vacuum-providing hose, i.e., a high volume evacuator (HVE) adapter, and includes a stop ring.

The combined tool 3400 includes a handle portion 3402 and an angled neck portion 3404 arranged distally of the handle portion 3402. The suction portion of the tool is provided in one embodiment by having a hollow passageway through the handle 3402 and the neck portion 3404 such that a suction mechanism applied proximal to the handle 3402 results in a suction force available at the distal tip 3406 of the neck portion 3404. The embodiment of FIGS. 12A-12E is similar to the embodiment of FIGS. 11A-11E, except that in the embodiment of FIGS. 12A-12E, the neck 3404 is straight, whereas in the embodiment of FIGS. 11A-11E, the neck 3354 is curved. Arranged along the neck portion 3404 is a retractor 3408, which may, for example, be a tongue retractor. Alternatively, the retractor may be any other type of retractor useful in dental procedures, such as a lip retractor.

Figure 12A:
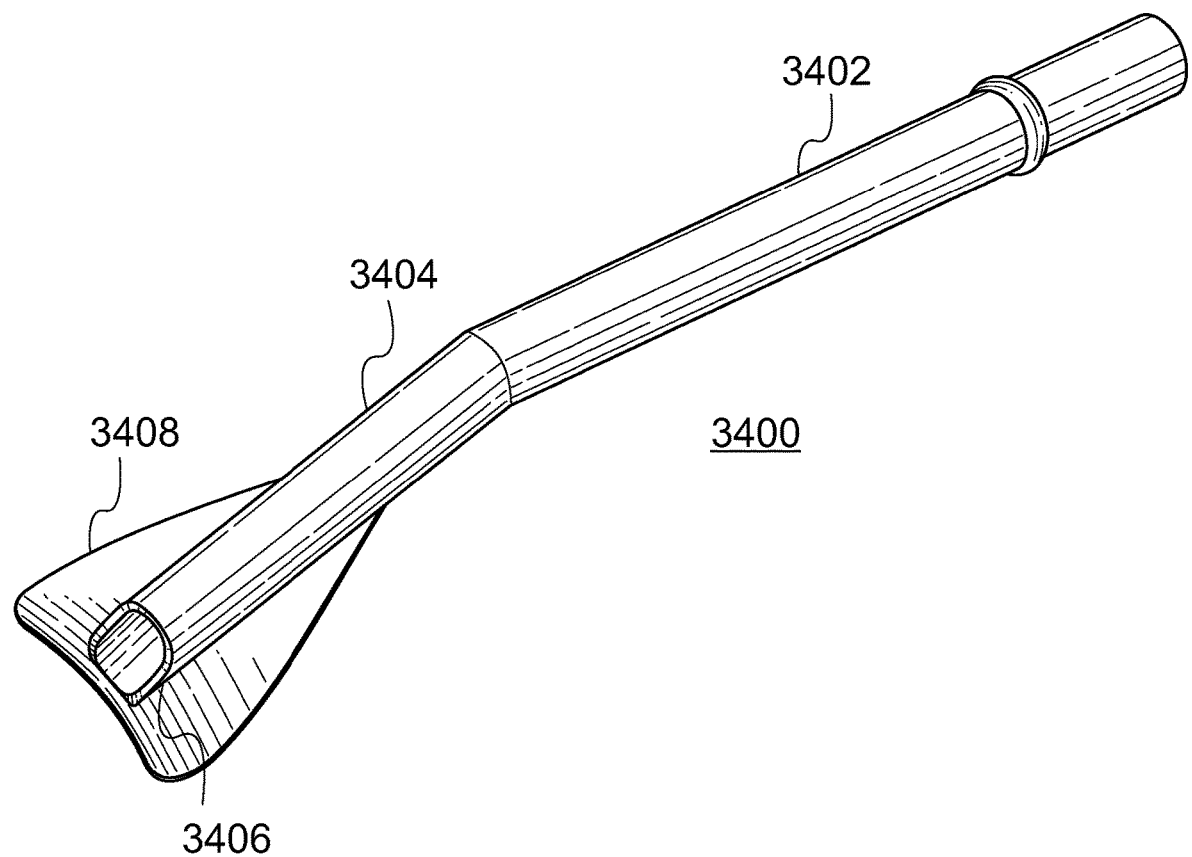
FIG. 12A is a perspective view of a twelfth embodiment dental tool.
Figure 12B:
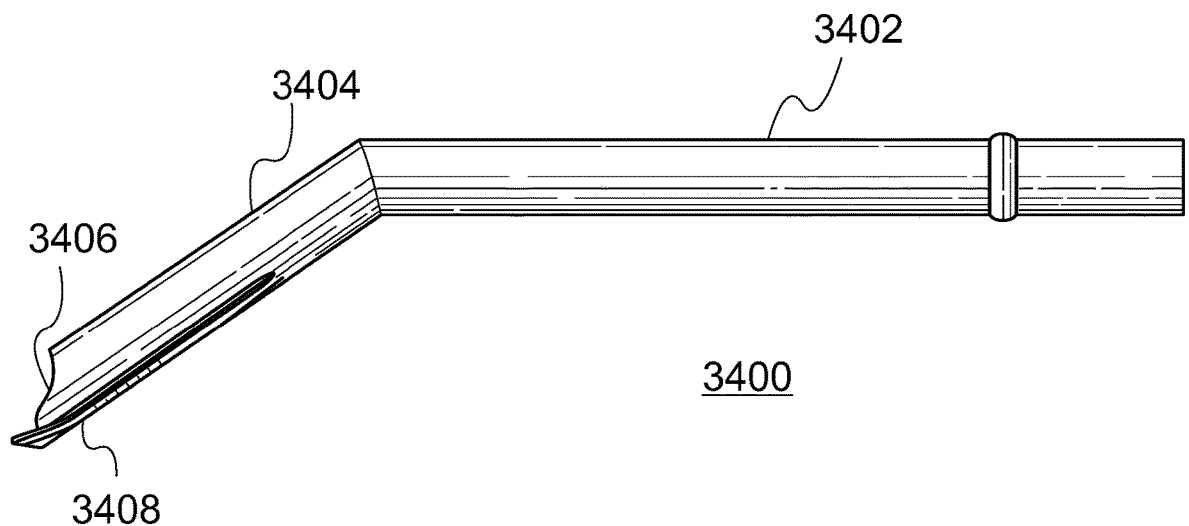
FIG. 12B is a side view of the dental tool of FIG. 12A.
Figure 12C:
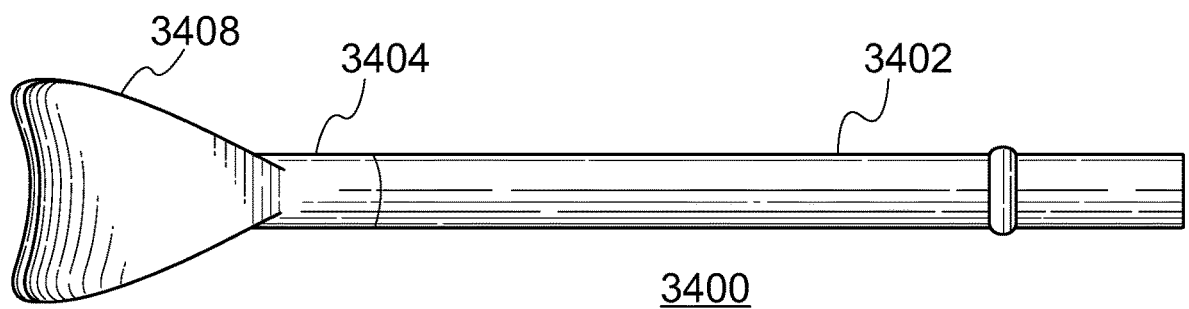
FIG. 12C is a bottom view of the dental tool of FIG. 12A.

As seen in FIG. 12B and FIG. 12C, the retractor 3408 extends from either side of the neck portion 3404 and flares out in width, extending to its maximal width near the distal tip 3406 of the neck portion 3404. As shown in FIG. 12B, the side profile of the distal tip 3406 is not straight or even. Rather, the distal tip 3406 may be curved or sinuous and extends further distally at a lower side of the distal tip 3406 near where the retractor 3408 is positioned. The top side of the distal tip 3406 is recessed relatively inward in a proximal direction with respect to the lower side of the distal tip 3406. In this way, the distal tip 3406 may be advantageously positioned to provide more efficient suction in various regions of the mouth and can be positioned to better match or align with the various structures found within the mouth, such as teeth, gums, etc. As seen in FIG. 12C, the retractor 3408 is positioned nearly entirely underneath the neck region 3404 such that the distal half of the neck region 3404 is not visible from the underside of the tool. In other words, the suction tube which is created by the neck region 3404 sits entirely above the extent of the retractor 3408. This is in contrast to the relative positioning of the neck region/suction tube and retractor in the embodiments of FIGS. 8A-8E, FIGS. 9A-9E and FIGS. 10A-10E, where a distal portion of the neck region/suction tube is positioned and is visible on the underside of the tool.

As seen in FIG. 12B, the retractor 3408 starts out close to the proximal end of the neck region 3404 where it is close to the bottom edge of the neck region 3404. Travelling distally, the retractor 3408 extends generally straight and follows the same general straight extent of the neck region, but along the bottom edge of the neck region 3404. The dental professional sees the neck region, which is visible, and by visually placing the neck region within the mouth, the dental professional is effectively positioning the retractor, especially the underside of the retractor which is meant to retract mouth structures—as if they are positioning the neck region which is visible. As shown in FIG. 12B, the most distal corners of the retractor 3408 turn slightly upward. This allows for a curved lower border of the retractor which conforms to the shape of a patient's lip, which allows for greater ease in the retraction of the lip.

Figure 12D:
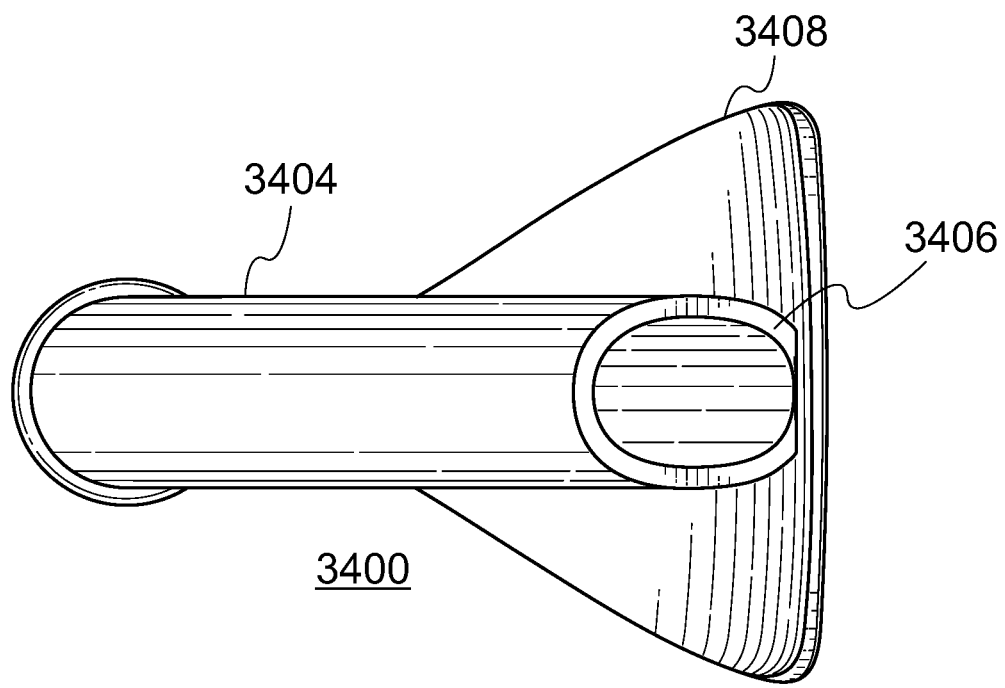
FIG. 12D is a front view of the dental tool of FIG. 12A.

As shown in FIG. 12B and FIG. 12C, the retractor 3408 extends more distally with respect to the distal tip 3406. In this way, the retractor 3408 may be positioned to a more distant point, while the distal tip 3406 provides suction at an area slightly above and slightly more proximal than the distal most point of the retractor 3408. As seen in FIG. 12C, the retractor 3408 is generally triangular in shape, although at its distal end, it does not have a straight edge. Rather, at the distal end, the edge of the retractor 3408 is curved slightly inward and proximal toward the center of the edge. The relative distal-proximal relationship between the distal tip 3406 and the retractor 3408 is also illustrated in FIG. 12D. An advantage of this general triangular shape is that when used to retract the lip, it prevents water from being expressed into the patient's nose from a high speed dental handpiece.

Figure 12E:
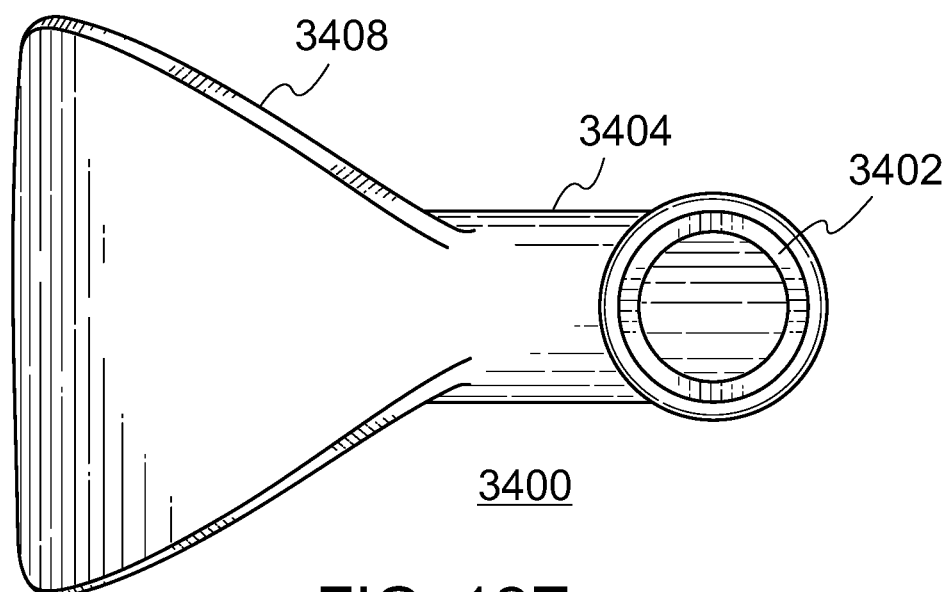
FIG. 12E is a back view of the dental tool of FIG. 12A.

Finally, as shown in FIGS. 12B and 12E, near the distal end of the neck region 3404, the retractor 3408 extends distally with respect to the distal tip 3406.

FIGS. 13A-13E illustrate a thirteenth embodiment of a combined tongue retractor with suction tool 3450. Preferably the device 3450 is integrally formed from any suitable material, such as plastic, and is disposable. The multipurpose tool 3450 includes a hollow, tubular portion that terminates in a distal end with a combined tongue retractor. The tubular section may have any suitable cross-sectional shape, such as rectangular, elliptical, hexagonal, octagonal or, substantially round; this cross-sectional shape may change from the proximal end to the distal end. The proximal end of the tubular section is preferably round to accept a standard vacuum-providing hose, i.e., a high volume evacuator (HVE) adapter, and includes a stop ring.

The combined tool 3450 includes a handle portion 3452 and an angled neck portion 3454 arranged distally of the handle portion 3452. The suction portion of the tool is provided in one embodiment by having a hollow passageway through the handle 3452 and the neck portion 3454 such that a suction mechanism applied proximal to the handle 3452 results in a suction force available at the distal tip 3456 of the neck portion 3454. Arranged along the neck portion 3454 is a retractor 3458, which may, for example, be a tongue retractor. Alternatively, the retractor may be any other type of retractor useful in dental procedures, such as a lip retractor. The embodiment of FIGS. 13A-13E is similar to the embodiment of FIGS. 8A-8E, except that in FIGS. 8A-8E, the retractor 3208 is curved, whereas in FIGS. 13A-13E, the retractor 3458 is generally straight and flat.

Figure 13A:
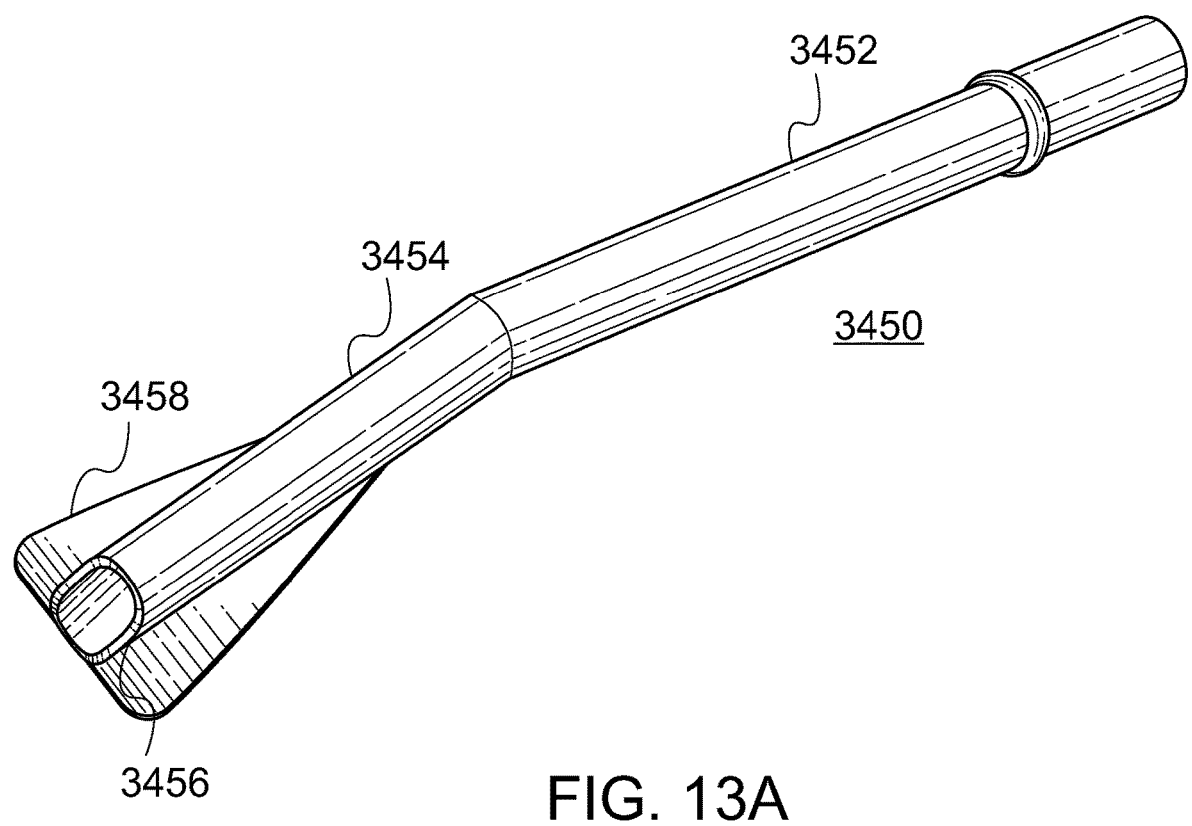
FIG. 13A is a perspective view of a thirteenth embodiment dental tool.
Figure 13B:
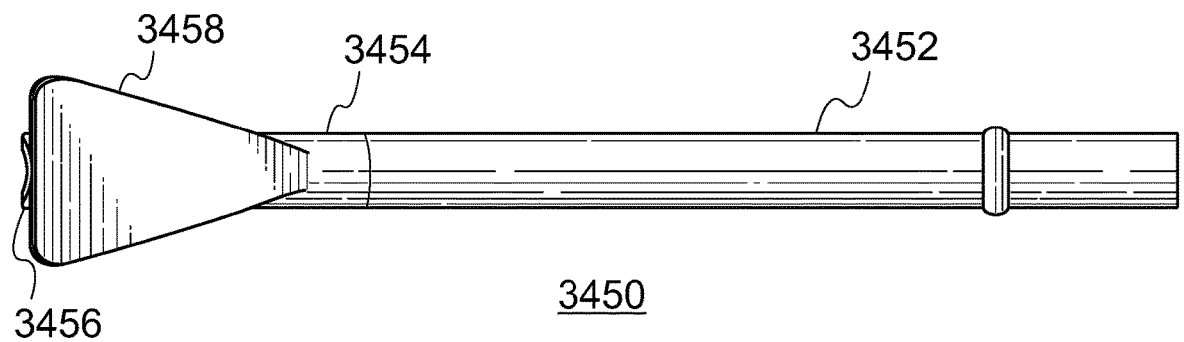
FIG. 13B is a bottom view of the dental tool of FIG. 13A.
Figure 13C:
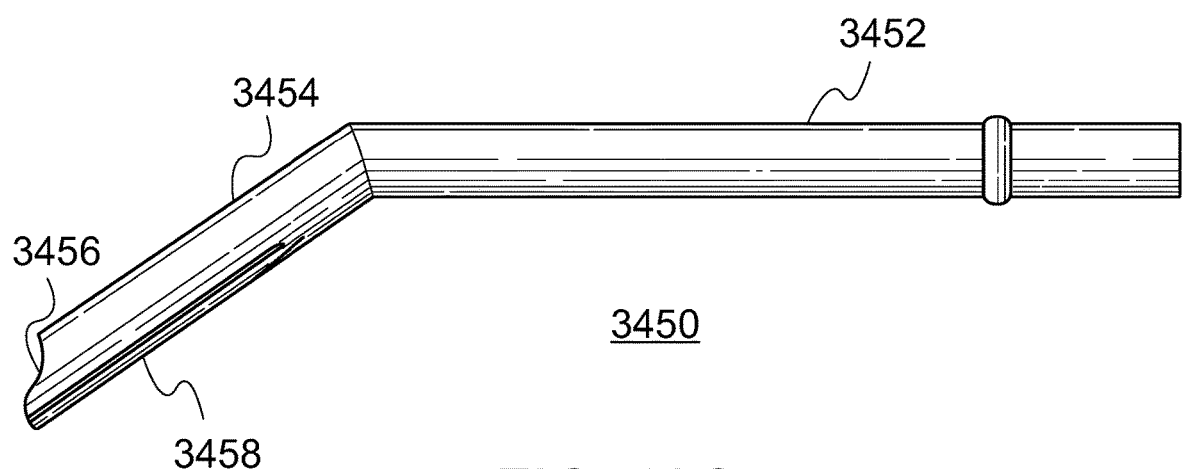
FIG. 13C is a side view of the dental tool of FIG. 13A.
Figure 13D:
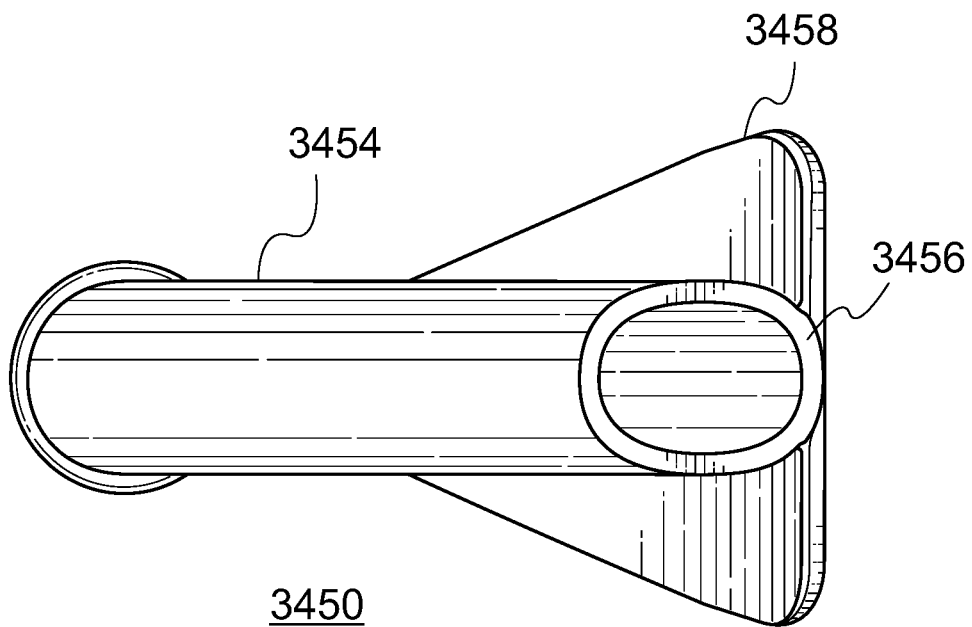
FIG. 13D is a front view of the dental tool of FIG. 13A.
Figure 13E:
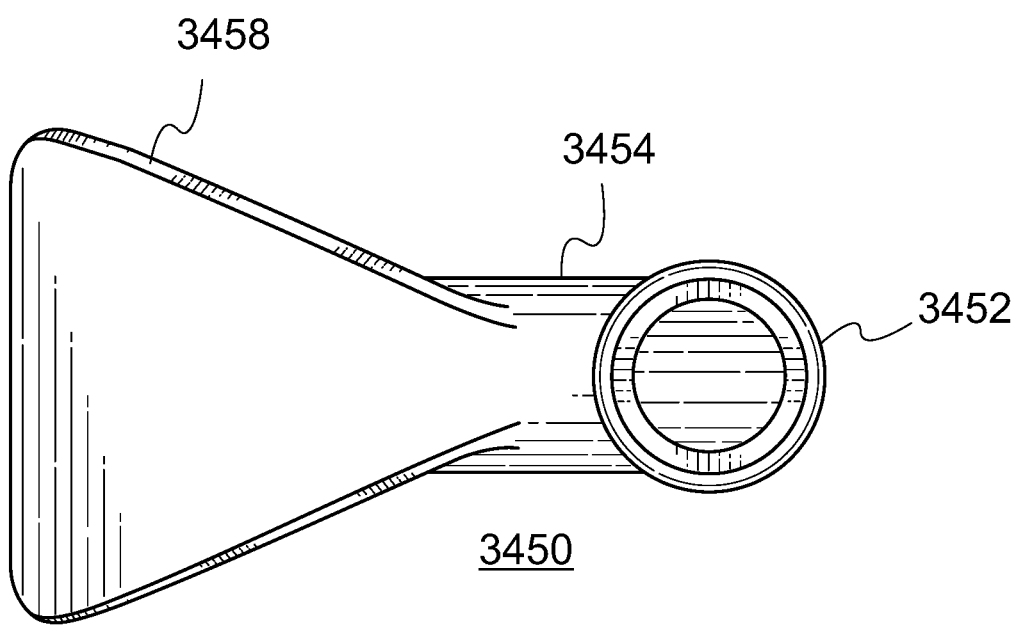
FIG. 13E is a back view of the dental tool of FIG. 13A.

As seen in FIG. 13B and FIG. 13C, the retractor 3458 extends from either side of the neck portion 3454 and flares out in width, extending to its maximal width near the distal tip 3456 of the neck portion 3454. As shown in FIG. 13C, the side profile of the distal tip 3456 is not straight or even. Rather, the distal tip 3456 may be curved or sinuous and extends further distally at a lower side of the distal tip 3456 near where the retractor 3458 is positioned. The top side of the distal tip 3456 is recessed relatively inward in a proximal direction with respect to the lower side of the distal tip 3456. In this way, the distal tip 3456 may be advantageously positioned to provide more efficient suction in various regions of the mouth and can be positioned to better match or align with the various structures found within the mouth, such as teeth, gums, etc. As seen in FIG. 13B, the proximal aspect of the retractor 3458 starts out at a point of the neck region 3454 which is slightly more distal than the distal end of the handle 3452. The retractor 3458 is positioned very close or at the bottom edge of the neck region 3454. Travelling distally, the retractor 3458 is essentially straight and generally follows the lower edge of the neck region 3454. As shown in FIGS. 13B and 13E, near the distal end of the neck region 3454, the retractor 3458 extends only to the lower extent of the distal tip 3456, resulting in a more compact structure which can be positioned into tighter or smaller spaces, since at its most distal end, the tool 3450 does not extend in a vertical direction as much as the embodiments of FIGS. 8A-8E, 9A-9E, and 10A-10E. An advantage of this relative positioning is that the lower portion of the dental tool 3450 which contains the retractor 3458 may be easily and freely positioned within the mouth without being constrained or limited by the positioning of the distal tip 3456 which provides the suction. In other words, the retractor 3458 may be positioned in a conventional manner as if the suction tip is not even there.

As shown in FIG. 13C, the lower end of the distal tip 3456 extends essentially to the same distal point as does the retractor 3458. In this way, the distal tip 3456 may be positioned to provide more efficient suction in an area immediately adjacent to where the retractor is being used to retract a particular mouth structure, e.g., the tongue. This relative distal-proximal relationship between the distal tip 3456 and the retractor 3458 is also illustrated in FIG. 13D. As shown in FIGS. 13B, 13D, and 13E, the retractor 3458 is generally triangular in shape with a substantially straight and flat distal tip or edge.

FIGS. 14A-14E illustrate a fourteenth embodiment of a combined tongue retractor with suction tool 3500. Preferably the device 3500 is integrally formed from any suitable material, such as plastic, and is disposable. The multipurpose tool 3500 includes a hollow, tubular portion that terminates in a distal end with a combined tongue retractor. The tubular section may have any suitable cross-sectional shape, such as rectangular, elliptical, hexagonal, octagonal or, substantially round; this cross-sectional shape may change from the proximal end to the distal end. The proximal end of the tubular section is preferably round to accept a standard vacuum-providing hose, i.e., a high volume evacuator (HVE) adapter, and includes a stop ring.

The combined tool 3500 includes a handle portion 3502 and a curved neck portion 3504 arranged distally of the handle portion 3502. The suction portion of the tool is provided in one embodiment by having a hollow passageway through the handle 3502 and the neck portion 3504 such that a suction mechanism applied proximal to the handle 3502 results in a suction force available at the distal tip 3506 of the neck portion 3504. Arranged along the neck portion 3504 is a retractor 3508, which may, for example, be a tongue or lip retractor. Alternatively, the retractor may be any other type of retractor useful in dental procedures, such as a lip retractor. The embodiment of FIGS. 14A-14E is similar to that of FIGS. 8A-8E, except one difference (others are discussed below and elsewhere) is that in the embodiment of FIGS. 14A-14E, the neck 3504 is curved, whereas in the embodiment of FIGS. 8A-8E, the neck 3204 is generally straight.

Figure 14A:
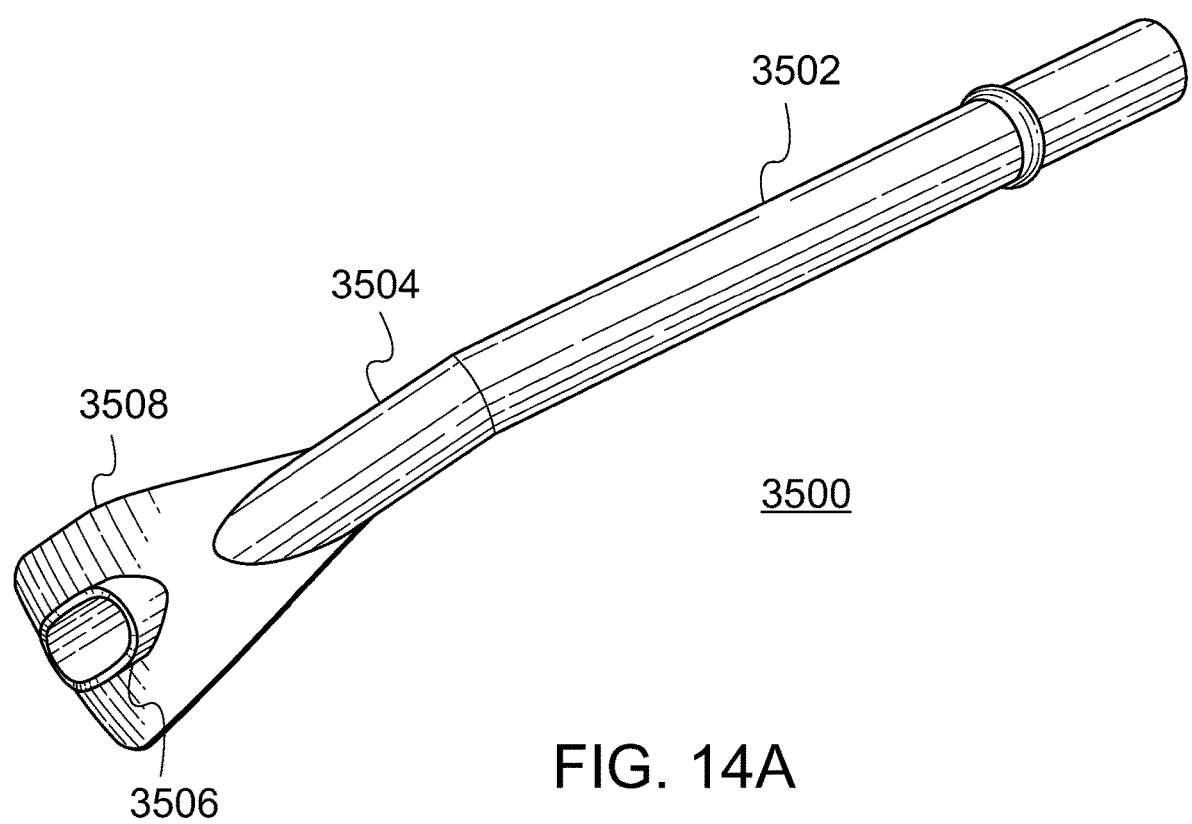
FIG. 14A is a perspective view of a fourteenth embodiment dental tool.
Figure 14B:
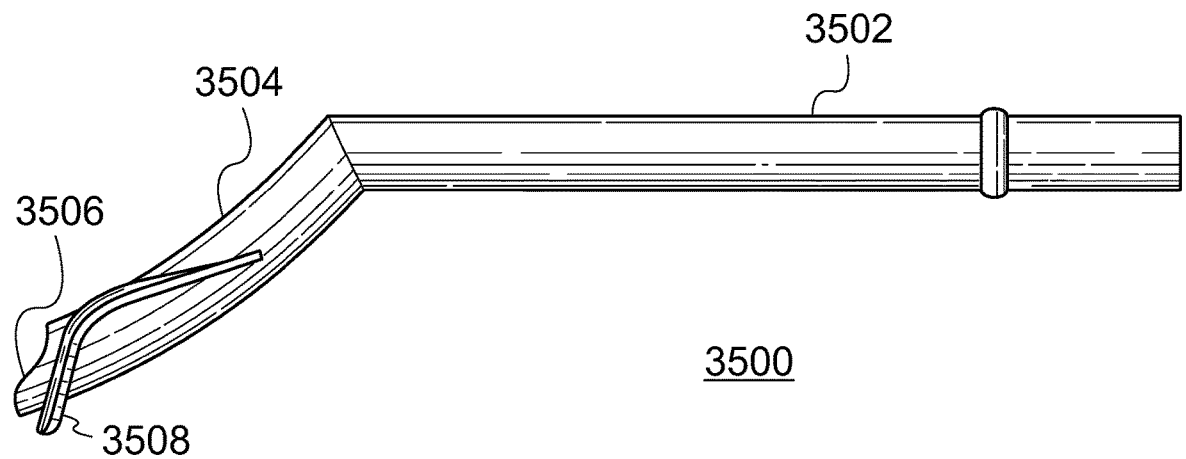
FIG. 14B is a side view of the dental tool of FIG. 14A.
Figure 14C:
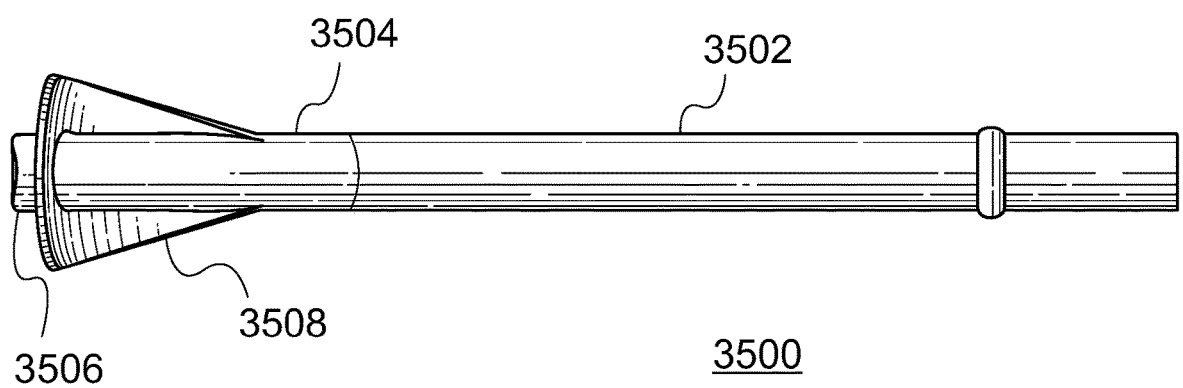
FIG. 14C is a bottom view of the dental tool of FIG. 14A.
Figure 14D:
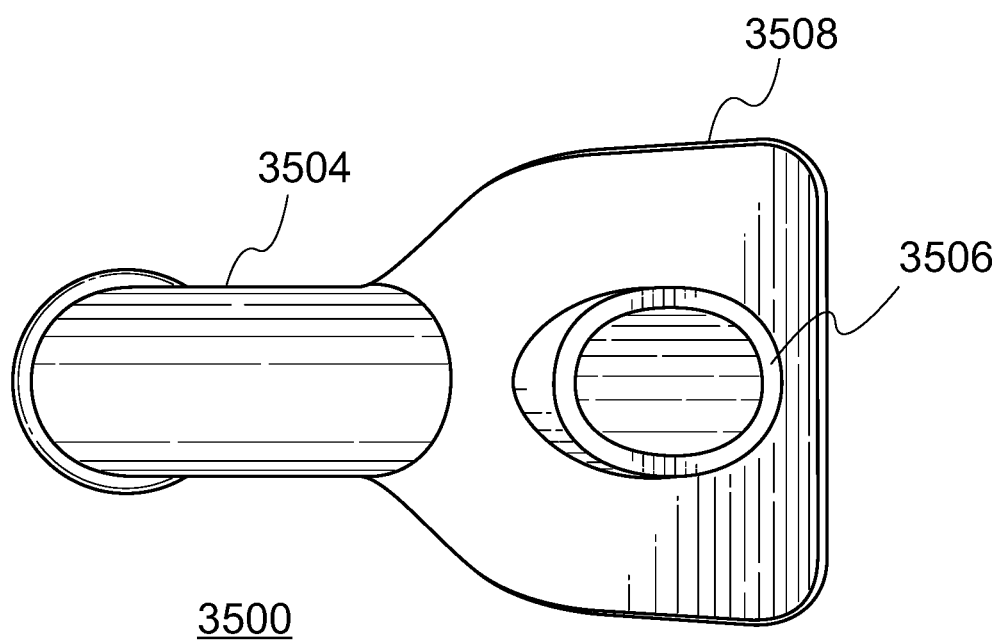
FIG. 14D is a front view of the dental tool of FIG. 14A.

As seen in FIG. 14B and FIG. 14C, the retractor 3508 extends from either side of the neck portion 3504 and flares out in width, extending to its maximal width near the distal tip 3506 of the neck portion 3504. As shown in FIG. 14B, the side profile of the distal tip 3506 is not straight or even. Rather, the distal tip 3506 may be curved or sinuous and extends further distally at a lower side of the distal tip 3506 near where the retractor 3508 is positioned. The top side of the distal tip 3506 is recessed relatively inward in a proximal direction with respect to the lower side of the distal tip 3506. In this way, the distal tip 3506 may be advantageously positioned to provide more efficient suction in various regions of the mouth and can be positioned to better match or align with the various structures found within the mouth, such as teeth, gums, etc. As seen in FIG. 14B, the retractor 3508 starts out at a point which is distal to the proximal end of the neck region 3504 and which is located generally about halfway up the side of the neck region 3504. This is in contrast to the embodiment of FIGS. 8A-8E where the retractor 3208 starts at a point which is close to the bottom edge of the neck region 3204. As seen in FIG. 14B, travelling distally, the retractor 3508 extends slightly upward so as to be near the top edge of the neck region 3504. Again, this is in contrast to the embodiment of FIGS. 8A-8E where the retractor 3208 starts at a point which is close to the bottom edge of the neck region 3204 and extends upward only to about halfway up the height of the neck region 3202. In FIG. 14B, the retractor extends upward essentially to the topmost edge of the neck region 3504, and from there, the retractor 3508 extends distally and downwardly to its most distal point. The proximal part and the distal part of the retractor 3508 can be viewed as forming an angle which is greater than a right angle. As shown in FIG. 14B, the most distal point of the retractor 3508 is positioned below the lower edge of the neck region 3504 such that there is formed a small gap or notch between the distal end of the neck region 3504 and the distal end of the retractor 3508. This upward and then downward profile of the retractor 3508 creates a shape that allows it to encapsulate a structure, such as the tongue, which is to be retracted.

As shown in FIG. 14C, the distal tip 3506 extends more distally with respect to the retractor 3508. In this way, the distal tip 3506 may be positioned to provide more efficient suction in an area adjacent to where the retractor is being used to retract a particular mouth structure, e.g., the tongue. This relative distal-proximal relationship between the distal tip 3506 and the retractor 3508 is also illustrated in FIG. 8D. As shown in FIG. 14C and as contrasted with the embodiment shown in FIG. 8C, in FIG. 14C, it is observed that a substantial portion of the neck region 3504 is positioned below the retractor 3508, whereas in FIG. 8C, only a relatively small portion of the neck region 3204 is positioned below the retractor 3208.

Figure 14E:
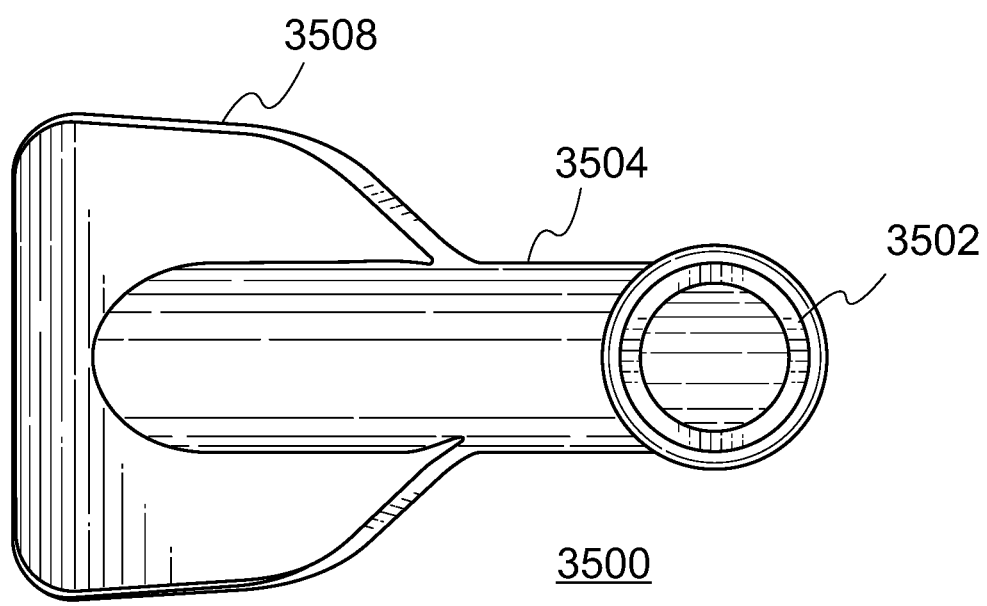
FIG. 14E is a back view of the dental tool of FIG. 14A.

Finally, as shown in FIGS. 14B and 14E, near the distal end of the neck region 3504, the retractor 3508 extends lower or further downward than the distal tip 3506. As shown, the retractor 3508 extends upward as it extends distally to reach a top-most extent of the neck portion 3504, and then extends downwards as it extends further distally to reach a retractor terminal point which is below the neck portion 3504 such that a pocket is formed by the distal tip of the neck portion 3504 and the distal tip of the retractor 3508. An advantage of this relative positioning is that the lower portion of the dental tool 3500 which contains the retractor 3508 may be easily and freely positioned within the mouth without being constrained or limited by the positioning of the distal tip 3506 which provides the suction. In other words, the retractor 3508 may be positioned in a conventional manner as if the suction tip is not even there. An advantage of the pocket or notch created thereby is that it allows positioning of the suction distal tip 3506 slightly above the retractor 3508 to provide a slight separation between the suction placement and the retractor placement, either vertical and/or horizontal separation. This gives the advantage of having unimpeded suction.

FIGS. 15A-15E illustrate a thirteenth embodiment of a combined tongue retractor with suction tool 3550. Preferably the device 3550 is integrally formed from any suitable material, such as plastic, and is disposable. The multipurpose tool 3550 includes a hollow, tubular portion that terminates in a distal end with a combined tongue retractor. The tubular section may have any suitable cross-sectional shape, such as rectangular, elliptical, hexagonal, octagonal or, substantially round; this cross-sectional shape may change from the proximal end to the distal end. The proximal end of the tubular section is preferably round to accept a standard vacuum-providing hose, i.e., a high volume evacuator (HVE) adapter, and includes a stop ring.

The combined tool 3550 includes a handle portion 3552 and a curved neck portion 3554 arranged distally of the handle portion 3552. The suction portion of the tool is provided in one embodiment by having a hollow passageway through the handle 3552 and the neck portion 3554 such that a suction mechanism applied proximal to the handle 3552 results in a suction force available at the distal tip 3556 of the neck portion 3554. Arranged along the neck portion 3554 is a retractor 3558, which may, for example, be a tongue retractor. Alternatively, the retractor may be any other type of retractor useful in dental procedures, such as a lip retractor. The embodiment of FIGS. 15A-15E is similar to the embodiment of FIGS. 13A-13E, except that in FIGS. 15A-15E, the retractor 3558 is curved, whereas in FIGS. 13A-13E, the retractor 3458 is generally straight.

Figure 15A:
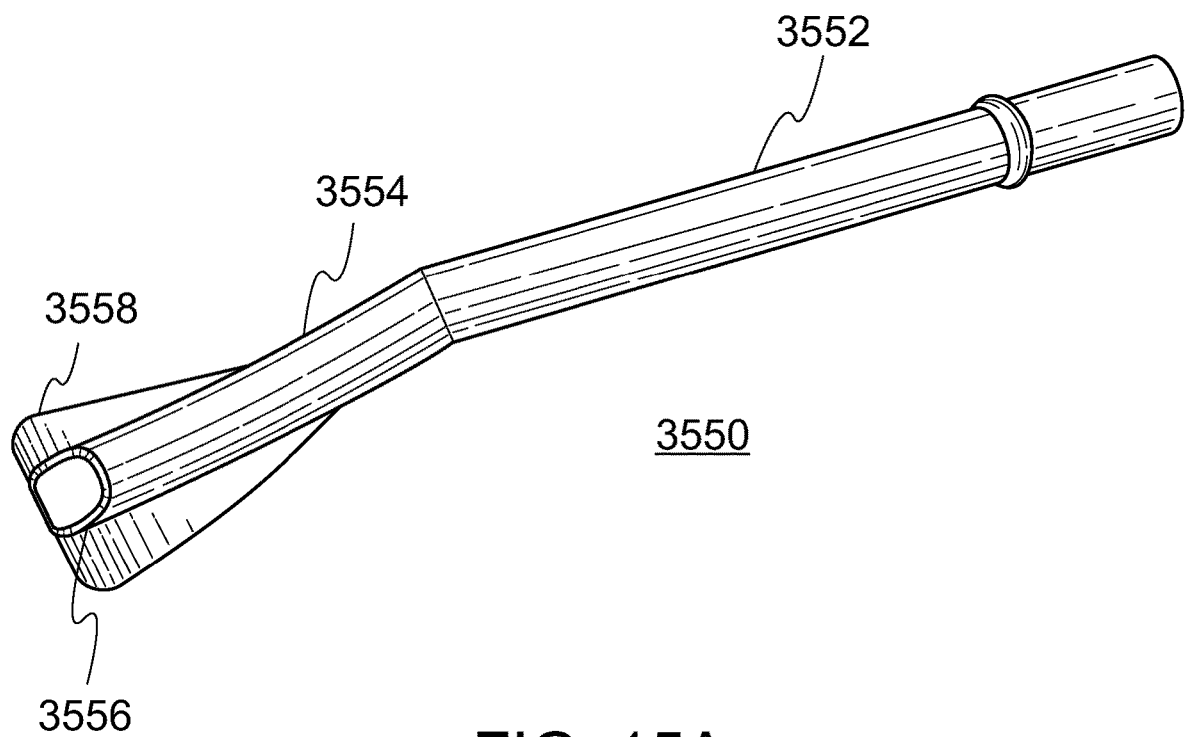
FIG. 15A is a perspective view of a fifteenth embodiment dental tool.
Figure 15B:
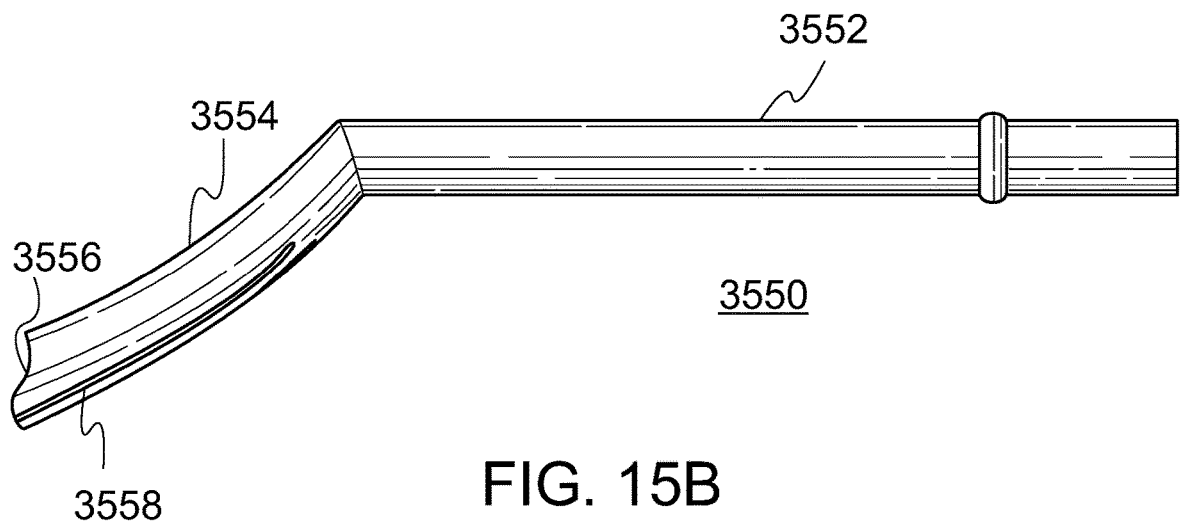
FIG. 15B is a side view of the dental tool of FIG. 15A.
Figure 15C:
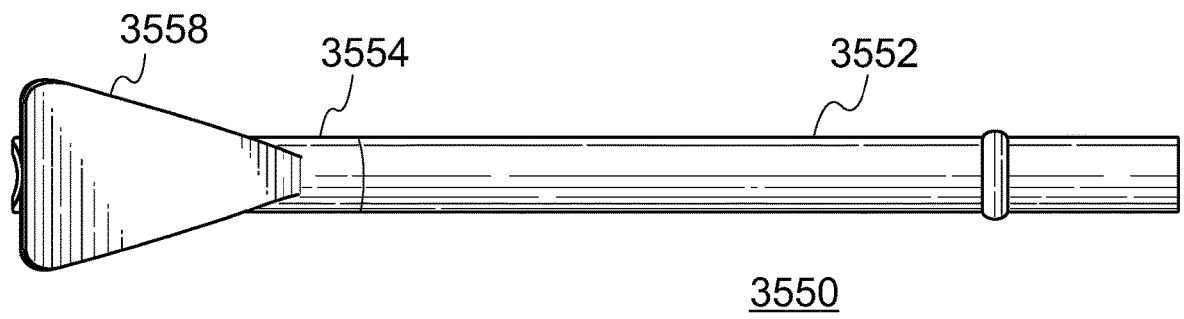
FIG. 15C is a bottom view of the dental tool of FIG. 14A.
Figure 15D:
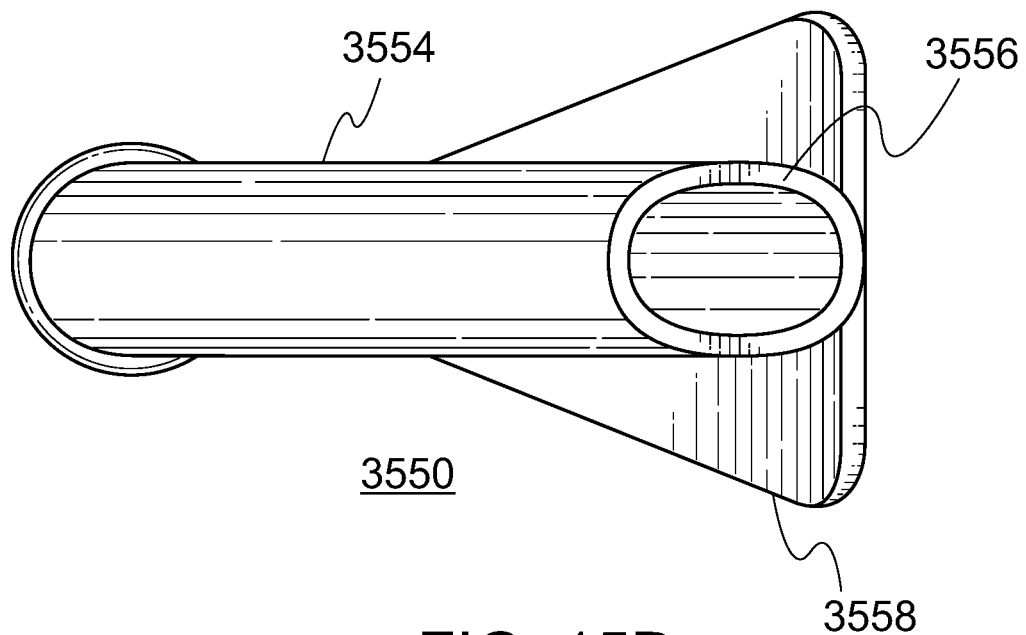
FIG. 15D is a front view of the dental tool of FIG. 15A.
Figure 15E:
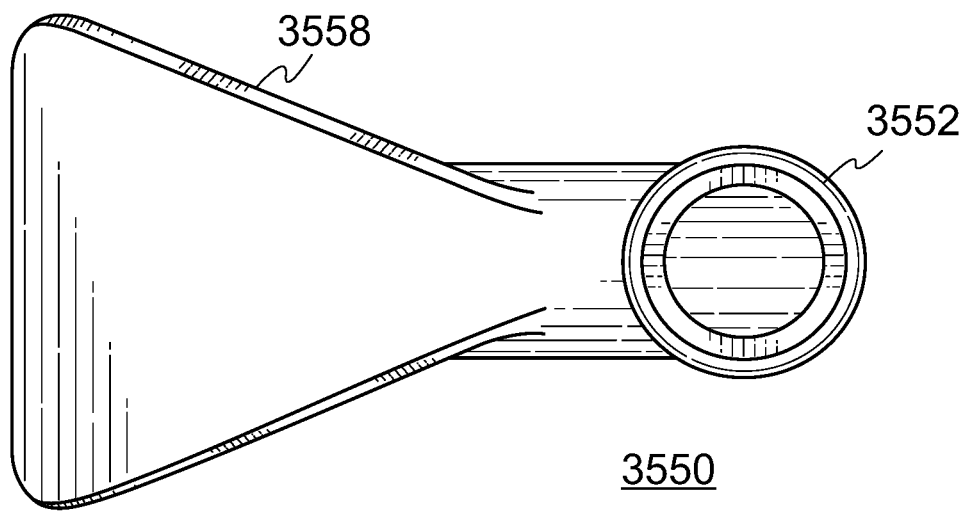
FIG. 15E is a back view of the dental tool of FIG. 15A.

As seen in FIG. 15B and FIG. 15C, the retractor 3558 extends from either side of the neck portion 3554 and flares out in width, extending to its maximal width near the distal tip 3556 of the neck portion 3554. As shown in FIG. 15C, the side profile of the distal tip 3556 is not straight or even. Rather, the distal tip 3556 may be curved or sinuous and extends further distally at a lower side of the distal tip 3556 near where the retractor 3558 is positioned. The top side of the distal tip 3556 is recessed relatively inward in a proximal direction with respect to the lower side of the distal tip 3556. In this way, the distal tip 3556 may be advantageously positioned to provide more efficient suction in various regions of the mouth and can be positioned to better match or align with the various structures found within the mouth, such as teeth, gums, etc. As seen in FIG. 15B, the retractor 3558 starts out at a slightly distal point of the neck region 3554 which is more distal than the proximal end of the handle 3552. The retractor 3558 is positioned very close or at the bottom edge of the neck region 3554. Travelling distally, the retractor 3558 generally follows the lower edge of the neck region 3554. As shown in FIGS. 15B and 15E, near the distal end of the neck region 3554, the retractor 3558 extends only to the lower extent of the distal tip 3556, resulting in a more compact structure which can be positioned into tighter or smaller spaces, since at its most distal end, the tool 3550 does not extend in a vertical direction as much as the embodiments of FIGS. 8A-8E, 9A-9E, and 10A-10E. An advantage of this relative positioning is that the lower portion of the dental tool 3550 which contains the retractor 3558 may be easily and freely positioned within the mouth without being constrained or limited by the positioning of the distal tip 3556 which provides the suction. In other words, the retractor 3558 may be positioned in a conventional manner as if the suction tip is not even there.

As shown in FIG. 15C, the lower end of the distal tip 3556 extends essentially to the same distal point as does the retractor 3558. In this way, the distal tip 3556 may be positioned to provide more efficient suction in an area immediately adjacent to where the retractor is being used to retract a particular mouth structure, e.g., the tongue or lip. This relative distal-proximal relationship between the distal tip 3556 and the retractor 3558 is also illustrated in FIG. 15D. As shown in FIGS. 15B, 15D, and 15E, the retractor 3558 is generally triangular in shape with a substantially straight and flat distal tip or edge. An advantage of this general triangular shape is that when used to retract the lip, it prevents water from being expressed into the patient's nose from a high speed dental handpiece.

Figure 16A:
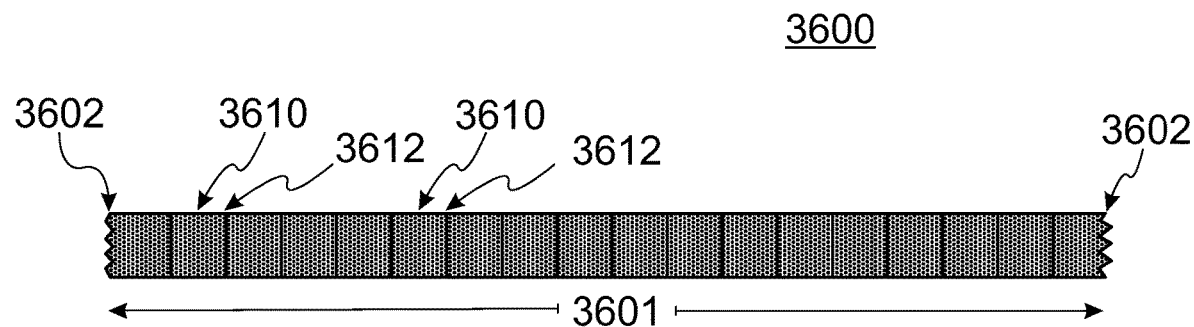
FIGS. 16A-16C are side, perspective and end views of an embodiment handle, respectively.
Figure 16B:
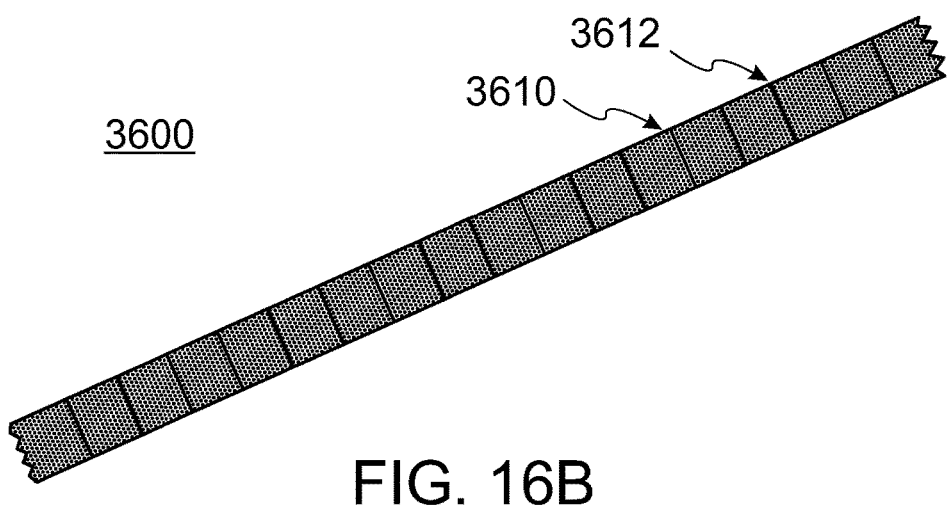
Figure 16C:

Reference is drawn to FIGS. 16A-16C, which present various views of a handle 3600 that may be utilized for the handle region of various of the above-described embodiment tools. Handle 3600 is substantially straight and made from a contiguous piece of material, which is preferably stainless steel, although other materials may also be used, such as plastic. Each end 3602 of handle 3600 may connect to a corresponding operational end and, as discussed in various of the embodiments above, and optional intervening neck region. These may be integrally formed with handle 3600, or may be attached to handle 3600, such as with a threaded connection or the like.

The exterior surface of handle 3600 comprises a plurality of surface features 3610 sequentially arrayed along a longitudinal length 3601 of handle 3600, which are separated from each other by corresponding dividers 3612. Preferably, each surface feature 3610 has a substantially identical length along longitudinal direction 3601 as every other surface feature 3610. Similarly, each divider 3612 has a substantially identical length along longitudinal direction 3601 as every other divider 3612. In this manner, the sequential array of surface features 3610 and corresponding dividers 3612 provides a visual cue of distance from an end 3602 of handle 3600; that is, the dividers 3612 function much like tick marks of a ruler, indicating distance from a corresponding end 3602 of handle 3600.

Each surface feature 3610 comprises knurling, which extends around the entire outer circumference of handle 3600 within the region of that surface feature 3610. This knurling provides a superior gripping surface for the Dentist. Each surface feature 3610 preferably has a length along longitudinal direction 3601 from about 3 mm to about 15 mm, more preferably from 3 mm to 10 mm, and more preferably still about 4 mm to 6 mm, or about 5 mm.

Each divider 3612 completely encircles handle 3600, and is preferably formed as a depression or recess in the outer surface of handle 3600, having a bottom surface that lies below the top surface of the knurling of the adjacent surface features 3610. This recess provides a convenient tactile reference for the Dentist when gripping handle 3600, and also serves to increase the gripping characteristics of handle 3600. To enhance the visual distinction between surface features 3610 and dividers 3612, the bottom surfaces of dividers 3612 may be smooth or polished, which visually contrasts with the relatively matte knurling of surface features 3610. Each divider 3612 preferably has a width along longitudinal direction 3601 of 0.3 mm to 2 mm, more preferably from 0.5 mm to 1 mm, more preferably still about 0.7 or 0.8 mm. Each divider 3612 preferably has a depth (which may be measured from the top or exterior surface of the adjacent surface feature 3610 knurling) of about 0.3 to 2 mm, more preferably about 0.3 to 1 mm, more preferably still about 0.5 to 0.7 mm.

The surface features 3610 and dividers 3612 provided by handle 3600 not only improve the grip of a Dentist upon handle 3600, but also provide both tactile and visual cues of distance from the working end of a tool that embodies handle 3600, which improves ease-of-use of such a tool.

Those skilled in the art will recognize that the present invention has many applications, may be implemented in various manners and, as such is not to be limited by the foregoing embodiments and examples. Any number of the features of the different embodiments described herein may be combined into a single embodiment, the locations of particular elements can be altered and alternate embodiments having fewer than or more than all of the features herein described are possible. For example, the neck region of a tool may include one or more of an S-shaped bend, a lateral bend to provide a lateral displacement of the working end, and a rotational displacement of the working end. The lateral displacement may be to the left or right of the longitudinal axis of the handle, and the rotational offset may be either clockwise or counter-clockwise. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there has been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

What is claimed is:

1. A hand-held dental tool, comprising:
    a generally straight handle portion having a proximal end and a distal end;
    a generally curved neck portion integral with the handle portion and having a proximal end and a distal end, the proximal end of the neck portion being connected to the distal end of the handle portion such that the neck portion extends generally downward with respect to the handle portion;
    a retractor integrally connected to the neck portion and having a proximal end extending from a first point on the neck portion which is located approximately in a middle region of the longitudinal extent of the neck portion, the retractor extending to and having a distal end which is located distally further than the distal end of the neck portion, the retractor having a first width at the first point which is substantially equivalent to a width of the neck portion, and having a second width at the distal end which is greater than the width of the neck portion, the retractor curving downward and laterally as it extends distally to the distal end, and curving inward and proximally at the distal end to thereby create a concave shape in two intersecting directions, the distal end of the retractor being continuous and wider than the neck portion and extending without any interruption along its width;
    said handle portion and said neck portion being substantially hollow to thereby create a continuous fluid passageway extending from the proximal end of said handle portion to the distal end of said neck portion, the fluid passageway at its distal end being supported by the retractor.

2. The hand-held dental tool of claim 1, wherein the handle portion and the neck portion are substantially tubular.

3. The hand-held dental tool of claim 1, wherein the retractor includes an inward curving lip at its terminal edge.

4. The hand-held dental tool of claim 1, wherein the distal end of the neck portion has an opening with a sinuous shaped side profile.

5. The hand-held dental tool of claim 1, wherein the proximal end of said handle is configured to engage a dental HVE adapter.

6. A hand-held dental tool, comprising:
    a generally straight handle portion having a proximal end and a distal end;
    a generally straight neck portion integral with the handle portion and having a proximal end and a distal end, the proximal end of the neck portion being connected to the distal end of the handle portion such that the neck portion is angled downward at an angle of less than 180 degrees with respect to the handle portion;
    a retractor integrally connected to the neck portion and having a proximal end extending from a first point on the neck portion which is located approximately in a middle region of the longitudinal extent of the neck portion, the retractor extending to and having a distal end which is located distally further than the distal end of the neck portion, the retractor having a first width at the first point which is substantially equivalent to a width of the neck portion, and having a second width at the distal end which is greater than the width of the neck portion, the retractor curving downward and laterally as it extends distally to the distal end, and curving inward and proximally at the distal end to thereby create a concave shape in two intersecting directions, the distal end of the retractor being continuous and wider than the neck portion and extending without any interruption along its width;

said handle portion and said neck portion being substantially hollow to thereby create a continuous fluid passageway extending from the proximal end of said handle portion to the distal end of said neck portion, the fluid passageway at its distal end being supported by the retractor.

7. The hand-held dental tool of claim 6, wherein the handle portion and the neck portion are substantially tubular.

8. The hand-held dental tool of claim 6, wherein the opening of the neck portion at its distal end is positioned above and proximally inward with respect to the distal end of the retractor.

9. The hand-held dental tool of claim 6, wherein the distal end of the neck portion has an opening with a sinuous shaped side profile.

10. The hand-held dental tool of claim 6, wherein the proximal end of said handle is configured to engage a dental HVE adapter.

11. A hand-held dental tool, comprising:
a generally straight handle portion having a proximal end and a distal end;
a generally curved neck portion integral with the handle portion and having a proximal end and a distal end, the proximal end of the neck portion being connected to the distal end of the handle portion such that the neck portion extends generally downward with respect to the handle portion;
a retractor integrally connected to the neck portion and having a distal end and a proximal end, the retractor curving downward and laterally as it extends distally to the distal end, and curving inward and proximally at the distal end to thereby create a concave shape in tow intersection directions;

said handle portion and said neck portion being substantially hollow to thereby create a continuous fluid passageway extending from the proximal end of said handle portion to the distal end of said neck portion, the fluid passageway at its distal end being supported by the retractor.

12. A hand-held dental tool, comprising:
a generally straight handle portion having a proximal end and a distal end;
a generally straight neck portion integral with the handle portion and having a proximal end and a distal end, the proximal end of the neck portion being connected to the distal end of the handle portion such that the neck portion is angled downward at an angle of less than 180 degrees with respect to the handle portion;
a retractor integrally connected to the neck portion and having a proximal end and a distal end, the retractor curving downward and laterally as it extends distally to the distal end, and curving inward and proximally at the distal end to thereby create a concave shape in two intersecting directions, the distal end of the retractor being continuous and wider than the neck position and extending without any interruption along its width;
said handle portion and said neck portion being substantially hollow to thereby create a continuous fluid passageway extending from the proximal end of said handle portion to the distal end of said neck portion, the fluid passageway at its distal end being supported by the retractor.

\* \* \* \* \*